April 14, 1925.

F. A. STEARN ET AL 1,533,477

ROUTINE TEST CIRCUITS FOR CENTRAL OFFICE SENDERS

Filed Sept. 23, 1922   23 Sheets-Sheet 1

Inventors:
Franklin A. Stearn
John C. McAuliffe
by J. E. Roberts   Atty.

April 14, 1925.

F. A. STEARN ET AL 1,533,477

ROUTINE TEST CIRCUITS FOR CENTRAL OFFICE SENDERS

Filed Sept. 23, 1922     23 Sheets-Sheet 2

Inventors:
Franklin A. Stearn
John C. McAuliffe
by    Att'y.

April 14, 1925.

F. A. STEARN ET AL 1,533,477

ROUTINE TEST CIRCUITS FOR CENTRAL OFFICE SENDERS

Filed Sept. 23, 1922    23 Sheets-Sheet 3

Fig. 4.

Inventors:
Franklin A. Stearn
John C. M⁹Auliffe
by J. E. Roberts Atty.

F. A. STEARN ET AL 1,533,477

ROUTINE TEST CIRCUITS FOR CENTRAL OFFICE SENDERS

Filed Sept. 23, 1922     23 Sheets-Sheet 5

Inventors:
Franklin A. Stearn
John C. McAuliffe
by     Atty.

Fig. 7.

April 14, 1925.
F. A. STEARN ET AL
1,533,477
ROUTINE TEST CIRCUITS FOR CENTRAL OFFICE SENDERS
Filed Sept. 23, 1922　　23 Sheets-Sheet 7

Inventors:
Franklin A. Stearn
John C. McAuliffe
by 〈signature〉 Atty.

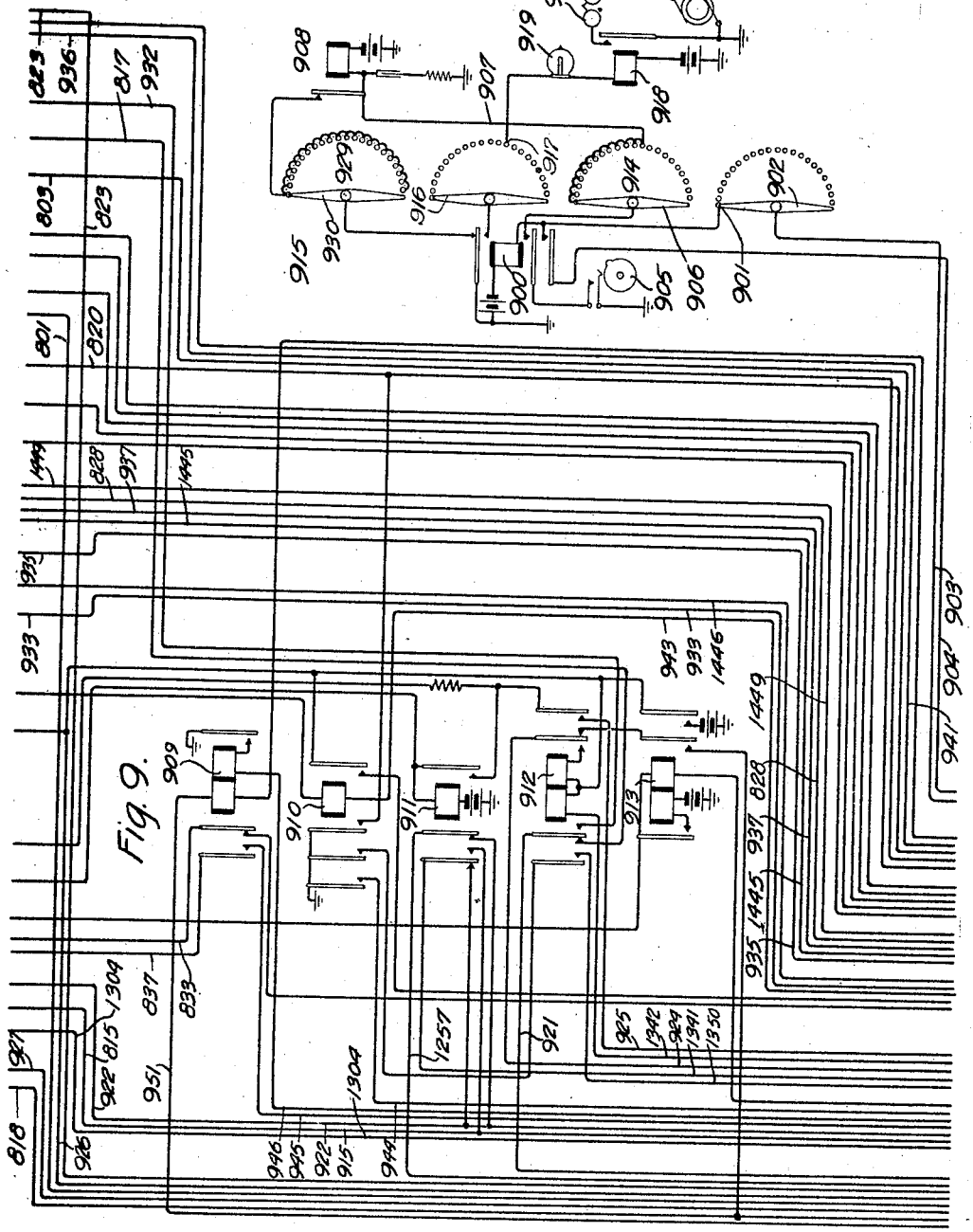

April 14, 1925.
F. A. STEARN ET AL
1,533,477
ROUTINE TEST CIRCUITS FOR CENTRAL OFFICE SENDERS
Filed Sept. 23, 1922    23 Sheets-Sheet 9
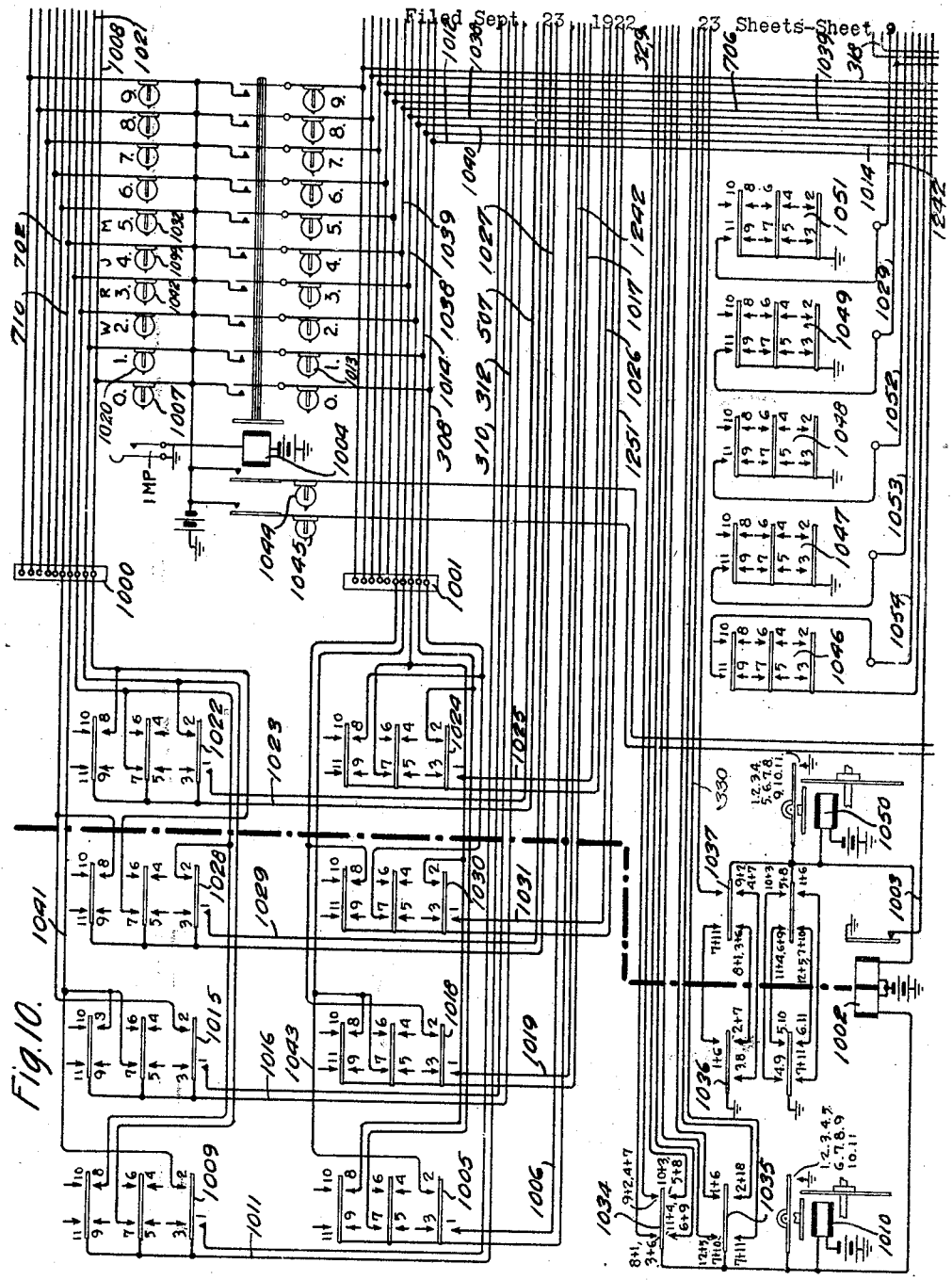
Inventors:
Franklin A. Stearn
John C. McAuliffe
by J.E.Roberts Atty April 14, 1925.
F. A. STEARN ET AL
1,533,477
ROUTINE TEST CIRCUITS FOR CENTRAL OFFICE SENDERS
Filed Sept. 23, 1922      23 Sheets-Sheet 10
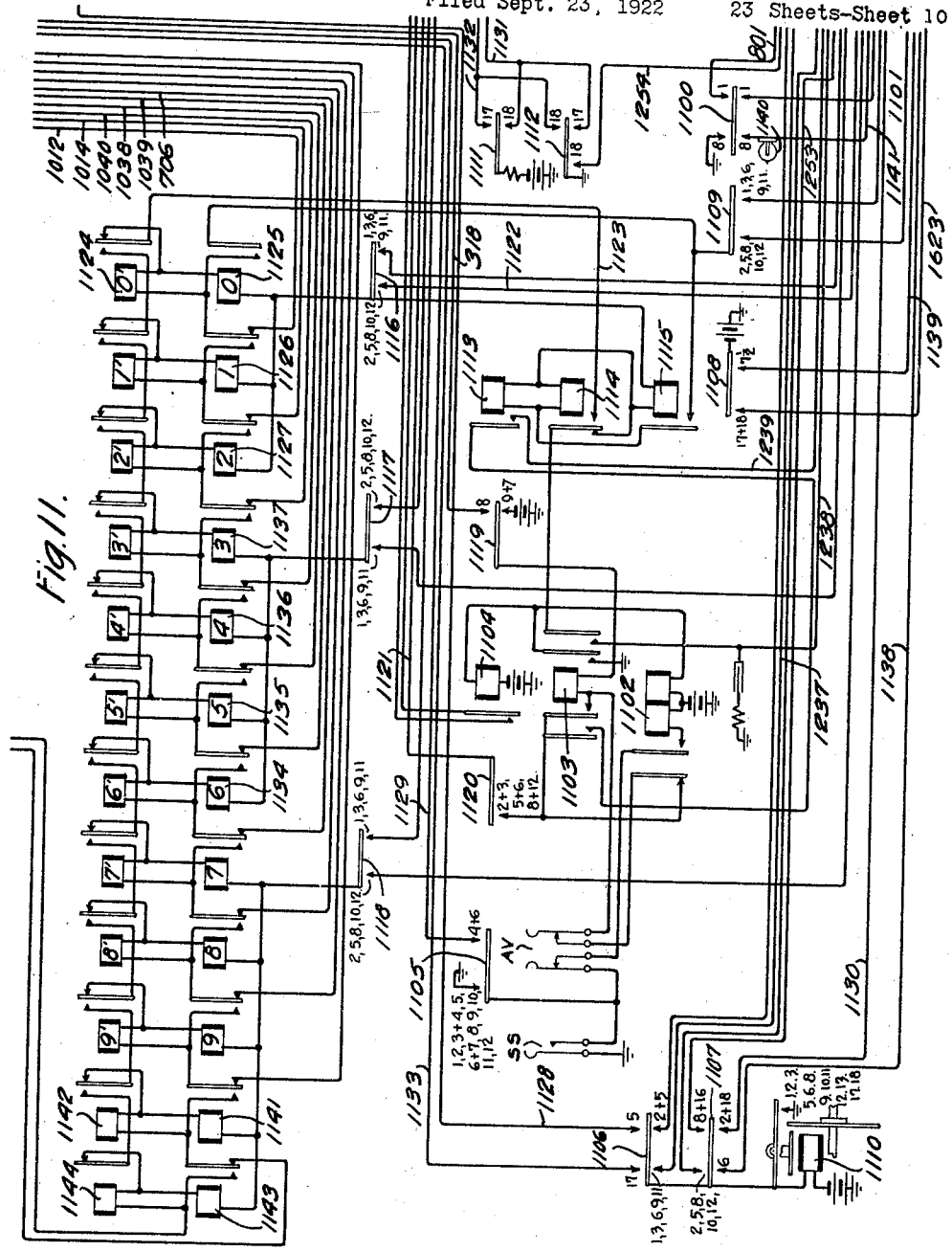
Inventors:
Franklin A. Stearn
John C. McAuliffe
by ~~~~ Atty.

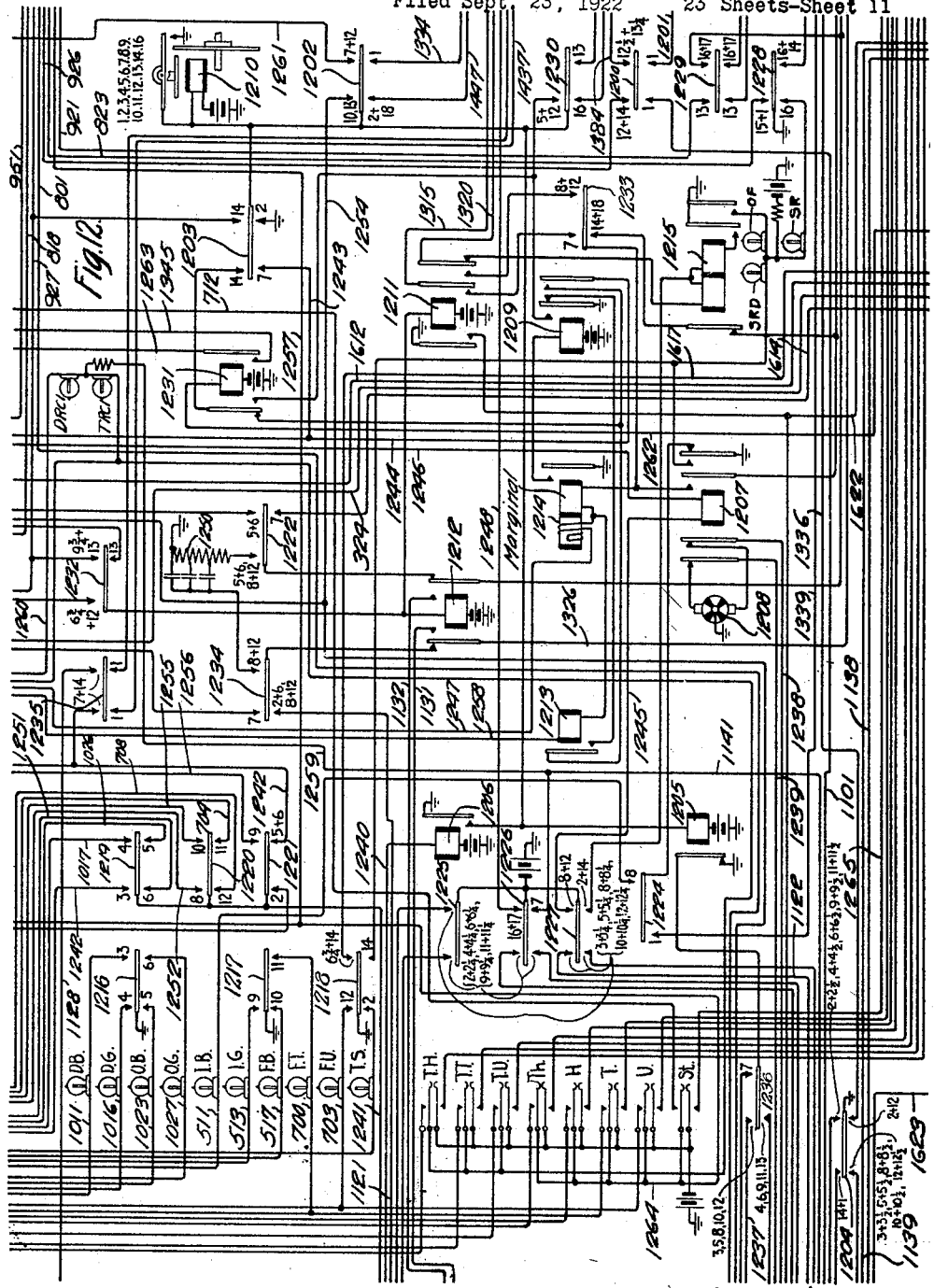

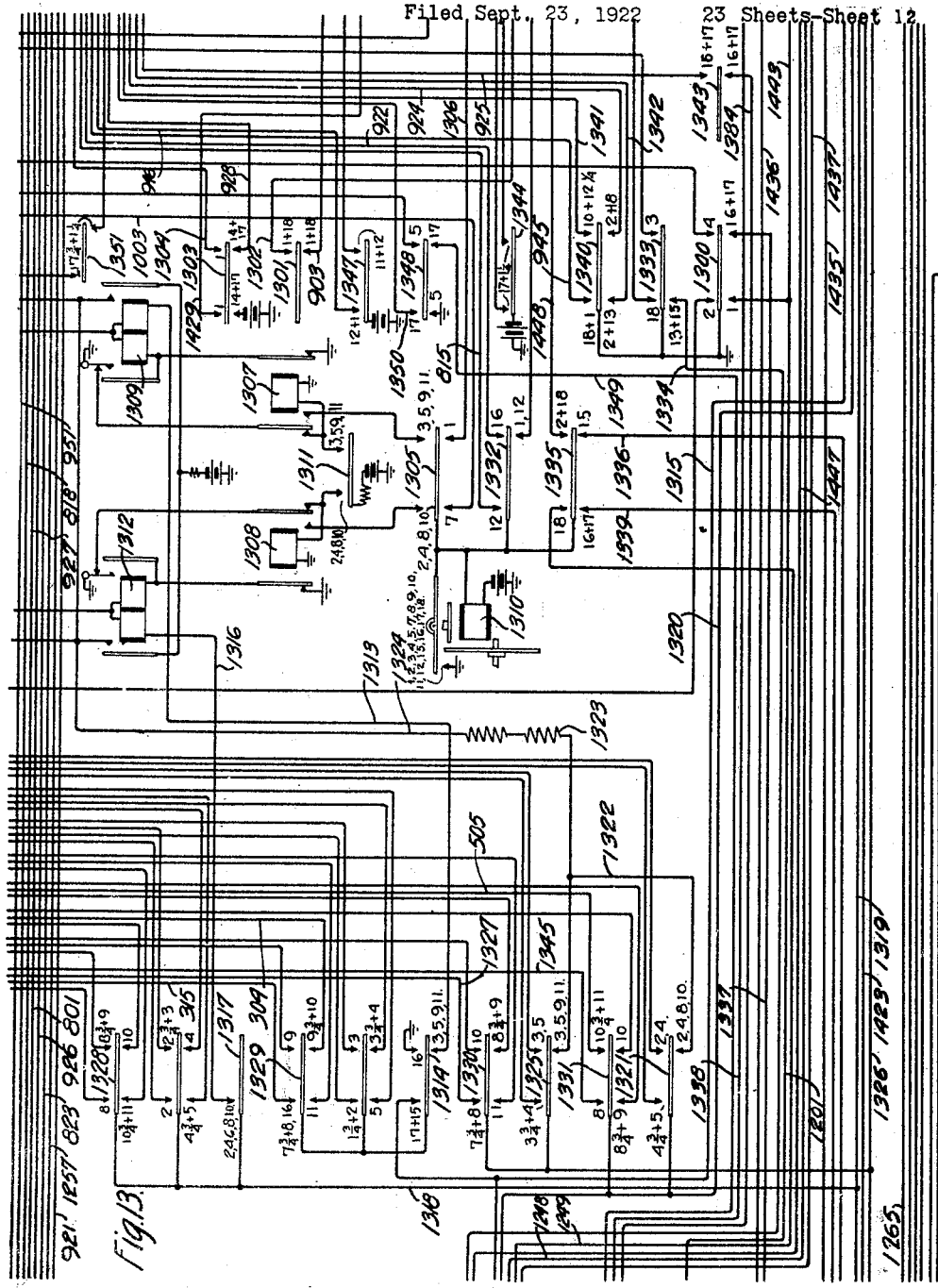

April 14, 1925.

F. A. STEARN ET AL 1,533,477

ROUTINE TEST CIRCUITS FOR CENTRAL OFFICE SENDERS

Filed Sept. 23, 1922    23 Sheets-Sheet 13

Inventors:
Franklin A. Stearn
John C. McAuliffe
by J.E. Roberts Atty.

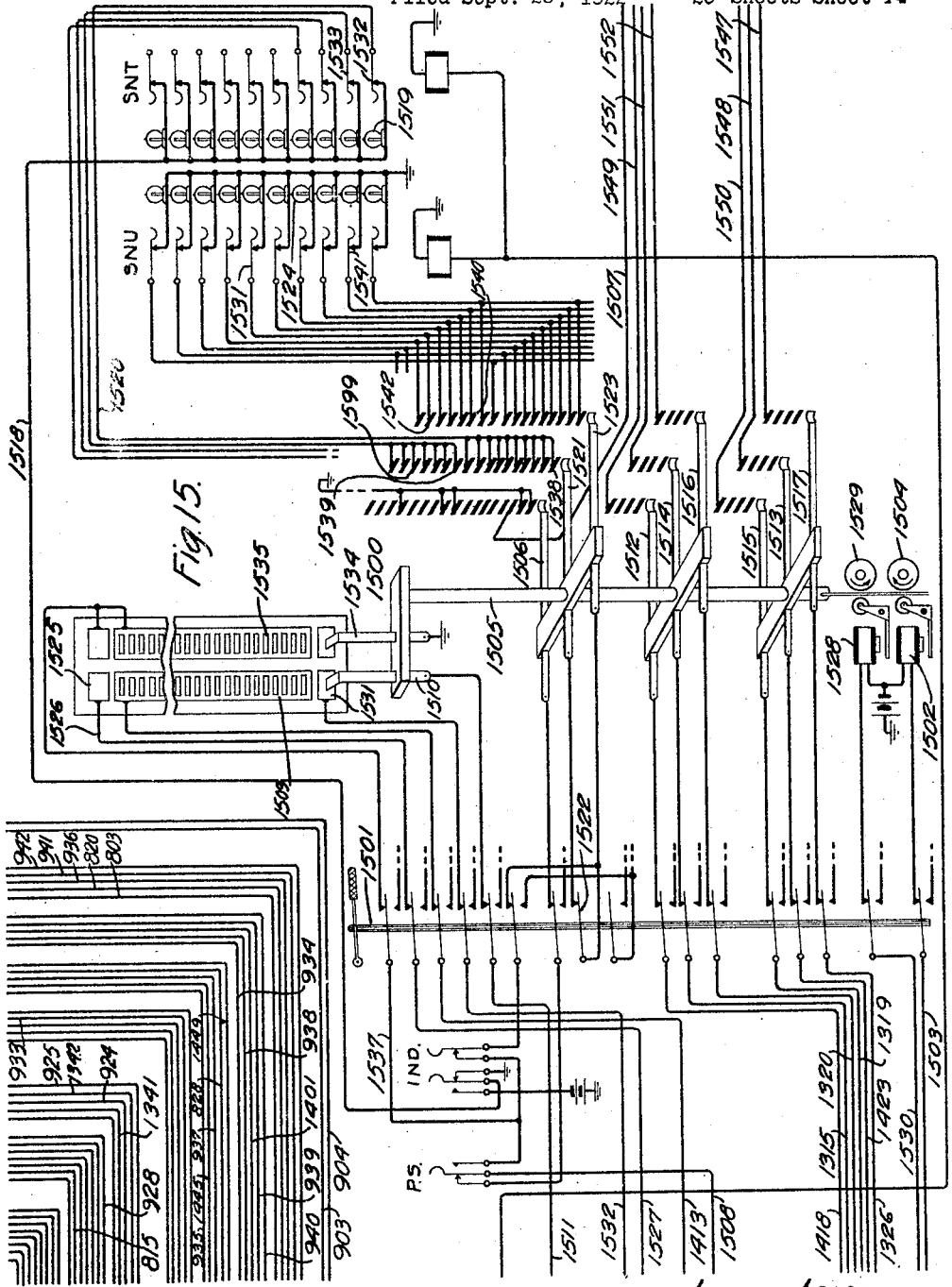

Inventors:
Franklin A. Stearn
John C. McAuliffe
by J.S. Roberts Att'y.

April 14, 1925.

F. A. STEARN ET AL 1,533,477

ROUTINE TEST CIRCUITS FOR CENTRAL OFFICE SENDERS

Filed Sept. 23, 1922   23 Sheets-Sheet 22

Inventors:
Franklin A. Stearn
John C. McAuliffe
by J.E.Roberts Atty.

Patented Apr. 14, 1925.

1,533,477

UNITED STATES PATENT OFFICE.

FRANKLIN A. STEARN, OF PATERSON, NEW JERSEY, AND JOHN C. McAULIFFE, OF BRONX, NEW YORK, ASSIGNORS TO WESTERN ELECTIRC COMPANY, INCORPORATED, OF NEW YORK, N. Y., A CORPORATION OF NEW YORK.

ROUTINE TEST CIRCUITS FOR CENTRAL-OFFICE SENDERS.

Application filed September 23, 1922. Serial No. 589,980.

*To all whom it may concern:*

Be it known that we, FRANKLIN A. STEARN and JOHN C. MCAULIFFE, citizens of the United States, residing at Paterson, in the county of Passaic, State of New Jersey, and Bronx, in the county of Bronx, State of New York, respectively, have invented certain new and useful Improvements in Routine Test Circuits for Central-Office Senders, of which the following is a full, clear, concise, and exact description.

This invention relates to telephone exchange systems, and more particularly to systems in which machine switching apparatus is employed to establish connections.

Districts embracing extensive and thickly populated areas such as the metropolitan areas of the larger cities, must be provided in order to furnish adequate telephonic communication, with an exchange system consisting of a large number of individual central offices suitably distributed throughout the entire area. Certain offices may be provided with manual operators' positions and equipment, other offices with full mechanical apparatus and still other offices with mechanism for serving as tandem points between offices which are too widely separated to warrant the expense of installing cables to all other offices of the exchange area. The manual offices, since they are accessible from offices having machine switching apparatus, are equipped with indicating mechanism upon which the numbers of desired lines terminating in such offices may be automatically displayed. Similarly, the offices which serve as tandem points are provided with indicating mechanism upon which not only the designation of a desired line may be displayed but also the designation of the office in which such line terminates.

In the offices having machine switching mechanism, district and office selector switches are provided operable in accordance with the designations of the various offices to which access is desired to extend connections to such other offices. The control of these selector switches is exercised by register senders located at the machine switching offices. These senders are also adapted to control the apparatus in the called offices whether such apparatus be automatic switches or call indicating mechanism. The complete record of a desired designation, therefore, is composed of two or more distinct parts. One is the code which identifies the particular office for which the call is destined, and governs the operation of the district and office switches to select the trunk leading to such office and another part of the designation is that which determines the number of the called line in the office and serves either to control the movement of the switches to select the line or to operate indicating mechanism to inform the operator of the identity of the line desired. Still another part of a complete designation may determine the particular tandem point through which a connection must be extended to reach a desired line in a particular office. In the latter type of connections the first part of the designation is employed to determine the route to the particular tandem point and for this purpose governs the operation of the district and office switches to select such route. The second part of the designation determines the office which is to be reached from the selected tandem point and the third part of the designation determines the line in the desired office, the last two of these designations being set up on an indicator before the operator at the tandem point. In addition to regular connections established for connecting subscribers' lines in the same or different offices, the register sender is called upon to govern the establishment of connections from subscribers' lines to various desks of the office such as the toll and information desks.

It will therefore be seen that the register sender in a mechanical office must be prepared to meet any of these various requirements and it must be able to differentiate a call of one class from a call of another class and to exercise the necessary control accurately in each case. The registered designation and particularly that part which identifies the office is what causes the sender to exercise its differentiating functions. Since the register sender is in a way the vital portion of the entire exchange system, it is essential that it be at all times in a high state of mechanical efficiency in order that the percentage of trouble due to the inaccurate establishment of connections be maintained as low as possible. Further, it is desirable that during the period of installation of the system, the efficiency of such senders be determined and any faulty construction or adjustment be eliminated before the equipment is placed in public service.

Hence the present invention has for its object to provide in a telephone exchange system of the general character outlined above a test device for performing special and routine tests upon central office senders whereby such senders are tested under all the conditions under which they may be required to function while in service.

A feature of the invention is the provision of a test device which is arranged to seize all of the senders of a group in a machine switching office in rotation and to test each sender by simulating each class of call which the sender is designed to control.

A further feature is the provision of means for determining at any stage, upon the failure of the sender under test to function accurately, the particular sender which has failed and the manner in which it has functioned inaccurately.

Another feature of the invention is the provision of means for enabling all of the senders of a group to be tested in rotation with a particular test call.

Another feature is the provision of means for enabling a particular sender to be selected and given the specified routine test for all classes of calls, and to be tested for inaccuracy in establishing a particular test call.

A still further feature resides in the provision of means for testing any or all senders for inaccuracy in establishing connections over all of the tandem routes leading from the office in which the sender or senders are located.

Still other and further features as are contemplated by the present invention will be understood from a consideration of the following description and the appended claims.

Referring to the drawings Figs. 2 to 18, inclusive, when arranged in the order illustrated by the diagram in Fig. 1 disclose in detail the circuits and apparatus of a test device for making routing tests on office senders embodying the principles of the present invention. Figs. 19 to 24, inclusive, when arranged to the right of Figs. 2 to 18, inclusive, and in the order illustrated by the aforesaid diagram show in detail the circuits and apparatus of an office sender of the type which the testing device is designed to test.

Figure 5:
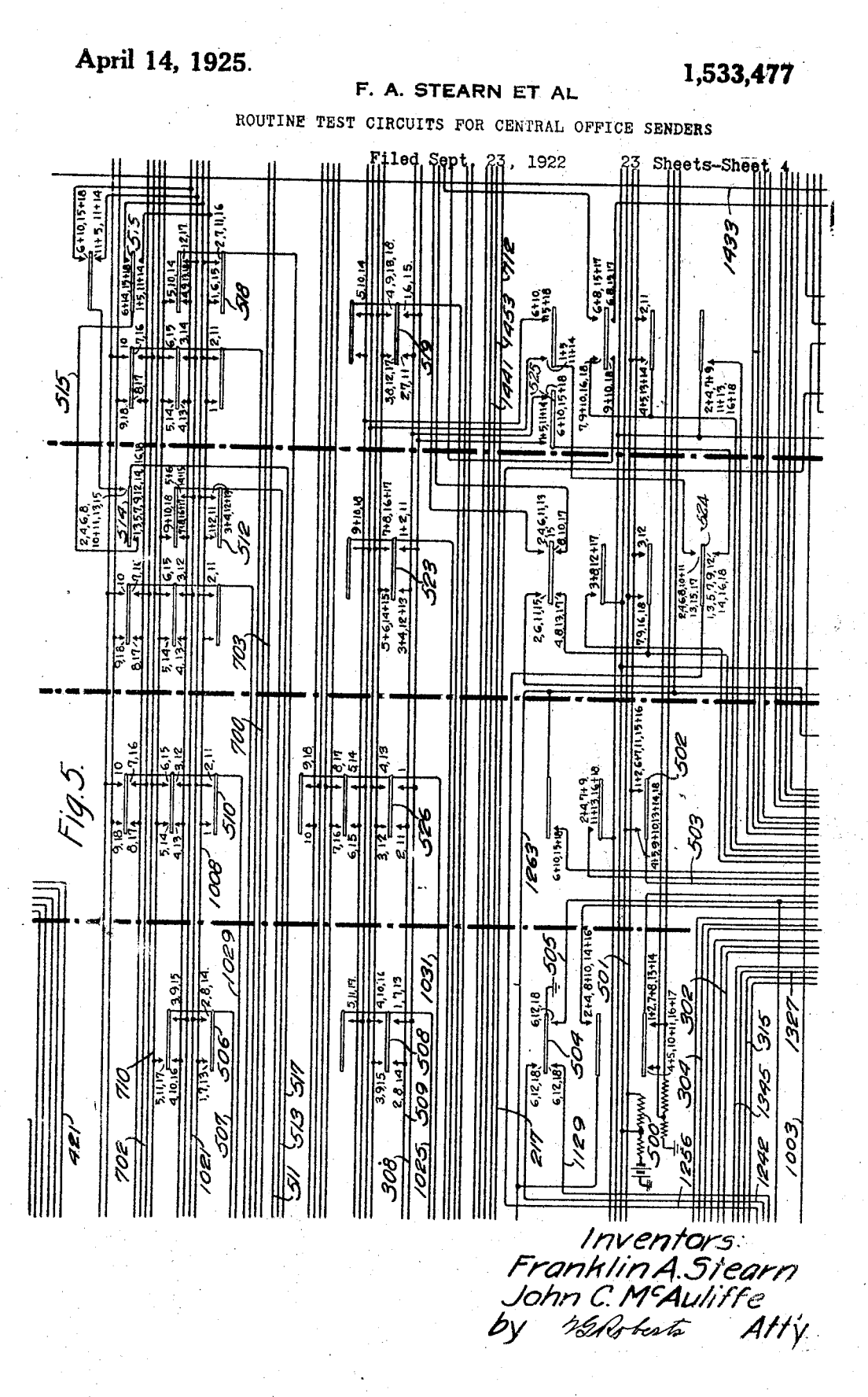
Figure 7:
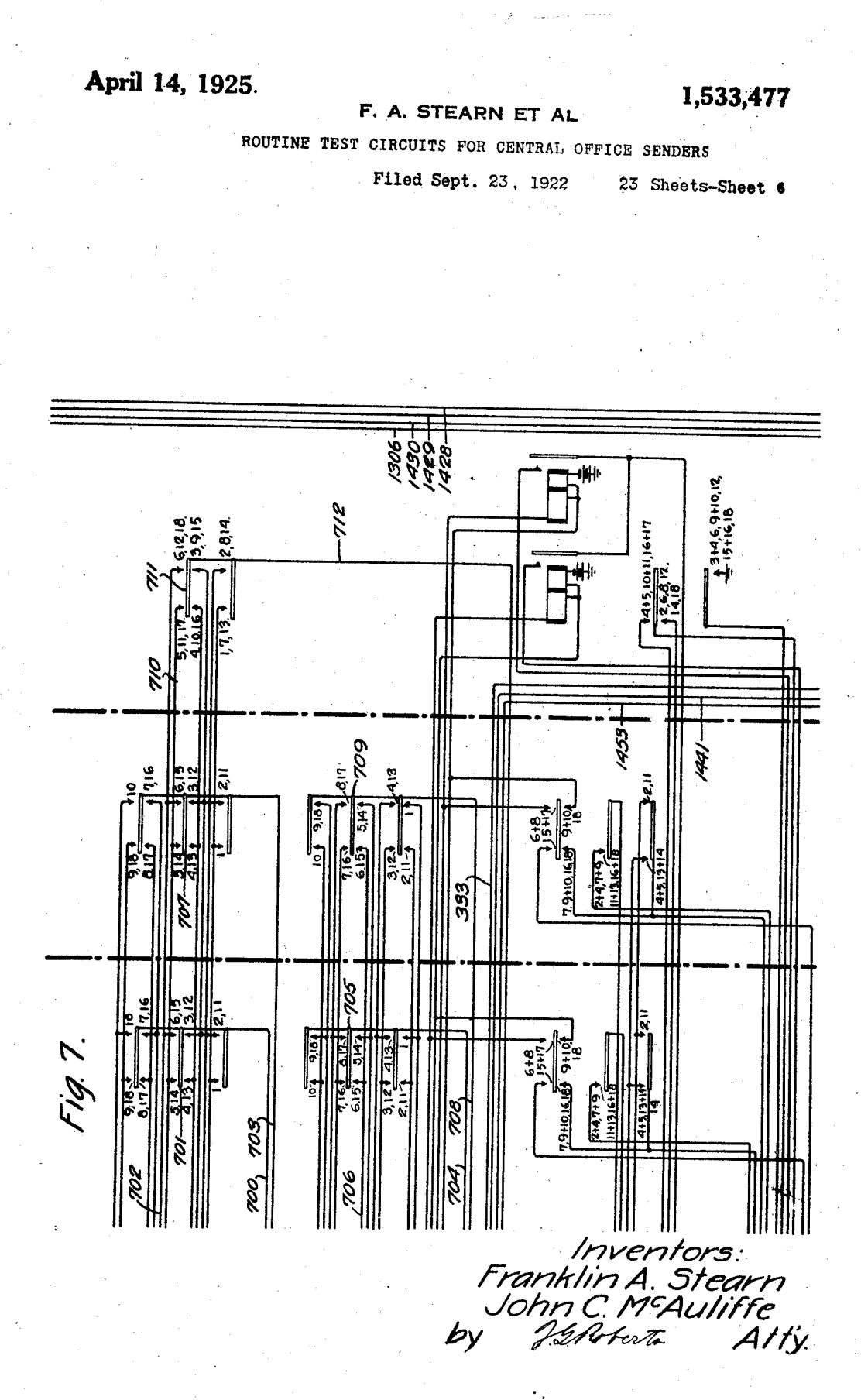

Figs. 2 to 7, inclusive, show registers which may either be set manually or automatically by the number switch shown in Figs. 8 and 9 for registering the designations of different test calls which the sender under test is to set up.

Figs. 2 and 3 taken together show the class, district brush and district group registers.

Figs. 4 and 5 taken together show the office brush, office group, thousands and hundreds registers.

Figs. 6 and 7 taken together show the tens, units and stations registers.

Fig. 8 shows a number switch of the sequence switch type arranged in its several positions to set the registers shown in Figs. 2 to 7, inclusive, for registering the designations of test calls of the different classes which the sender under test is designed to control.

Fig. 9 shows a group of controlling relays for cooperating with the number switch of Fig. 8 for controlling its operation and its effect upon the other circuits of the test device. In the right-hand portion of this figure a time measuring switch is disclosed which functions to control an alarm circuit after a predetermined interval under certain operating conditions of the circuits of the test device.

Fig. 10 shows in the upper right-hand corner two series of lamps, the upper series being designed to indicate the setting of any register of the test device and the lower series to indicate the actual operation of the sender device under test in response to such register setting. The remainder of this figure shows two switches which cooperate with each other to register the tandem group designations of all tandem group test calls which the test device may be required to control.

Fig. 11 shows an impulsing circuit for revertively controlling the sender under test and when taken with Fig. 12 simulates the operation of selector switches. The counting relays shown in the upper portion of this figure respond to the impulses transmitted to the sender under test, to register for each selective stage the number of impulses required to satisfy the sender. These relays cooperate with the lower series of lamps in Fig. 10 and with the registers shown in Figs. 2 to 7, inclusive, to control the advance of the check switch shown in Fig. 12.

Fig. 12 shows a check switch for controlling the sequential operations of the test device in accordance with the successive portions of the designation of each test call. In the upper left-hand portion of this figure a bank of lamps is illustrated which is employed to indicate the various stages in the progress of each test call. In the lower left-hand portion of this figure a bank of keys is illustrated which is employed to operate the lamps of the call indicator shown in Figs. 16 to 18, inclusive.

Fig. 13 shows a control switch which functions with the registers of Figs. 2 to 7, inclusive, to transmit codes of recording impulses to set the relay registers, Figs. 23 and 24, of the sender under test.

Figs. 14 and 15 taken together show the circuits of a selector for associating the test device with any one of a group of senders. Fig. 14 shows the control circuits of the selector and a group of keys for controlling the functions of the test device. Fig. 15 shows the operating mechanism of a sender selector and a transfer switch for associating the test device with either one of two selectors each similar to the selector disclosed and having access, respectively, to two groups of senders. A bank of lamps is illustrated in the righthand portion of Fig. 15 which is employed to indicate the frame number of the particular sender being tested.

Figs. 16 to 18, inclusive, taken together show the circuits of a call indicator for receiving call indicator code impulses transmitted by the sender under test on all call indicator test calls. Fig. 16 shows the control circuit and Figs. 17 and 18 show the lamp relays and lamps of the call indicator.

*Description of apparatus.*

The selector switch shown in Fig. 15 is in general the same in construction and operation as the switch shown in the patent to Craft and Reynolds No. 1,123,696, issued January 5, 1915, having a vertical brush shaft upon which a plurality of sets of brushes are mounted, each set of brushes serving an individual section of the terminal bank. The brushes are propelled in their setting and releasing movements by means of constantly rotating power drums against which the brush shaft is pressed by electromagnets. Unlike the switch disclosed in the aforesaid patent the brush tripping mechanism is dispensed with and the brushes are arranged to be in continual engagement with the terminals of their respective banks both in the advance and return movements of the switch.

Figure 20:
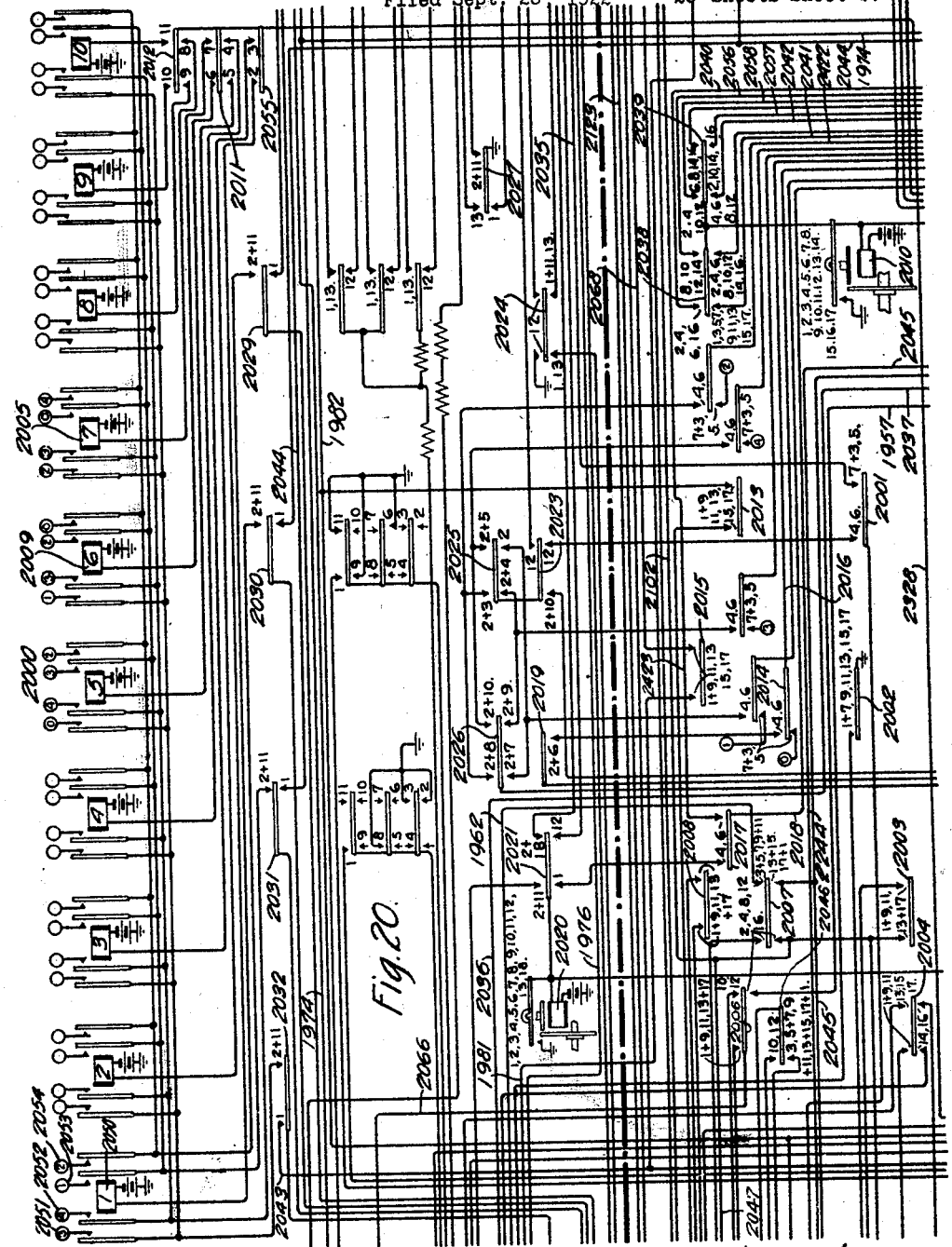
Fig. 20 shows the class switch, the tandem routing switch, and a set of register relays.
Figure 21:
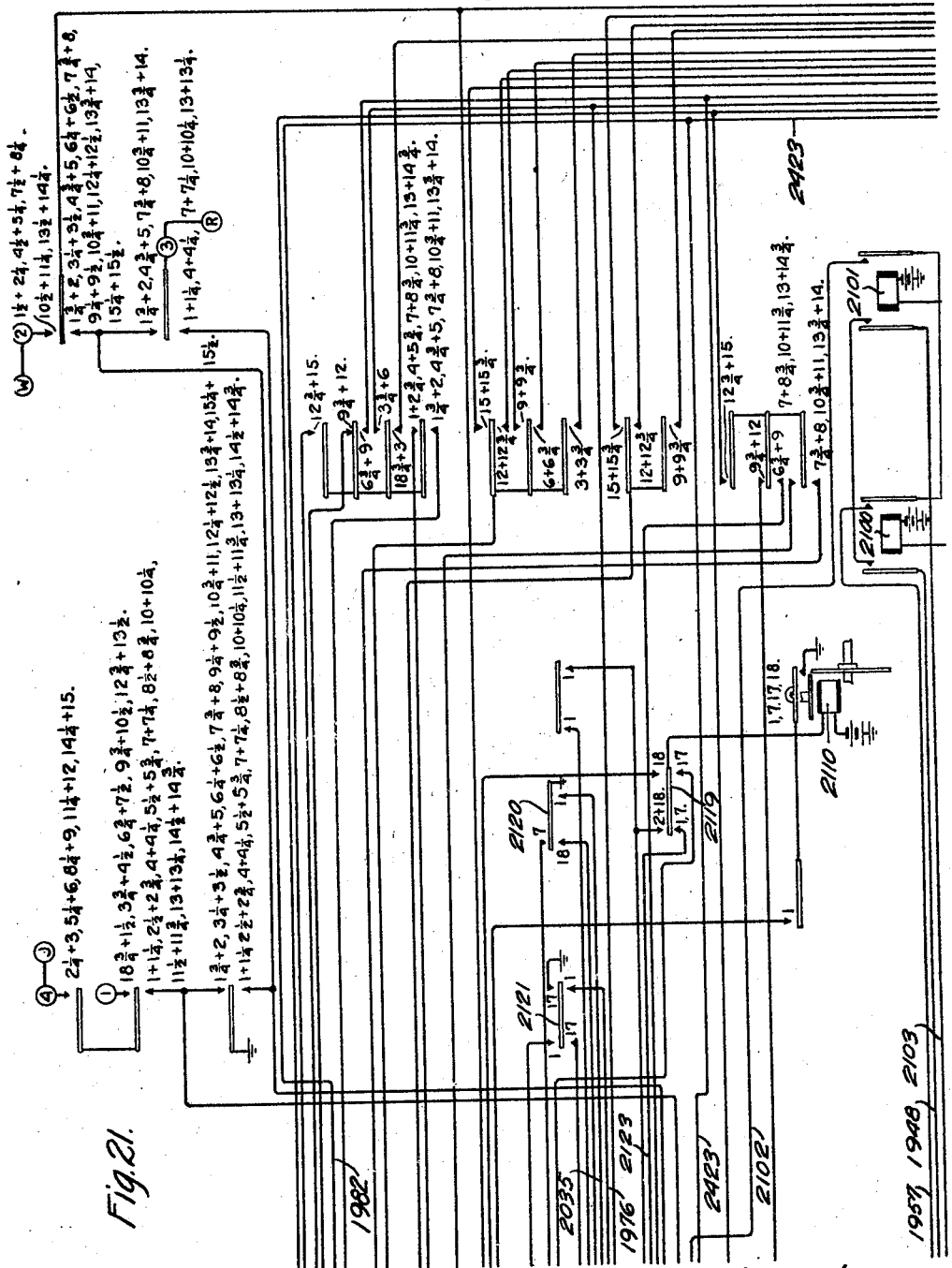
Fig. 21 shows an impulse switch, the function of which is to transmit codes of impulses for controlling call indicators in manual offices.

The switches 810, 1010, 1050, 1110, 1210, 1310, 1410, 1910, 2010, 2020, 2110, and 2210 shown in their respective figures throughout the drawings, are of the sequence switch type similar to the one disclosed in detail in the patent to Reynolds and Baldwin No. 1,127,808, patented February 9, 1915. Referring to Fig. 10, the sequence switch contacts shown to the left of the broken vertical line are a part of the tandem route register switch 1010, while those to the right of the broken line are a part of the switch 1050. These registers have no normal position. Similarly, the contacts shown above the broken horizontal line in Fig. 20 are a part of the tandem routing sequence switch 2020 of the sender, while those below the horizontal broken line are controlled by the class sequence switch 2010. The registers 210, 240, 270, 410, 430, 450, 470, 610, 640, and 670 in Figs. 2 to 7, inclusive, are also of the sequence switch type and are provided with indicating hand wheels (not shown) so that they may be set manually. All sequence switch contacts to the left of the left-hand broken vertical line in Figs. 2 and 3 are controlled by the class register 210. Similarly, the contacts directly above and below the remaining register magnets and enclosed between the broken vertical lines of Figs. 4 and 5 and Figs. 6 and 7 are controlled, respectively, by the register magnets associated therewith. These registers have no normal position.

The time measure switch shown in Fig. 9 is of the well-known step-by-step type, the wipers of which are advanced over their respective banks by a stepping magnet which is controlled by a slow operating power driven interrupter. This switch is designed to advance its wipers slowly and will, if it continues to advance them for more than a predetermined time interval, establish an alarm circuit.

To enable the test-man to control the functions of the test device for making different types of tests, a plurality of keys are provided. In Fig. 14 key ST is a locking key, and when thrown to the left locks and starts the test device into operation. If thrown to the right it restores the circuit to normal. Key PN is used when it is desired to test the senders with a particular test call other than the regular routine test calls as provided through the operation of the number switch 810. When this key is used the registers must be set manually. Key IS is used when only one sender is to be tested and in cooperation with the particular sender key PS and the sender selecting keys SNT and SNU of Fig. 15. The key TR is employed when it is required that all of the tandem route selections of the sender be tested. Unless this key is operated only two tandem route test calls are made with each sender. This key should not be operated unless the start key ST is open and the test device is in its normal position.

Key PS in Fig. 15 is operated when it is desired to cause the selector 1500 to select a particular sender. Each sender is marked for selection by an operated key in the tens row of sender number keys SNT and an operated key in the units row of sender number keys SNU. Key IND is operated when it is desired to indicate the frame number of a sender which is at the time connected to the test device by the switch 1500. The tens designation of the number is displayed by a lamp in the row associated with the row of keys SNT and the units designation by a lamp in the row associated with the row of keys SNU. The gang switch 1501 which is shown as a multi-contact double throw switch may be of any suitable construction and is employed to enable the test device to be associated with either one of two groups of senders through the brushes of two selector switches having access respectively thereto.

In Fig. 11 key SS known as the step-by-step key is provided to permit selections to be made one at a time by a sender and holds the circuits of the sender and test device in one selection stage as long as desired. The key AV known as the advance key is provided to operate in conjunction with the key SS to cause the test device to proceed with the next selection of a step-by-step test.

In Fig. 12 a bank of keys T. H., T. T., T. U., Th., H, T, U, St are shown which when operated light register or match lamps (Fig. 10) and lamps of the call indicator, Figs. 17 and 18, in case of a sender failure to show which digit indication is in error. The lamps designated DB, DG, OB, OG, IB, IG, FB, FT, FU, TS, DRCI, TRCI, SR, SRD and OF are operative during the progress of a test to indicate the stage of operation or condition for which a sender is being tested. If the sender fails, a progress lamp remains lighted indicating the point of trouble.

Figure 6:
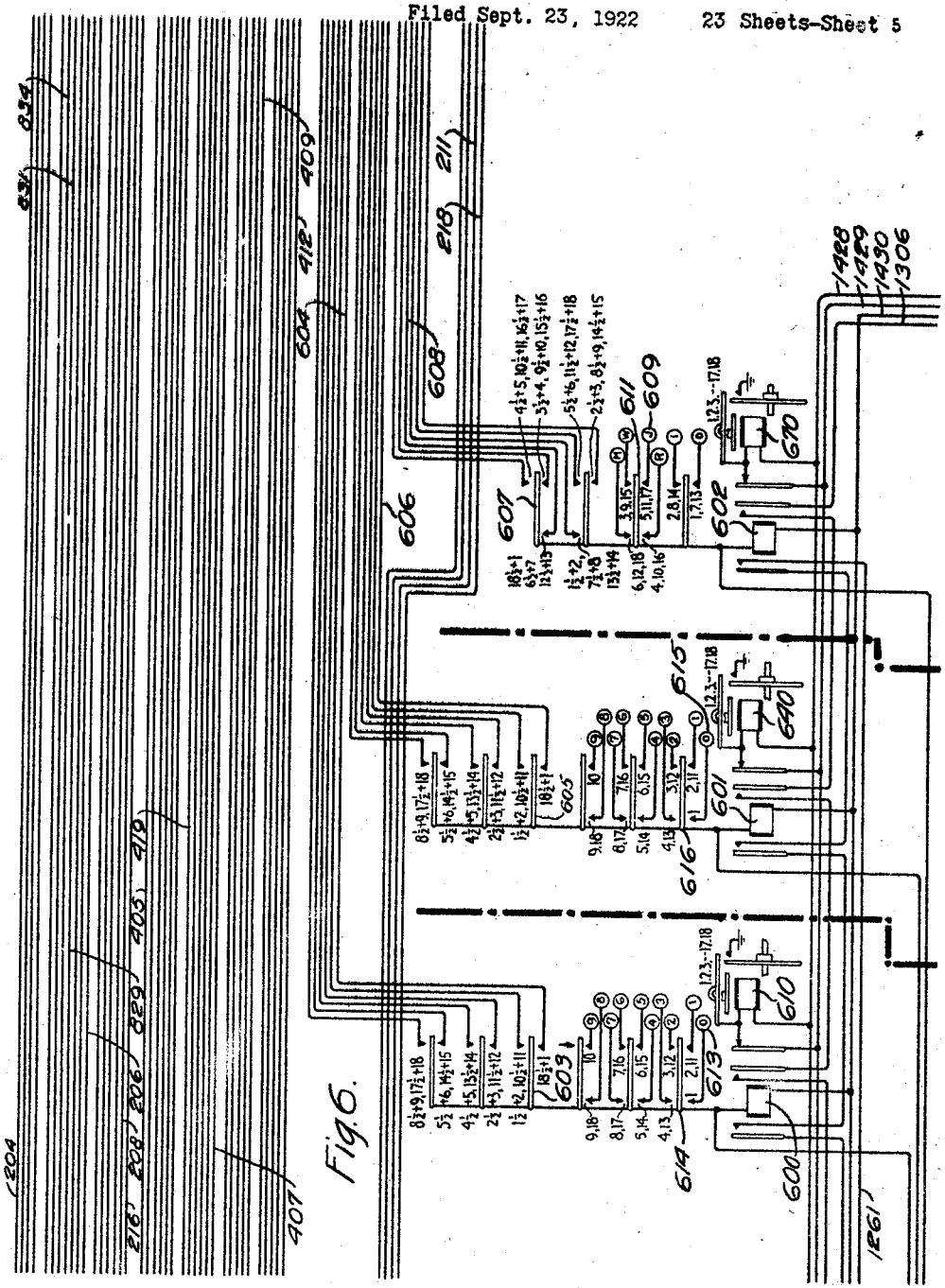
Figure 8:
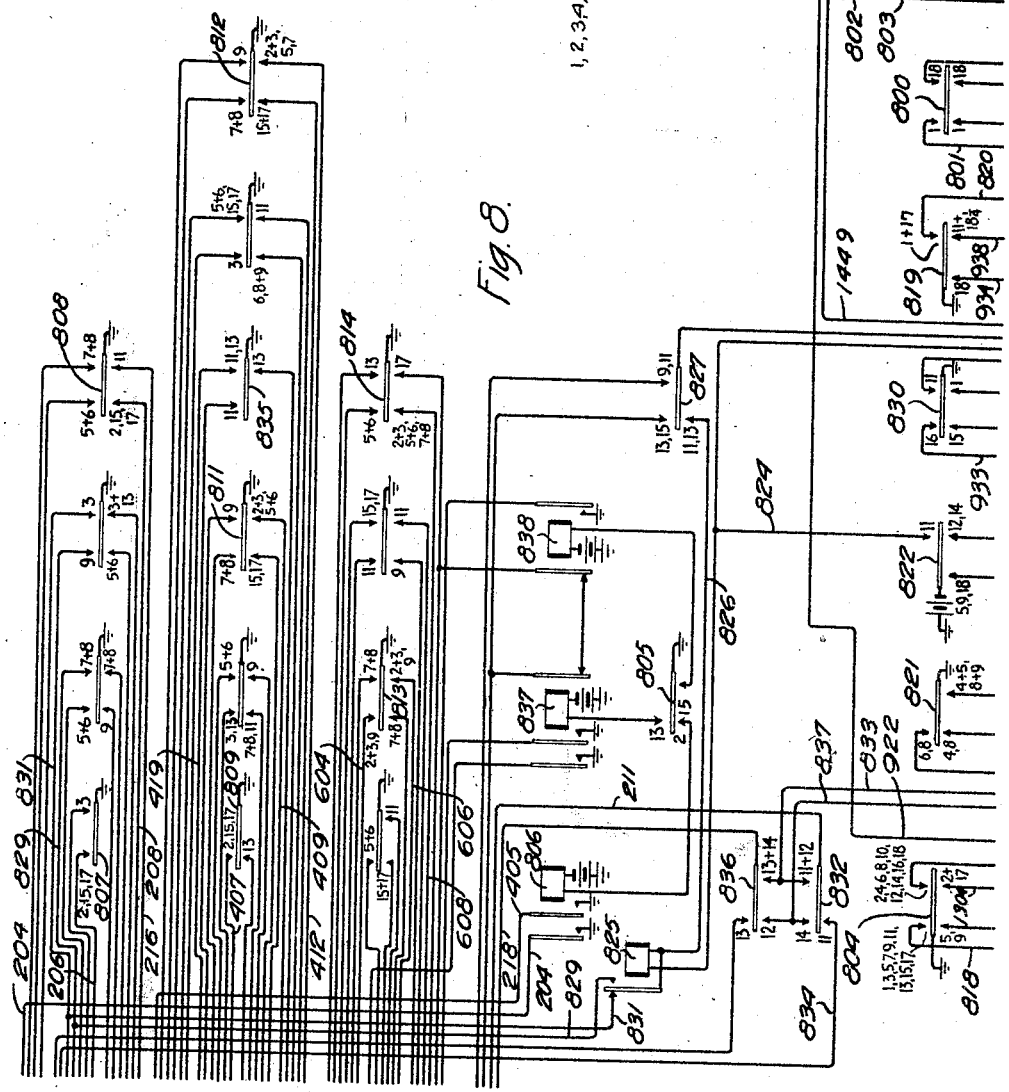
Figure 16:
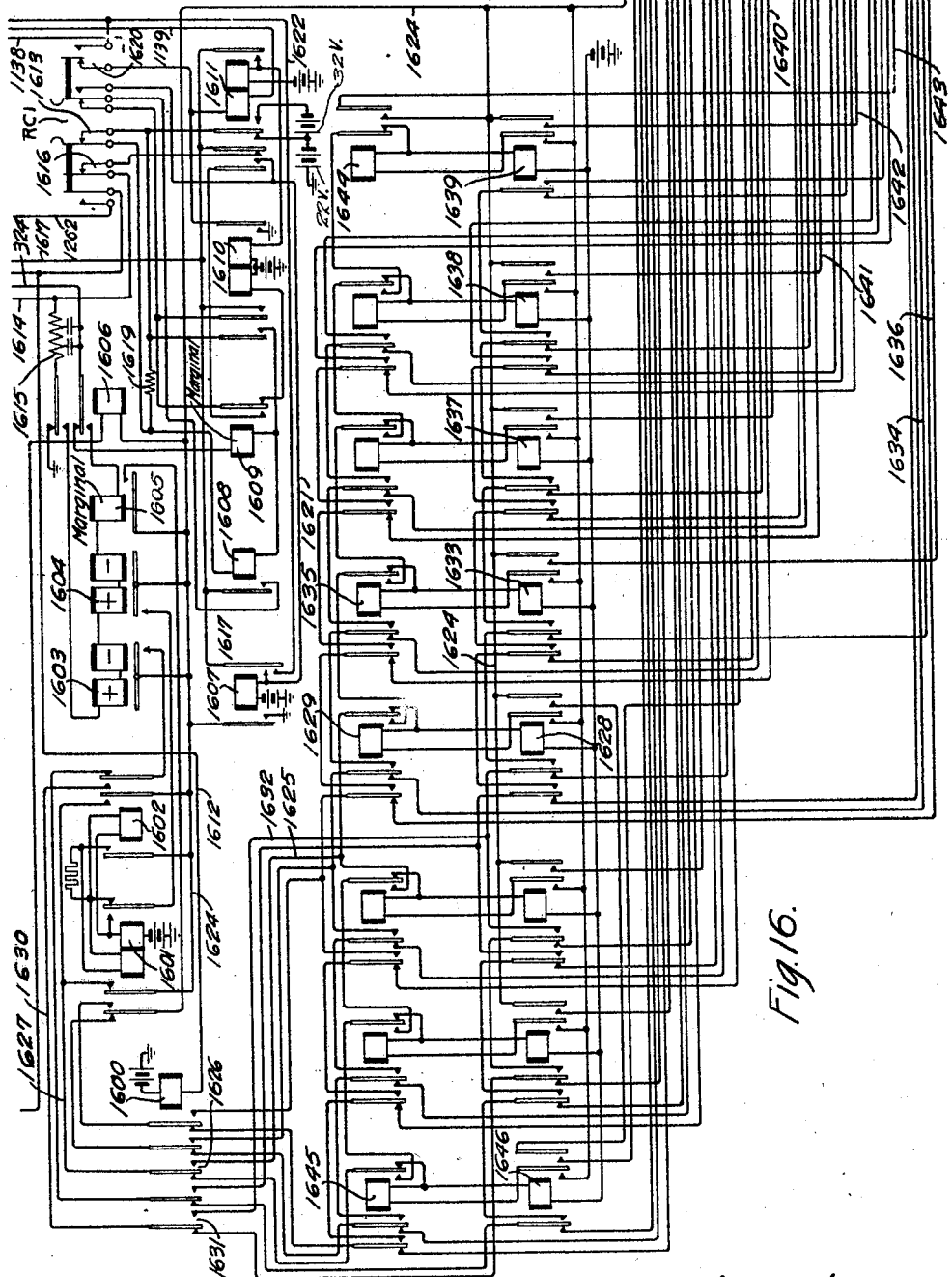

The upper series of lamps in Fig. 10 are known as register or match lamps and are flashed in unison with the progress lamps to indicate the particular digit of the test number for which the sender has failed. The lamps of the lower series are under the control of the impulse key IMP and are used to check the selections actually made by the sender under test with the test digit as indicated on the match lamps. These lamps of the lower series are selected for operation by the counting relay register of Fig. 11. The call indicator of Figs. 16, 17 and 18 and the sender of Figs. 19 to 24, inclusive, are substantially the same as disclosed and fully described in the Patent No. 1,501,871, issued July 15, 1924 to F. A. Stearn, and will not therefore be described in detail herein. To enable test calls to be made simulating calls over trunks to manual relay call indicator offices employing twenty-four volt operating battery current, the key RCI shown in Fig. 16 is provided. With this key in its normal position fifty-four volt current is used on test calls simulating calls to manual offices employing fifty-four volt battery current.

Figure 17:
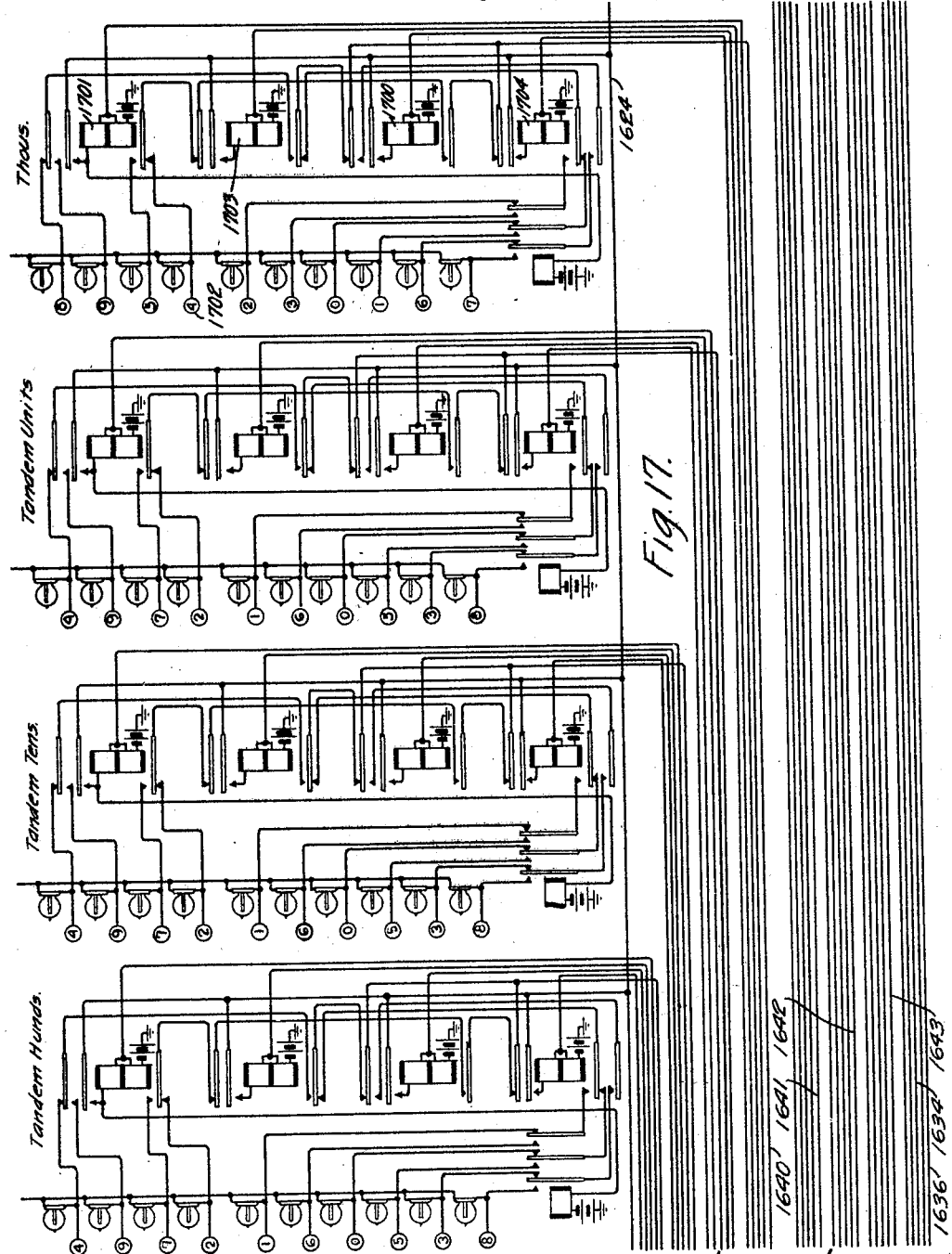
Figure 18:
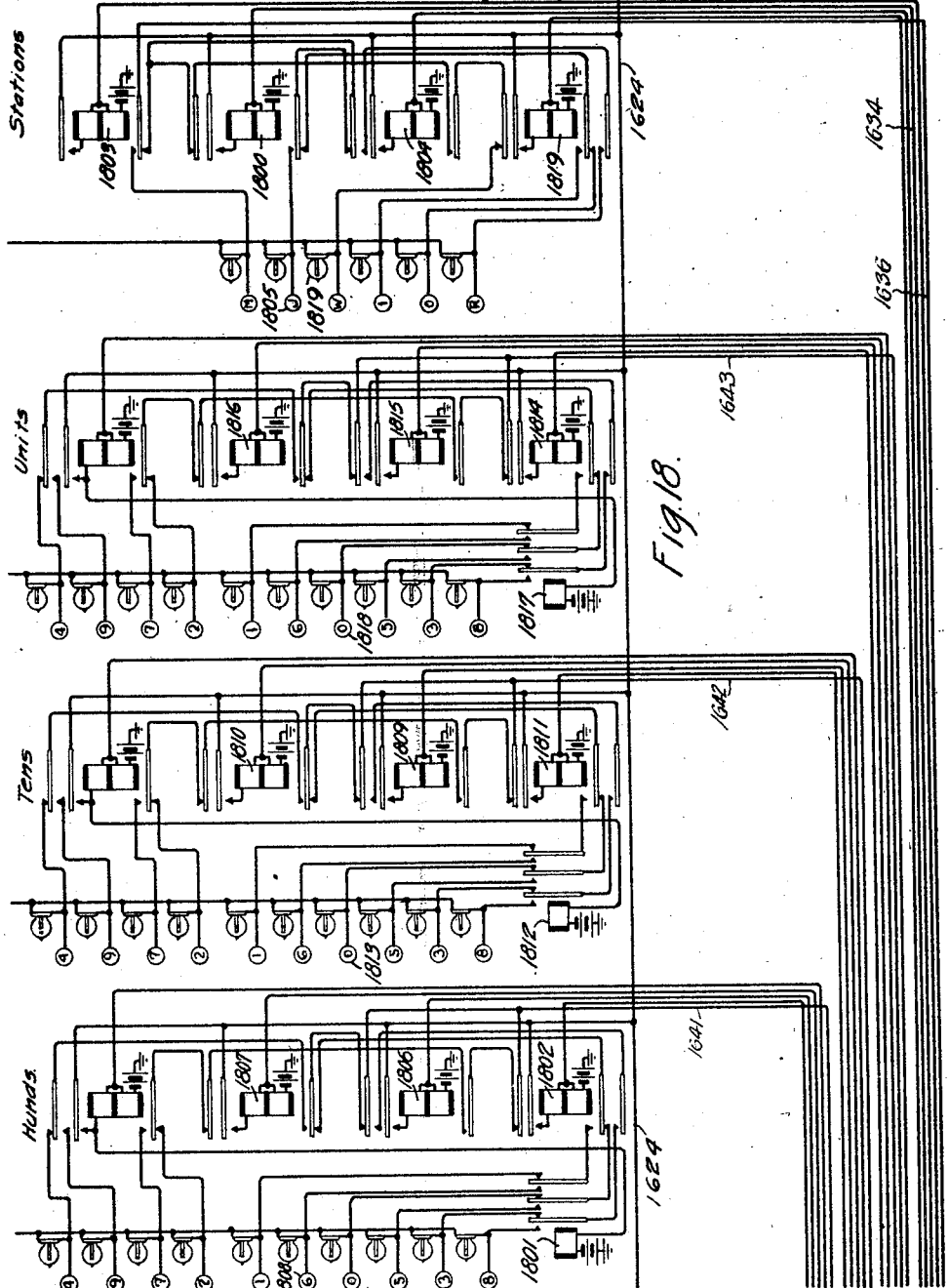
Figure 19:
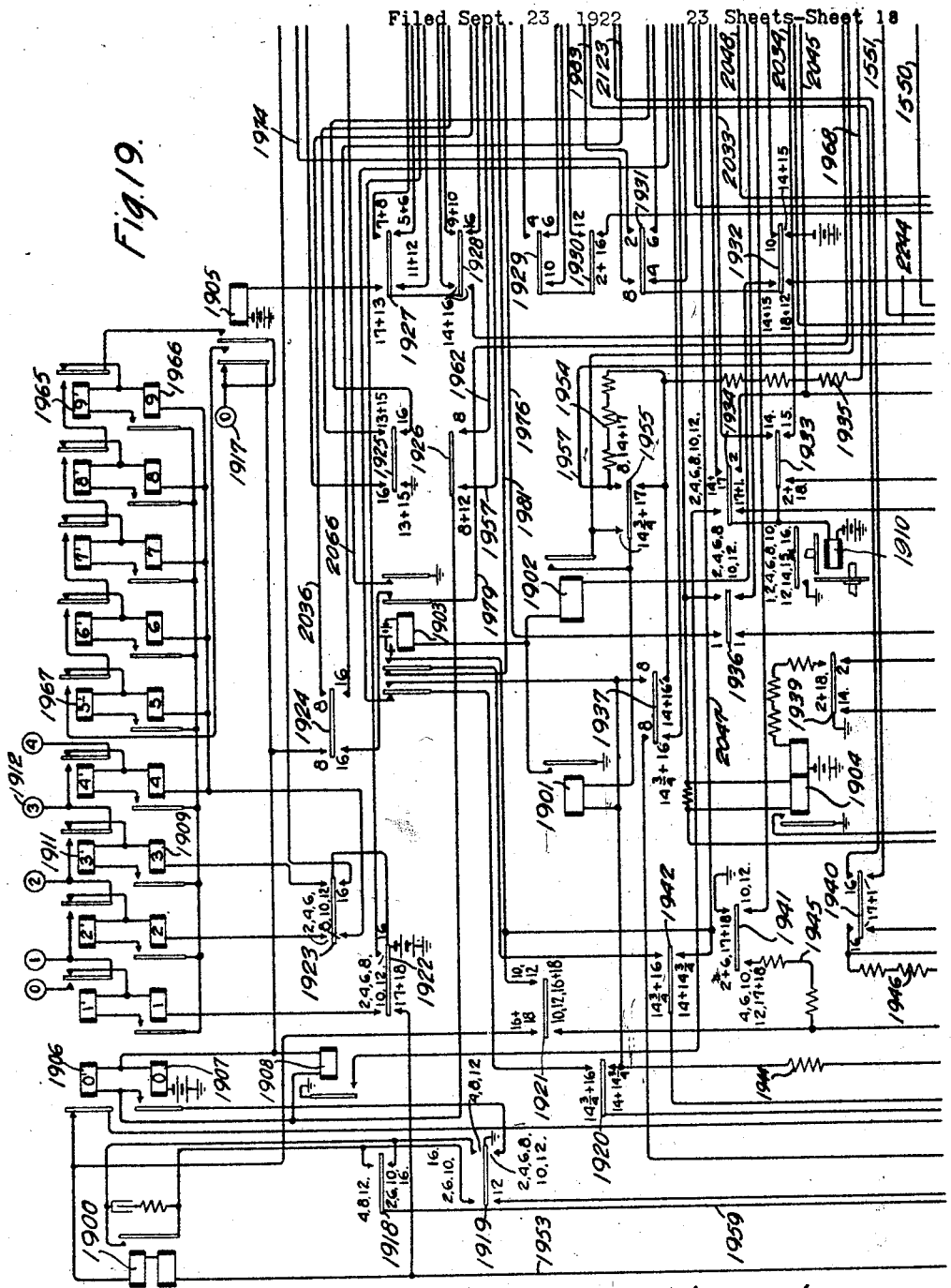
Fig. 19 illustrates the counting relays and the control circuits of a sender under test.

The leads shown as terminating in circles on the cam contacts of registers 240, 270, 430, 450, 470, 610, 640 and 670 are cross connected to the leads similarly designated appearing in the call indicator in Figs. 17 and 18. For example, the leads from the cam contacts of stations register 670 are connected to leads at the relay contacts of the stations lamp relays Fig. 18. The group of conductors terminating in the distributing rack 1000 in Fig. 10 are cross connected to the uppermost group of cam contacts of the tandem route switches 1010 and 1050, in correspondence with the cross connection of the contacts of tandem route relays 2000, Fig. 20, to the counting relays of the sender. The conductors terminating in the distributing rack 1001 are similarly cross connected to the cam contacts of switches 1010 and 1050 appearing directly to the left thereof. In a similar manner the cam contacts of route switch 1050 shown in the lower right-hand portion of Fig. 10 are cross connected to the five conductors shown as terminating immediately beneath the respective groups of cams.

*General description of operation.*

Before proceeding with the description of the operations involved in the routine testing of a group of senders, it is believed that a general description of the operation of the test device will be helpful to an understanding of the details which follow. The senders in an office of the machine switching type are usually mounted on one or more frames together with selector switches for selecting them and for associating them with controlling equipment. The routine test device which is the subject-matter of this invention, is located on an adjacent frame with the lamps and control keys positioned on a suitable desk. During the installation of an exchange system, should it be desired to test the senders of a frame to determine if they are in condition to be put into actual service or after they had been put into service, to detect any that may not be functioning properly, the test man depresses the start key ST. The sender selector switch 1500 thereupon is driven upwardly by its elevator in search of multiples of the terminals of the first sender in the group under test. Unless this sender has been put out of service temporarily, the selector will seize the first sender regardless of whether it is at the time in use in the establishment of a regular connection.

Having seized a sender, if it is at the time idle, the number switch 810 advances to its second position in which the class, district, office and numerical registers are set for the first routine test call. The number switch in its several positions during two revolutions is arranged to set the respective registers in accordance with the test call designations given in the following table:

| Sw. 810 Pos. | Class | DB | DG | OB | OG | TH | H | T | U | ST |
|---|---|---|---|---|---|---|---|---|---|---|
| 2 | Local desk skip office | 0 | 0 | 5 | 0 | 0 | 0 | 0 | 0 | 0 |
| 3 | Distant desk | 1 | 1 | 1 | 1 | 0 | 0 | 0 | 0 | 0 |
| 5 | Local semi-mechanical | 2 | 2 | 2 | 2 | 0 | 0 | 5 | 5 | 0 |
| 6 | Local semi-mechanical | 2 | 2 | 2 | 2 | 0 | 6 | 5 | 5 | 0 |
| 7 | Distant semi-mechanical | 3 | 3 | 3 | 3 | 7 | 0 | 1 | 1 | 0 |
| 8 | Distant semi-mechanical | 3 | 9 | 3 | 3 | 7 | 6 | 1 | 1 | 0 |
| 9 | Local relay call indicator | 4 | 4 | 4 | 4 | 4 | 6 | 0 | 0 | J |
| 11 | Local relay call indicator | 3 | 5 | 0 | 5 | 7 | 4 | 2 | 2 | R |
| 13 | Distant relay call indicator | 4 | 1 | 0 | 1 | 9 | 8 | 8 | 8 | W |
| 15 | Distant relay call indicator | 0 | 0 | 2 | 0 | 2 | 2 | 4 | 4 | M |
| 17 | Distant relay call indicator | 0 | 0 | 2 | 0 | 2 | 2 | 4 | 4 | I |
| 11 | Tandem route 1 | 8 | 5 | ---- | 5 | 7 | 4 | 2 | 2 | R |
| 12 | Tandem route 2 | 8 | 5 | ---- | 5 | 7 | 4 | 2 | 2 | R |
| 12 | Tandem route 3 | 8 | 5 | ---- | 5 | 7 | 4 | 2 | 2 | R |
| 12 | Tandem route 4 | 8 | 5 | ---- | 5 | 7 | 4 | 2 | 2 | R |
| 12 | Tandem route 5 | 8 | 5 | ---- | 5 | 7 | 4 | 2 | 2 | R |
| 13 | Tandem route 6 | 9 | 1 | ---- | 1 | 9 | 8 | 8 | 8 | W |
| 14 | Tandem route 7 | 9 | 1 | ---- | 1 | 9 | 8 | 8 | 8 | W |
| 14 | Tandem route 8 | 9 | 1 | ---- | 1 | 9 | 8 | 8+ | 8 | W |
| 14 | Tandem route 9 | 9 | 1 | ---- | 1 | 9 | 8 | 8 | 8 | W |
| 14 | Tandem route 10 | 9 | 1 | ---- | 1 | 9 | 8 | 8 | 8 | W |

Figure 23:
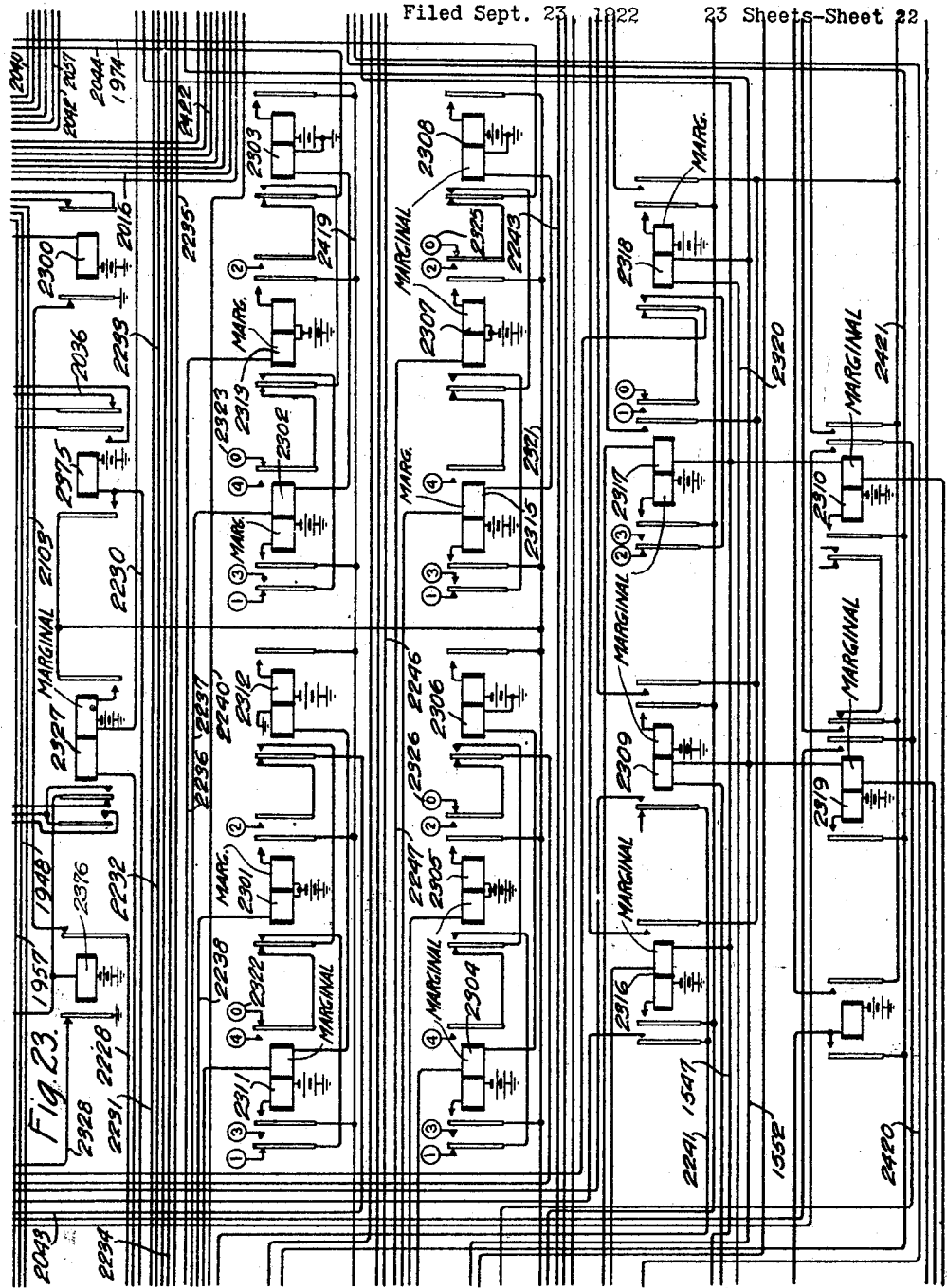
Figs. 23 and 24 illustrate the class, district, office, numerical, and station registers of the sender.
Figure 24:
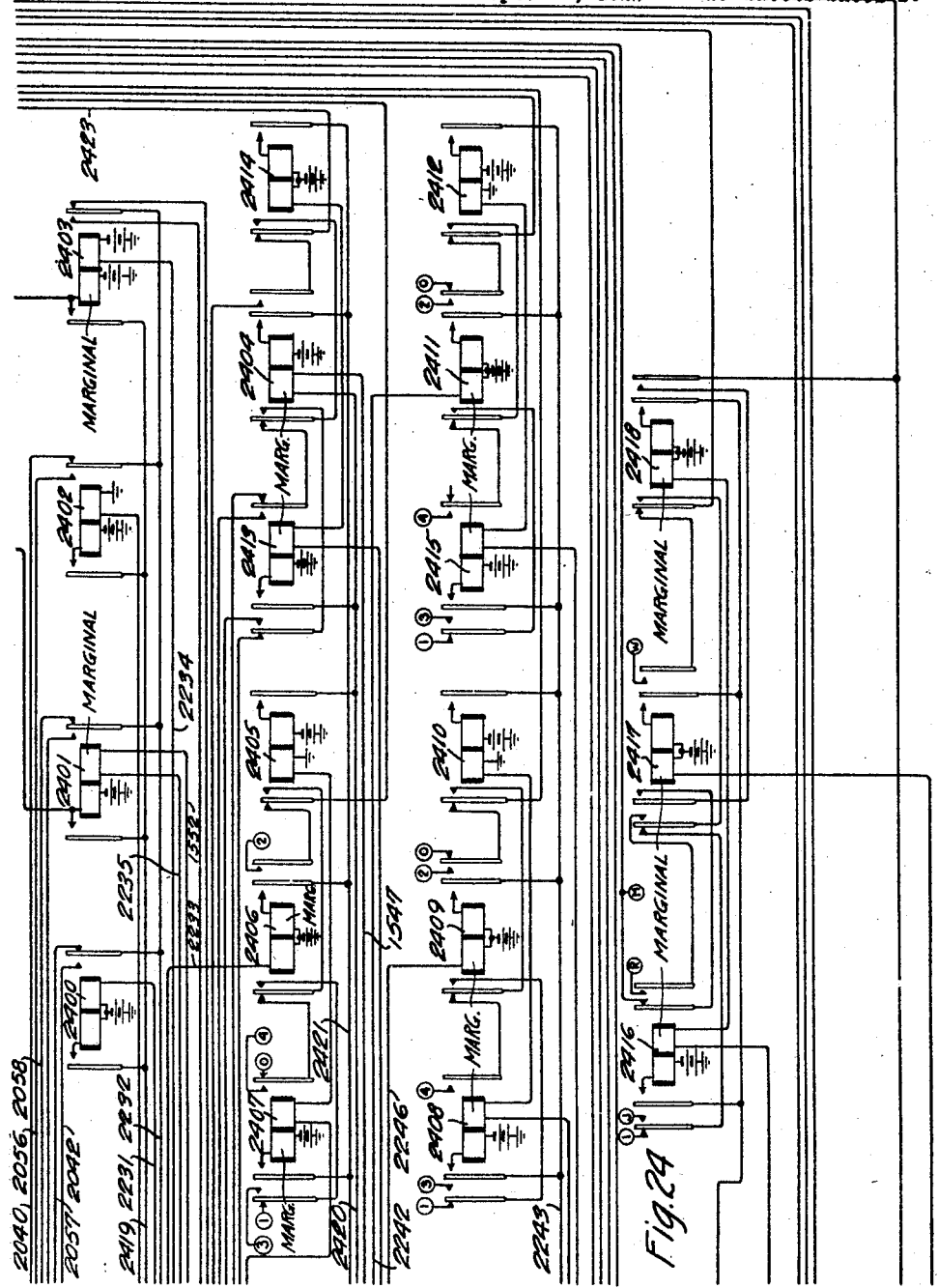

As soon as the registers have been set in accordance with the designation of the first test call the control switch 1310, in conjunction with the register control switch 2210 of the sender under test, proceeds to transmit groups of recording impulses over the brushes of the selector switch 1500 for transferring the setting of the registers of the test device to the relay registers Figs. 23 and 24 of the sender under test. With this accomplished the check switch 1210 advances to close a fundamental circuit extending from the sender to the impulse circuit and counting relay register shown in Fig. 11. The sender under test now proceeds to control district brush selection in accordance with the setting of its district brush register relays and when its counting relays have been satisfied, opens the fundamental circuit. At the counting relay register, Fig. 11, a pair of counting relays is operated each time a pair of counting relays at the sending device is operated, so that when the district brush selection is completed the number of counting relays operated in the register Fig. 11 corresponds to the number of counting relays operated in the sender under test. If the sender has functioned accurately in accordance with the district brush registration transmitted thereto from the testing device, the check switch 1210 is automatically advanced to prepare the fundamental circuit for the next selection stage. If the sender has not functioned accurately the check switch does not advance and after the elapse of six minutes the time switch 915 shown in Fig. 9 operates an alarm, and as at this time the district brush progress lamp DB and a matching lamp of the upper series in Fig. 10, are lighted, the test man is informed as to the particular selection which is being tested and may by operating the key IMP ascertain the actual operation of the sender. Each selective movement controlled by the sender is in this manner checked in successive positions of the check switch and if the entire test call has been accurately established by the sender under test, the number switch is advanced to reset the registers of the test device in accordance with the designation of the next test call. Each test call is checked in this manner until the number switch is set into a position for testing the sender for the establishment of relay call indicator calls.

In checking relay call indicator calls the district and office selections are checked in the manner heretofore set forth. The code impulses transmitted by the sender in accordance with the numerical portion of the test call designation function, in the well known manner to register the numerical designation on the call indicator shown in Figs. 16 to 18, inclusive. If the sender operates accurately for each relay call indicator test call, the number switch automatically advances to set the registers of the test device for the next test call.

For checking the sender on tandem route calls the office brush register 410 of the test device is set into a position for determining the particular tandem route to be tested and in turn controls the setting of the tandem route switches 1010 and 1050, Fig. 10. The district brush, district group and office group registers 240, 270 and 430, respectively, are set in accordance with the tandem hundreds, tandem tens and tandem units designations of the tandem route test calls. The test device then functions to test the sender for the establishment of the tandem route call in much the same manner as relay call indicator test calls are put through.

When all of the routine test calls have been established by the sender under test the sender selector switch 1500 is advanced to release the sender just tested and to seize another sender. The sender now seized is tested with all of the test calls and if found to function accurately on all test calls, is released and another sender is seized. In this manner all senders are tested and upon completion of the test of the last sender, the selector switch 1500 is automatically restored to its normal position whereupon if the start key is still depressed the test of all the senders will again be repeated.

*Detailed description of operation.*

It will be assumed that the test device is in its normal position and that the test man desires to start a routine test of a group of senders, one of which is disclosed in Figs. 19 to 24, inclusive, and depresses the start key ST. With key ST depressed a circuit is closed for advancing sequence switch 1410 out of its normal position into position 2, extending from battery through the magnet winding of switch 1410, the upper left-contact of cam 1400 (1), the lower right-hand contact of key ST, conductor 1401, the left-contacts of cam 800 (1), conductor 801, the right contacts of cam 1100 (1), conductor 1101, the lower contacts of cam 1200 (1), conductor 1201 and thence to ground at the lower left contact of cam 1300 (1). Under the control of its master cam, sequence switch 1410 advances into position 2 and closes a circuit for relay 1402 from battery through the left winding of relay 1402, conductor 1403, the armature and back contact of relay 1404, conductor 1405 and to ground at the lower right contact of cam 1406 (2 to 3). Relay 1402 upon energizing closes a circuit from ground at the inner left armature and back contact of relay 1409, through the left armature and front contact of relay 1402, conductor 1408 and the upper right contact of cam 1407 (2) for advancing sequence switch 1410 into position 3. Upon the operation of the start key a start circuit is also established for the time measure switch 915 extending from battery through the winding of relay 900, normal contact 901 of the lowermost bank of switch 915, wiper 902, conductor 903, to ground at the upper right contact of key ST. Relay 900, upon energizing, locks over its lower armature and contact, conductor 904, conductor 1302, contacts of cam 1301 (1+18), conductor 903 to ground at the contact of key ST and cam 1411 (2+12), and closes a circuit extending from battery through the winding of stepping magnet 908, conductor 907, the strapped terminals of bank 914, wiper 906, the intermediate armature and contact of relay 900 to ground through the contact closed by interrupter cam 905. Under the control of interrupter 905 the time measure switch proceeds to advance its wipers slowly over their respective banks for a purpose to be described hereinafter.

When sequence switch 1410 reaches position 3 a circuit is established for the updrive magnet 1502 of selector switch 1500, which may be traced from battery through the winding of magnet 1502, normal contact of gang switch 1501, conductor 1503, the left contacts of cam 1412 (3), the left armature and front contact of relay 1402 and thence to ground at the inner left armature and back contact of relay 1409. Upon the energization of the updrive magnet 1502, the depending portion of switch shaft 1505 is pressed against the updrive drum 1504 and the brush sets carried by the switch shaft are advanced upwardly over their respective banks of terminals. As long as brush 1506 engages test terminals corresponding to uninstalled or unequipped senders, a permanent ground is encountered and also ground potential is encountered on test terminals of senders which have been temporarily removed from service by the insertion of plugs in the make busy jacks 2275 of such senders. It will be assumed that the first two test terminals encountered by the brush 1506 correspond to senders which are unequipped and that the third test terminal corresponds to a sender which has been temporarily made busy. Upon encountering the third test terminal a circuit is established over brush 1506 from ground at make busy jack 2275, conductor 1507, brush 1506, a normal contact of switch 1501, the normal contact of key PS, conductor 1508, the normal contact of the inner right armature of relay 1409 and thence to battery through the inner right armature and front contact and right winding of relay 1402. Relay 1402 is thus locked energized, maintaining the circuit of the updrive magnet 1502. When the test brush 1506 encounters the next test terminal in its bank no ground is encountered and the locking circuit previously traced for relay 1402 is opened, but relay 1402 is still maintained energized until the brushes are properly centered upon the fourth set of terminals of their respective banks, which terminals are assumed to lead to the first sender to be tested. This centering locking circuit may be traced from battery through the right winding, inner right armature and front contact of relay 1402, conductor 1413, commutator segment 1509, commutator brush 1510, conductor 1511 and to ground through the lower right-contact of cam 1411 (2 to 3). The ground on segment 1509 which maintains relay 1402 locked also energizes relay 1404 over a circuit extending from ground on conductor 1413, the outer left armature of relay 1409, the left winding of relay 1404 and to battery at the lower contact of cam 1414 (3). Upon its energization relay 1404 closes a locking circuit for itself from battery at cam 1414, through the right winding of relay 1404, its armature and front contact, conductor 1405 to ground at the lower right contact of cam 1406 (2 to 3) and opens at its armature and back contact the initial energizing circuit of relay 1402. When, therefore, the brushes are properly centered, commutator brush 1510 engages an insulating portion of segment 1509 and the second locking circuit of relay 1402 is opened, whereupon this relay deenergizes and closes a circuit for advancing sequence switch 1410 out of position 3 and into position 4, this circuit extending from battery, the magnet winding of sequence switch 1410, the lower contact of cam 1407 (3), the left armature and back contact of relay 1402 and to ground at the inner left armature and back contact of relay 1409. The advance of sequence switch 1410 from position 3 into position 4 opens the circuit of the updrive magnet 1502 and the locking circuit of relay 1404.

Upon the advance of sequence switch 1410 into position 2 a circuit was closed for relay 1415 extending from battery through the winding of this relay and to ground over the upper right contact of cam 1406 (2 to 3½) and this relay was locked over a circuit extending from its right armature and front contact, conductor 1417, the upper contact of cam 1416 (3¾ to 5), conductor 1418, brush 1512, conductor 1549, the right winding of relay 2200 and to ground at the lower contact of cam 2205, as soon as sequence switch 1410 reached position 3¾ provided that the sender to be tested was at the time busy. Relay 1415 being energized at the time sequence switch 1410 reached position 4, the sequence switch is not able to advance out of position 4 so long as the sender under test is busy and if such sender is not available for test within a period of six minutes, the time measure switch 915 will have advanced to a point where its wiper 916 engages the bank terminal 917 establishing a circuit for the relay 918 and the lamp 919, extending from battery through the winding of relay 918, lamp 919, terminal 917, wiper 916 and to ground at the upper armature and front contact of relay 900. Relay 918 energizes and closes an obvious circuit for the alarm bell 920 which in view of the fact that lamp 1435 is now lighted over the right contacts of cam 1432 (4) informs the test man that the sender under test is in a stuck position.

Figure 22:
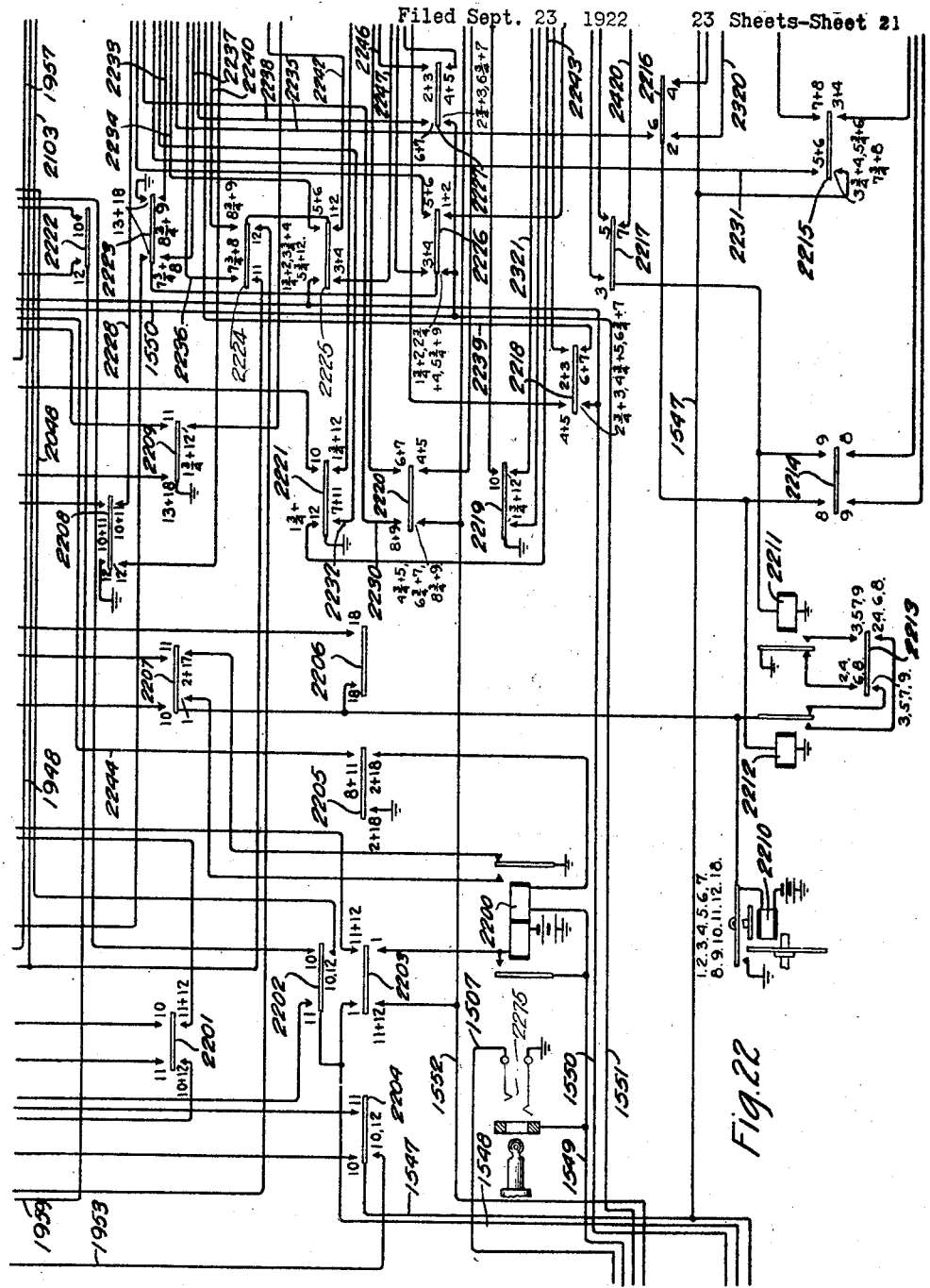
Fig. 22 shows the register control switch which serves to direct the recording impulses transmitted to the sender from primary registers in actual practice or from the control switch of Fig. 13 to the registers shown in Figs. 23 and 24.

If the sender to be tested is idle at the time the sequence switch 1410 advances out of position 3½, the locking circuit for relay 1415 as previously traced is open and relay 1415 deenergizes. When sequence switch 1410 reaches position 4, a circuit is effective over the lower right contact of cam 1419 (4), conductor 1420 and to ground at the left armature and back contact of relay 1415 for advancing sequence switch 1410 into position 5. With sequence switch 1410 in position 5 a circuit is established for relay 1421 which may be traced from ground through the left winding of relay 1421, the lower left contact of cam 1422, (5 to 6) conductor 1423, brush 1513, conductor 1548, the upper left and lower right contacts of cam 2203 (1) and to battery through the left winding of relay 2200. Relays 1421 and 2200 energize in this circuit, relay 2200 establishing a locking circuit over its left armature, conductor 1549, brush 1512, conductor 1418, the upper contact of cam 1416 (3¾ to 5), conductor 1417 and to ground at the right armature and back contact of relay 1415. Relay 2200 also closes a circuit for advancing sequence switch 2210 into position 2 which may be traced from battery through the magnet winding of switch 2210, the lower left contact of cam 2207 (1) thence to ground at the right armature and front contact of relay 2200. With switch 2210 in position 2 the circuits of Fig. 22 are in condition for the reception of the first series of code impulses for setting the register relays of the sender. At the test device upon the energization of relay 1421 a locking circuit is established for this relay extending from battery through the right contacts of cam 1412 (4 to 6), the right winding and right armature of relay 1421 to ground at the lower contacts of cam 1424 (4 to 6) and at a normal contact of key PN. This locking circuit is in shunt of the left winding of relay 1421. Relay 1421 also establishes a circuit for advancing sequence switch 1410 out of position 5 into position 8, extending from battery, the magnet winding of switch 1410, the left contact of cam 1425 (5), conductor 1426 and to ground at the left armature and contact of relay 1421. When sequence switch 1410 leaves position 5, holding ground is supplied to conductor 1418 for holding relay 2200 locked, over the lower contact of cam 1416 (5 to 12) conductor 1435, and the right contact of check switch cam 1228 (16+14).

As soon as sequence switch 1410 reaches position 7 a circuit is established for advancing number switch 810 into position 2 preparatory to setting the registers of the test device in accordance with the designation of the first test call. This circuit extends from battery through the magnet winding of switch 810, the lower left contact of cam 802 (1), conductor 803, the innermost left normal contact of key PN, the outer left armature and back contact of relay 1434 and to ground at the lower left contact of cam 1406 (7 to 8). With number switch 810 in position 2 the power circuit for advancing all of the registers 210, 240, 270, 410, 430, 450, 470, 610, 640 and 670 is established. The circuit for the magnet winding of register 210, for example may be traced from battery through the contact of cam 1427 (8 to 9), conductor 1428, the magnet winding of register 210, outer armature and back contact of relay 200, conductor 1429, the upper contacts of cam 1303 (1), conductor 1304, to ground at the lower right contact of cam 804 (2 to 17).

Under the assumption that the first call, with number switch in position 2, is in simulation of a call to a local desk skipping office selections, the designation of which in accordance with the foregoing table is 0 0 5 0 0 0 0, the class switch must be set in position 5, the district brush, district group, office group thousands, hundreds, tens, units and stations registers must be set into position 1. It is to be noted in this connection that local desk tie lines are usually terminated directly in the banks of the district selectors, so that in making connections to such local desks, it is not necessary for the sender to control office selections. When the class register, therefore, reaches position 5 a circuit is closed for the stop relay 200 which may be traced from battery through the upper right contact of cam 1344 (17 to 1¼), the left contacts of cam 1432, (8 to 9), conductor 1433, the winding of relay 200, the upper contact of cam 203 (4½ to 5), conductor 204 and thence to ground at the outer left armature and contact of relay 806. Relay 806 operated over the lower left contact of cam 805 when the number switch 810 reached position 2. As soon as the stop relay 200 energizes the circuit of the register magnet 210 is opened at the outer armature and back contact of relay 200.

When the district brush register 240 reaches position 1 a circuit is established for the stop relay 201 extending from battery on conductor 1433, through the winding of relay 201, the lower contact of cam 205 (18½ to 1), conductor 206 and to ground at the left contact of cam 807 (2). Relay 201, upon energizing, opens the driving circuit of magnet 240 to arrest the register in position 1. When district group register 270 reaches position 1 its driving circuit is opened at the armature and back contact of stop relay 202. Relay 202 energizes over a circuit extending from battery on the conductor 1433 over the upper contact of cam 207 (18½ to 1), conductor 208 to ground at the lower left contact of cam 808 (2). When the office brush register 410 reaches position 6 the driving circuit for its magnet is opened at the armature and back contact of stop relay 400. The relay 400 energizes over a circuit extending from battery on conductor 1433 through the left contact of cam 404 (5½ to 6), conductor 405 to ground at the inner armature and front contact of relay 806. When the office group register 430 reaches position 1, its driving circuit is open at the armature and back contact of stop relay 401, which relay is at the time energized over a circuit extending from battery on conductor 1433, the lower contact of cam 406 (18½ to 1), conductor 407, to ground at the upper contact of cam 809 (2). When the thousands register 450 reaches position 1, the driving circuit of the register magnet is opened at the armature and back contact of relay 402, which relay is energized over a circuit extending from battery through the left contact of cam 1344 (17 to 1¼), the contacts of cam 1431 (8 to 9), conductor 1430, winding of relay 402, the contact of cam 408 (18½ to 1), conductor 409, to ground at the lower right contact of cam 811 (2). As soon as the hundreds register 470 reaches position 1, the driving circuit of its magnet is opened at the armature and back contact of stop relay 403, relay 403 being energized over a circuit extending from battery on conductor 1430, the contact of cam 411 (18½ to 1), conductor 412 to ground at the lower right contact of cam 812 (2). When the tens register 610 reaches position 1, the operating circuit of its magnet is opened at the armature and back contact of stop relay 600, relay 600 being energized over a circuit extending from battery on conductor 1430, the lower contact of cam 603 (18½ to 1), conductor 604, to ground at the upper left contact of cam 813 (2 to 3). As soon as the units register 640 reaches position 1 the driving circuit of its magnet is opened at the armature and back contact of relay 601, this relay being energized over a circuit extending from battery on conductor 1430, the lower contact of cam 605 (18½ to 1), conductor 606, to ground at the lower right contact of cam 813 (2 to 3). In a similar manner when the stations register 670 reaches position 1 its driving circuit is opened at the armature and back contact of stop relay 602, this relay being energized in a circuit extending from battery on conductor 1430, the left contact of cam 607 (18½ to 1), conductor 608 to ground at the lower left contact of cam 814 (2 to 3).

*Transferring the registration from the registers of the test device to the relay registers of the sender under test.*

With the stop relays of all of the registers energized a circuit is established for advancing control sequence switch 1310 out of position 1 into position 2 in readiness for controlling the transmission of the first recording impulses. This circuit may be traced from battery through the magnet winding of switch 1310, the lower right contact of cam 1305 (1), conductor 1306, the inner right-hand armatures and front contacts of stop relays 602, 601, 600, 403, 402, 401, 400, 202, 201 and 200 to ground. When switch 1310 leaves position 1, the previously traced power circuit for the register magnets is opened at the contacts of cam 1303, and in leaving position 1¼, the circuits of the register stop relays are opened permitting these relays to release.

In position 2 of control switch 1310, with switch 2210 also in position 2 a circuit is closed from battery through the left contact of cam 1311 (2), thence to ground over two paths, one of which leads through the winding of relay 1308 and the other through the normally closed contacts associated with the right armature of relay 1312. Due to the shunt around the winding of relay 1308, this relay remains inert. A circuit is completed from ground through the left armature and back contact of relay 1308, both windings of relay 1312, conductor 1316, contact of cam 1317 (2), conductors 1318 and 1319, brush 1515, conductor 1550, upper left contact of cam 2225 (1¾ to 2), lower right contact of said cam (1 to 2), conductor 2242, to battery through the left winding of relay 2411. Relay 2411 is marginal and therefore does not energize in series with both windings of relay 1312. Relay 1312, however, operates and locks up in series with relay 2411 through its right armature and front contact and in operating removes the shunt from around the winding of relay 1308 whereby this latter relay becomes energized. Another circuit is closed upon the energization of relay 1312 extending from battery through the left armature and contact of relay 1312, high resistance 1323, conductor 1322, lower contact of cam 1321 (2), conductor 1320, brush 1516, conductor 1552, the left winding of relay 2318, conductor 2320, lower left contact of cam 2216 (2), winding of relay 2212 to ground. Relay 2212 operates but due to the high resistance 1323 the marginal relay 2318 remains inactive. Relay 2212 completes a circuit from battery through sequence switch magnet 2210, armature and front contact of relay 2212, lower right and upper left contacts of cam 2213, back contact and armature of relay 2211 to ground. Sequence switch 2210 moves from position 2 to position 3. In passing from position 2 into position 3 it opens the upper left and lower right contacts of cam 2225 thereby opening the holding circuit of relay 1312. Relay 1312 upon deenergizing completes a circuit from battery through the winding of sequence switch magnet 1310, upper left contact of cam 1305 (2), front contact and right armature of relay 1308 to ground at the normal right contacts of relay 1312 moving sequence switch 1310 out of position 2 and into position 3. In passing from position 2 into position 3 cam contact 1311 (2) is opened and relay 1308 releases. When relay 1312 deenergizes it opens at its left armature and contact the circuit of relay 2212 whereupon this relay becomes deenergized.

In position 3 of sequence switch 1310 a circuit is closed from battery through the right contact of cam 1311 (3) thence to ground over two paths, one of which leads through the winding of relay 1307 and the other through the normally closed left armature contacts of relay 1309. Due to the shunt around the winding of relay 1307 it fails to operate at this time. Another circuit is closed from ground through the right armature and back contact of relay 1307, both windings of relay 1309, conductor 1313, the lower contact of cam 1314 (3), the upper left contact of cam 1314 (17 to 15), conductor 1315, brush 1514, conductor 1551, the lower left contact of cam 2227 (2¾ to 3), the upper right-hand contact of said cam (2 to 3), conductor 2246, left winding of relay 2409 to battery. Relay 2409 being marginal does not energize in series with both windings of relay 1309. Relay 1309, however, operates and closes a holding circuit for itself in series with relay 2409 through the left armature and front contact of relay 1309 and removes the shunt from around the winding of relay 1307. This latter relay thereupon attracts its armatures. Upon the energization of relay 1309 a circuit is established from battery through the right armature and contact of relay 1309, high resistance 1323, the lower contact of cam 1325 (3), conductor 1326, brush 1517, conductor 1547, the right winding of relay 2317, the upper left contact of cam 2217 (3), winding of relay 2211 to ground. Relay 2211 becomes energized, but relay 2317 being marginal does not operate in series with the high resistance 1323. Relay 2211 completes a circuit from ground through its armature and front contact, upper right and lower left contacts of cam 2213 (3), back contact and armature of relay 2212, winding of sequence switch magnet 2210 to battery, driving said sequence switch into position 4. When sequence switch 2210 leaves position 3 it opens the holding circuit of relay 1309 and this relay becomes deenergized, in turn, opening the circuit of relay 2211. Relay 1309, on releasing, also completes a circuit from battery through the magnet winding of sequence switch 1310, upper right contact of cam 1305 (3), left armature and front contact of relay 1307 to ground at the left contacts of relay 1309. Sequence switch 1310 advances out of position 3 and into position 4.

In position 4 of sequence switch 1310 a circuit hereinbefore traced is closed from battery through the winding of relay 1308 and through the normally closed contacts of relay 1312 to ground, relay 1308 remaining deenergized. A circuit is also closed from ground through the left armature and contact of relay 1308, both windings of relay 1312, conductor 1316, the upper contact of cam 1317 (4), conductors 1318 and 1319, brush 1515, conductor 1550, upper left contact of cam 2225 (3¾ to 4), lower left contact of said cam (3 to 4), conductor 2247, left winding of relay 2307 to battery. Relay 2307 being marginal does not operate in series with both windings of relay 1312. Relay 1312, however, operates removing the shunt from relay 1308, allowing this latter relay to energize. Relay 1312 locks up at its right armature and front contact in series with relay 2307. Relay 1312 also closes a circuit from battery through its left armature and contact, high resistance 1323, conductor 1322, the lower contact of the cam 1321 (4), conductor 1320, brush 1516, conductor 1552, through the left winding of relay 2309, lower right contact of cam 2216 (4), winding of relay 2212 to ground. Relay 2309 being marginal does not operate but relay 2212 energizes and completes a circuit from battery through the winding of sequence switch magnet 2210, armature and front contact of relay 2212, lower right and upper left contacts of cam 2213 (4), back contact and armature of relay 2211 to ground, driving said sequence switch into position 5. On leaving position 4 sequence switch 2210 opens the circuit of relay 1312 and this relay becomes deenergized. With relay 1312 deenergized and relay 1308 energized, a circuit is closed from battery through the winding of sequence switch magnet 1310, upper left contact of cam 1305 (4), contact and right armature of relay 1308 to ground at the normal contacts of relay 1312. Sequence switch 1310 advances from position 4 into position 5. When relay 1312 deenergizes it opens the circuit of relay 2212.

In position 5 of sequence switch 1310 the above traced circuit is completed through the winding of relay 1307 and to ground at the left contacts of relay 1309, relay 1307 remaining deenergized. Another circuit is established from ground through the contact and right armature of relay 1307, both windings of relay 1309, conductor 1313, the lower contact of cam 1314 (5), the upper left contact of cam 1314 (17 to 15), conductor 1315, brush 1514, conductor 1551, lower left contact of cam 2227 (4¾ to 5), lower right contact of said cam (4 to 5), the left winding of relay 2305, to battery. Relay 2305 being marginal does not operate in series with both windings of relay 1309, but relay 1309 becomes energized and locks through its left armature and front contact in series with relay 2305. The operation of relay 1309 permits the energization of relay 1307 as described. When relay 1309 operates it closes a circuit from battery through its right armature and contact, conductor 1324, high resistance 1323, the lower contact of cam 1325 (5), thence as described to conductor 1547, the right winding of relay 2316, the upper right contact of cam 2217 (5), winding of relay 2211 to ground. The high resistance 1323 prevents the operation of marginal relay 2316 but relay 2211, operates and closes an above traced circuit for driving sequence switch 2210 into position 6. Sequence switch 2210 on leaving position 5 opens the energizing circuit of relay 1309 and this relay becoming deenergized opens the previously traced circuit of relay 2211. With relay 1309 deenergized a circuit is closed from battery through the winding of sequence switch 1310, upper right contact of cam 1305 (5), left armature and front contact of relay 1307, to ground at the left normal contacts of relay 1309, for advancing sequence switch 1310 out of position 5 and into position 7. Upon leaving position 5 relay 1307 becomes deenergized.

When sequence switch 1310 reaches position 7 a circuit is effective for advancing it into position 8, which may be traced from battery through the winding of the sequence switch, the lower left contact of cam 1305 (7), conductor 1003 to ground at the armature and back contact of relay 1002. In position 8 of sequence switch 1310, a circuit is closed from battery through the left contact of cam 1311 (8), thence in parallel through the winding of relay 1308 and through the normally closed right armature contacts of relay 1312 to ground. Relay 1308 being shunted remains deenergized. Another circuit is closed from ground at the back contact and left armature of relay 1308, through both windings of relay 1312, conductor 1316, the upper contact of cam 1317 (8), thence as previously traced to conductor 1550, upper left contact of cam 2225 (5¾ to 12), upper right contact of said cam (5 to 6), conductor 2234, right winding of relay 2403 to battery. Since relay 2403 is marginal it fails to operate, but relay 1312 attracts its armatures and locks up as above described, at the same time permitting the energization of relay 1308. Another circuit is closed from ground at the upper right contact of class register cam 300 (5 to 6), conductor 1327, upper left contact of cam 1330 (7¾ to 8), conductor 1326, thence to conductor 1547, lower left contact of cam 2215 (5¾ to 6), upper left contact of said cam (5 to 6), conductor 2231, right winding of relay 2400 to battery. Relay 2400 operates and locks in a circuit from battery through its left winding and contact and left armature, conductor 2419, lower right contact of cam 2221 (1¾ to 12) to ground. When relay 1312 operates a circuit is closed from battery through the left armature and contact of relay 1312, the high resistance 1323, conductor 1322, the lower contact of cam 1321 (8), conductor 1320 and thence to conductor 1552, through the right winding of relay 2401, conductor 2235, the upper contact of cam 2216 (6), winding of relay 2212 to ground. Relay 2401 being marginal does not operate in this circuit in series with resistance 1323, but relay 2212 becomes energized and closes a circuit for driving sequence switch 2210 out of position 6 and into position 7. Sequence switch 2210 on reaching position 7 opens the holding circuit of relay 1312 and this relay becomes deenergized and in turn opens the circuit of relay 2212. With relay 1312 deenergized and relay 1308 energized a circuit is closed from battery through the winding of sequence switch magnet 1310, upper left contact of cam 1305 (8), contact and right armature of relay 1308, right normal contacts of relay 1312 to ground. Sequence switch 1310 moves out of position 8 and into position 9, opening the holding circuit of relay 1308 at cam 1311.

With sequence switch 1310 in position 9 and sequence switch 2210 in position 7 a circuit is closed from battery through the right contact of cam 1311 (9), thence to ground over parallel circuits, one of which leads through the winding of relay 1307 and the other directly through the normally closed contacts of relay 1309, relay 1307 being shunted is not energized. A circuit is also closed from ground through the right armature and back contact of relay 1307 through both windings of relay 1309, conductor 1313, lower contact of cam 1314 (9), the upper left contact of cam 1314 (17 to 15), conductor 1315, thence to conductor 1551, lower left contact of cam 2227 (6¾ to 7), upper left contact of said cam (6 to 7), conductor 2238, left winding of relay 2301 to battery. Relay 1309 operates and locks in series with relay 2301 through its left armature and front contact but relay 2301 being marginal does not operate. Relay 1309 upon energizing opens the shunt around the winding of relay 1307 permitting the energization of the latter relay. A circuit is also closed from battery through the high resistance 500, conductor 501, the right contact of cam 301 (1 to 2) of the district brush register, conductor 302, the upper right contact of cam 1328 (8¾ to 9), conductors 1318 and 1319, thence to conductor 1550, the lower contacts of cam 2218, conductor 2239, the right winding of relay 2311 to ground through the left winding of relay 2312. Relay 2311 being marginal does not energize in series with the high resistance 500, but relay 2312 energizes and locks through its right winding, right armature and front contact, conductor 2419 and to ground at the lower right contact of cam 2221 (1¾ to 12). Relay 1309 (upon energizing, closes a circuit extending from battery through its right armature and front contact, resistance 1323, the lower contact of cam 1325 (9), conductor 1326, thence to conductor 1547, the left winding of relay 2404, conductor 2420, the lower contact of cam 2217 (7), winding of relay 2211 to ground. Due to the inclusion of resistance 1323 in this circuit only relay 2211 operates closing an above traced circuit for advancing the sequence switch 2210 from position 7 into position 8. Sequence switch 2210 on leaving position 7 opens the holding circuit of relay 1309 and this relay, in turn, opens the energizing circuit of relay 2211. A circuit is now closed from battery through the winding of sequence switch 1310, upper right contact of cam 1305 (9), front contact and left armature of relay 1307 to ground at the normal contacts of relay 1309 for advancing sequence switch 1310 out of position 9 into position 10.

In its tenth position sequence switch 1310 closes a circuit from battery through the left contact of cam 1311 (10), thence as already traced to ground over parallel paths, one including the winding of relay 1308. At the same time a circuit is established from ground through the left armature and back contact of relay 1308, both windings of relay 1312 in series, conductor 1316, contact of cam 1317 (10), conductors 1318 and 1319, thence to conductor 1550, the upper left contact of cam 2225 (5¾ to 12), the upper left contact of cam 2224 (7¾ to 8), conductor 2236, the left winding of relay 2313 to battery. Since relay 2313 is marginal it does not operate in series with both windings of relay 1312. Relay 1312, however, attracts its armatures and locks up as hereinbefore explained permitting the energization of relay 1308. Another circuit is closed from battery through the high resistance 500, conductor 501, the right contact of cam 303 (1 to 2) of the district group register, conductor 304, the lower right contact of cam 1329 (9¾ to 10), upper left contact of cam 1314, conductor 1315, thence to conductor 1551, lower left contact of cam 2226 (5¾ to 9), lower left contact of cam 2223 (7¾ to 8), conductor 2237, the right-hand winding of relay 2302 and thence to ground through the left winding of relay 2303. Due to the inclusion of the high resistance 500, marginal relay 2302 does not energize. Relay 2303, however, energizes and locks through its right winding and right armature contact to ground on conductor 2419. When relay 1312 operates it closes a circuit from battery through its left armature and front contact, conductor 1324, high resistance 1323, conductor 1322, the lower contact of cam 1321 (10), thence to conductor 1552, the right winding of relay 2319, the lower right and upper left contacts of cam 2214 (8), winding of relay 2212 to ground, relay 2319 does not operate in series with the high resistance 1323, but relay 2212 does become energized and closes a previously traced circuit for moving sequence switch 2210 into position 9. Upon leaving position 8 said sequence switch opens the holding circuit of relay 1312, which in turn, releases and opens the energizing circuit of relay 2212. A circuit is thereupon established from battery through the winding of sequence switch magnet 1310, upper left contact of cam 1305 (10), the right armature and front contact of relay 1308 and thence to ground at the normal contacts of relay 1312, moving sequence switch 1310 into position 11.

In position 11 of sequence switch 1310 the above traced circuit is established from battery through the right contact of cam 1311 to ground through relay 1307 and also to ground at the normally closed armature contacts of relay 1309. Relay 1307 being shunted does not energize at this time. Another circuit is closed from ground through the right armature and back contact of relay 1307, both windings of relay 1309, conductor 1313, the lower contact of cam 1314 (11), thence to conductor 1551, lower left contact of cam 2226 (5¾ to 9), lower right contact of cam 2223 (8¾ to 9), conductor 2233, left winding of relay 2406 to battery. Since both windings of relay 1309 are included in this circuit marginal relay 2406 does not operate. Relay 1309, however, energizes and locks as previously described in series with relay 2406 and upon operating permits the energization of relay 1307. Another circuit is closed from battery through the high resistance 500, conductor 501, the right contact of cam 502 (1 to 2) of the office group register, conductor 503, the lower left contact of cam 1328 (10¾ to 11), thence over conductor 1550, the upper left contact of cam 2225 (5¾ to 12), the upper right contact of cam 2224 (8¾ to 9), conductor 2240, the right winding of relay 2407 and thence to ground through the left winding of relay 2405. Due to the inclusion of the high resistance 500 in this circuit, marginal relay 2407 does not energize but relay 2405 energizes and locks over a circuit from battery through its right winding and right armature contact, conductor 2421, to ground at the lower contact of cam 2209 (1¾ to 12). Another circuit is closed from ground at the lower right contact of cam 504 (6) of the office brush register, conductor 505, the upper right contact of cam 1331 (10¾ to 11), conductor 1320, thence over conductor 1552, the left contacts of cam 2220, conductor 2230 and to battery through the winding of skip office relay 2375. Relay 2375 locks through its left armature and contact over conductor 2321 to ground at the lower right contact of cam 2219. Relay 1309, upon energizing, establishes a circuit from battery through its right armature and front contact, resistance 1323, the lower contact of cam 1325 (11), thence to conductor 1547, right winding of relay 2310, the lower left and upper right contacts of cam 2214 (9), winding of relay 2211 to ground. Due to the inclusion of high resistance 1323 only relay 2211 operates closing the above traced circuit for driving sequence switch 2210 out of position 9 and into position 10. Upon leaving position 9, sequence switch 2210 opens the holding circuit of relay 1309 which deenergizes to in turn open the circuit of relay 2211. Sequence switch 1310 is driven out of position 11 and into position 12 by means of a circuit from battery through the winding of its magnet, upper right contact of cam 1305 (11), left armature and front contact of relay 1307 to ground at the normal contacts of relay 1309.

With sequence switch 1310 in position 12 a circuit is closed from ground at the upper right contact of cam 804 (2), of the number switch 810, conductor 815, the left contact of cam 1332 (12) and the winding of sequence switch magnet 1310 for advancing the sequence switch out of position 12 and into position 15. As soon as sequence switch 1310 reaches position 13 a circuit is closed for advancing the check switch 1210 out of position 1 into position 2, this circuit extending from battery through the winding of sequence switch magnet 1210, the lower right contact of cam 1202 (1), conductor 1334, to ground at the lower contact of cam 1333 (13 to 15). Since it is to be assumed in the consideration of these circuits that the senders under test are not equipped for making talking selection and that, therefore, cams 305 and 306 of the class register of the test device which are allotted for testing talking selection are not equipped, switch 1210 does not stop in position 2 for checking talking selection, but is driven into position 3 in readiness for checking district brush selection. The circuit for advancing switch 1210 from position 2 into position 3 may be traced from battery through the magnet of sequence switch 1210 to ground at the lower right contact of cam 1203 (2). As soon as switch 1210 reaches position 2 a circuit is established for advancing sequence switch 1310 into position 16, extending from battery through the magnet winding of sequence switch 1310, the lower right contact of cam 1335 (15), conductor 1336, thence to ground at the lower right contact of cam 1204 (2 to 12).

The complete registration set up by the number switch 810 upon the registers of the test device has now been transferred to the relay registers of the sender under test and since the first test call is for a local desk with no office selections, no numerical register relays have been operated and only the following register relays have been operated: class relay 2400, skip office relay 2375, district brush relay 2312, district group relay 2303, office group relay 2405.

The setting of the class switch 2010 of the sender under test takes place as soon as the class designation has been registered on register relays 2400, 2401, 2402 and 2403. For the particular test call being considered it is necessary to set the class sequence switch 2010 in position 14 and this is accomplished with register relay 2400 energized and the other class register relays inoperative. Consider that the class sequence switch which may be in any of its positions depending upon where it was driven when last taken for use is starting from position 12. In position 12 a circuit is closed from battery through the winding of sequence magnet 2010 and the winding of relay 2300 in parallel, the lower left contact of cam 2039 (12), conductor 2042, the right armature and front contact of relay 2400, conductor 2232 to ground at the lower left contact of cam 2221 (7 to 11). Sequence switch 2010 thereupon advances into position 13 where a circuit is closed from battery through its winding, the lower left contact of cam 2038 (13), conductor 2041, the back contact and right armature of relay 2403 to ground on conductor 2232. Sequence switch 2010 moves into position 14. By inspecting the several circuits leading to the cams 2038 and 2039, it will be found that they are all open in position 14 and hence the class sequence switch comes to rest.

During the setting of the class sequence switch 2010, relay 2300 is continuously energized in parallel therewith and serves to hold up the advance of the sender sequence switch 1910 until the class sequence switch has been positioned. When the class sequence switch no longer finds an energizing circuit, relay 2300 retracts its armatures and a circuit is established from battery through the winding of the sender sequence switch 1910, lower left contact of cam 1934 (17 to 1), the right contacts of cam 2208 (10 to 11), conductor 2228, the right hand armature and back contact of relay 2376, the left armature and back contact of relay 2300 to ground. The sender sequence switch 1910 advances out of position 1 and into position 2 where a circuit is established from battery through the winding of said sequence switch, the lower right contact of cam 1934, the upper right contact of cam 2221 (10) to ground. Sequence switch 1010 immediately moves into position 4.

At the test device as soon as check switch 1210 reaches position 3 and the relay 1205 which is energized in parallel with the sequence switch magnet 1210, becomes deenergized, a circuit is closed from ground, armature and back contact of relay 1205, the upper left contact of cam 1236 (3), conductor 1237, the lower left contact of cam 1106 (1) and through the magnet winding of sequence switch 1110 for advancing this sequence switch out of position 1 into position 2. With sequence switch 1210 in position 3, a circuit is closed for the district brush progress lamp DB and the No. 0 match or register lamp 1007 which may be traced from battery through the lamp 1007, conductor 1008, the left contact of cam 309 (1) of the district brush register, conductor 310, the lower contact of cam 1009 (1), conductor 1011, lamp DB, the upper right contact of cam 1216 to ground. The lighting of these lamps at this time informs the test man that district brush selection is being tested and that the correct designation which should be registered on the district brush relays of the sender is as indicated by the lamp 1007.

With check switch 1210 in position 3 and with the sender sequence switch 1910 in position 4, a fundamental circuit is closed extending from battery at the lower contact of cam 1119 (9 to 7), the winding of relay 1103, the right normal contact of key AV, the outer armature and back contact of relay 1102, the contact of cam 1120 (2 to 3), conductor 1121, the lower contact of cam 1234 (2 to 6), the left armature and back contact of relay 1212, conductor 1326, thence to conductor 1547, the lower left contact of cam 2204 (10), conductor 1953, the winding of stepping relay 1900, the contact and armature of counting relay 1906, the lower left contact of cam 2201 (10 to 12), the upper right contact of said cam 2201 (10), resistance 1945, the lower left contact of cam 1941 (4), the upper right contact of said cam 1941 (2 to 6) to ground. Relays 1103 and 1900 operate in this circuit, relay 1103 closing at its inner right armature and contact a circuit extending through the winding of relay 1104 and the right winding of relay 1102 in parallel to battery. Relay 1104, upon energizing, opens the circuit hereinafter traced for relay 1206 to insure that relay 1206 will not operate until the termination of district brush selection. Relay 1102 which operates in parallel with relay 1104 locks through its left winding and inner armature through the left contacts of key AV to ground at the left contact of cam 1105 (2), and opens at its outer armature and contact the initial energizing circuit of relay 1103 for preventing a premature energization of the latter relay upon the next selection in the event of a failure. Relay 1103 upon energizing also locks itself into the fundamental circuit independent of the contacts of relay 1102 through its inner left armature and contact and at its outer right armature and contact connects the interrupter 1208 to the winding of counting relay 1115. The circuit for relay 1115 may now be traced from ground through the interrupter 1208, the inner left armature and back contact of relay 1207, conductor 1238, the outer right armature and contact of relay 1103, the armature and back contact of relay 1114, the winding of relay 1115, the left contact of cam 1116 (2), conductor 1122 and thence to battery at the upper left contact of cam 1227 (3 to 3¼). Relay 1115 energizes in this circuit and locks from battery at cam 1227 through the windings of relays 1113 and 1114 in parallel, the armature and contact of relay 1115, the left contact of cam 1109 (2), to ground at the lower left contact of cam 1204 (3 to 3½). Relays 1113 and 1114, however, do not energize in this locking circuit until the interrupter 1208 rotates sufficiently to disconnect ground from the armature of relay 1114.

When the interrupter removes the ground connection relays 1113 and 1114 energize, and upon further rotation of interrupter 1208 grounded pole of the battery is connected over the circuit previously traced through the armature and front contact of relay 1114, the armature and back contact of the No. 0' counting relay 1124, the winding of the No. 0 counting relay 1125, the left contact of cam 1116 (2) and to battery as previously traced at the contact of cam 1227. Relay 1113, upon energizing, also connects the interrupter 1208 over the outer left armature and back contact of relay 1207, conductor 1239, the armature and contact of relay 1113, the outer left armature and contact of relay 1103 to the fundamental circuit between the winding of relay 1103 and the winding of the sender stepping relay 1900 thereby shunting down the sender stepping relay and causing its deenergization once for each application of ground by the interrupter 1208.

At the sender under test upon the initial energization of relay 1900 a circuit is closed from ground through the upper right contact of cam 1919 (4), contact and armature of relay 1900, the upper right contact of cam 1918 (4), conductor 1959, the right contact of cam 2222 (10), the lower contact of cam 1930 (2 to 16), the upper contact of cam 1929 (4), the left contact of cam 2032 (1), of the route switch 2020 which is standing in position 1 for this class of call, conductor 2043, the left armature and front contact of register relay 2312, the left armature and back contact of relay 2301, the right armature and back contact of relay 2311, thence to lead 2322, lead 1917, (Fig. 19), the outer left armature and back contact of relay 1905, winding of relay 1907 to battery. Relay 1907 energizes and prepares a locking circuit through the winding of relay 1906, through the armature and contact of relay 1907, to ground at the lower right contact of cam 1919 (4). When relay 1900 deenergizes upon the first application of shunting ground to the fundamental circuit at interrupter 1208, the shunt around the winding of relay 1906 is opened and this relay energizes in the locking circuit of relay 1907 and opens the fundamental circuit. Relay 1908 which energizes in parallel with relay 1906 closes at its armature and contact, a circuit extending over the upper left contact of cam 1934 (4) for advancing the sender sequence switch 1910 out of position 4 and into position 6. Sequence switch 1910 upon leaving position 4 opens the locking circuit of relays 1906, 1907 and 1908 whereupon these relays deenergize.

At the test device upon the opening of the fundamental circuit relay 1103 deenergizes opening the circuit of relay 1104. Relay 1102 is at this time locked over the contact of cam 1105. If the sender has functioned properly, at the time the fundamental circuit is opened only the No. 0 and No. 0' counting relays 1125 and 1124 of the test device will be operated, and a circuit is now closed from battery through the winding of relay 1206, conductor 1240, the armature and contact of relay 1104, conductor 1241, the upper left contact of cam 1219 (3), conductor 1242, the lower contact of cam 1005 (1), conductor 1006, the lower right contact of cam 307 (1) of the district brush register, conductor 308, conductor 1012, the armature and back contact of the No. 1 counting relay 1126, the armature and front contact of the No. 0 counting relay 1125, the left contact of cam 1109 (2) to ground at the lower left contact of cam 1204 (3 to 3½). Relay 1206, upon energizing, establishes a circuit for advancing check switch 1210 out of position 3, and since relay 1206 becomes deenergized, as soon as switch 1210 leaves position 3 and opens contact of cam 1219 the sequence switch is arrested in position 4. The circuit of progress lamp DB and match lamp 1007 is now open. As soon as the sequence switch stops in position 4 relay 1205 deenergizes closing a circuit extending from ground at the armature and contact of relay 1205 over the lower contact of cam 1236 (4), the upper left contact of cam 1107 (2) for advancing sequence switch 1110 into position 3. As soon as sequence switch 1210 moves out of position 3, the locking circuit for relays 1124 and 1125 is opened at the lower contact of cam 1204 and these relays thereupon deenergize. When switch 1110 leaves position 2 the locking circuit of relay 1102 is opened.

Should the sender under test function incorrectly and, for example, transmit an additional impulse, there would be established no circuit for relay 1206 upon the completion of the selection since the No. 1 counting relay 1126 would be energized, and the circuit previously traced for relay 1206 would in this event be open at the armature and back contact of the No. 1 counting relay 1126. Relay 1206 failing to operate, the check switch 1210 is not advanced for the next selection and after a predetermined interval since the district brush progress lamp DB remains lighted and the alarm bell 920 is operated by the time measure switch, the attendant is informed that the sender under test has failed in the district brush selection. The attendant may ascertain the exact number of impulses which were required to satisfy the sender by depressing the key IMP, Fig. 10, thereby energizing relay 1004. Under the assumption that the sender sent one additional impulse a circuit is now established for the No. 1 impulse lamp 1013, which may be traced from battery through a contact of relay 1004, lamp 1013, conductor 1014, the armature and back contact of the No. 2 counting relay 1127, the armatures and front contacts of the No. 1 and No. 0 counting relays 1126 and 1125, the left contact of cam 1109 (2), sequence switch 1110 not having advanced at this time, to ground at the lower left contact of cam 1204. The attendant may then determine which sender has thus failed by operating the key IND, Fig. 15, whereupon a circuit is established from battery through the alternate contact of key IND, conductor 1518, lamp 1519, conductor 1520, the fourth terminal of the bank to which brush 1521 has access, assuming that the sender under test is connected to the fourth set of terminals of the selector 1500, brush 1521, contact 1522 of gang switch 1501, brush 1523, lamp 1524 to ground. Lamps 1524 and 1519 being lighted to indicate that sender No. 13 is the sender then under test which has failed to function properly.

With sequence switch 1110 in position 3, check switch 1210 in position 4 and the sender sequence switch 1910 in position 6, district group selection is tested. During this test the district group progress lamp is lighted in series with the No. 0 register lamp 1007 over a circuit extending from battery through lamp 1007, conductor 1008, the lower left contact of cam 311 (1) of the district group register, conductor 312, the lower contact of cam 1015 (1), conductor 1016, lamp DG to ground at the upper left contact of cam 1216 (4). The fundamental circuit including the windings of sender stepping relay 1900 and the winding of relay 1103 is again established as previously traced. Relay 1103, upon energizing again establishes the previously traced circuits for relays 1102 and 1104 which function in the manner previously described. Relay 1900, upon energizing, establishes a circuit from ground through the upper left contact of cam 1919 (6), contact and armature of relay 1900, lower contact of cam 1918 (6), conductor 1959, right contact of cam 2222 (10), the lower contact of cam 1930 (2 to 16), the lower right contact of cam 1929 (6), the lower contact of cam 2031 (1), conductor 2044, the left armature and front contact of register relay 2303, the left armature and back contact of register relay 2313, the right armature and back contact of relay 2302, lead 2323, lead 1917, (Fig. 19) outer left armature and back contact of relay 1905, relay 1907 to battery. Relay 1907 energizes and locks through the winding of relay 1906, the armature and contact of relay 1907 to ground at the lower right contact of cam 1919, but relay 1906 being at the time shunted through the contact of relay 1900 does not energize in this locking circuit. Upon the connection of the first shunting ground to the fundamental circuit by the interrupter 1208, relay 1900 deenergizes permitting the energization of relay 1906, which thereupon opens the fundamental circuit. Relay 1908 which energizes in parallel with relay 1906 closes the previously traced circuit for advancing sequence switch 1910 into position 8.

As soon as sequence switch 1910 leaves position 6 relays 1906, 1907 and 1908 become deenergized and when the sequence switch reaches position 8, a new circuit is established for relay 1907 extending from battery, the winding of relay 1907, the winding of relay 1908, the left contact of cam 1926 (8 to 12), conductor 1957, the inner right armature and front contact of skip office relay 2375, conductor 2045, the upper right contact of cam 2221 (10), to ground. Relay 1908 energizes in series with relay 1907 and closes the previously traced circuit for driving sequence switch 1910 out of position 8 and into position 14. With sequence switch 1910 in position 14 a circuit is established from ground, the lower left contact of cam 1939 (14), the upper left contact of cam 2207 (10), through the winding of sequence switch magnet 2210 for advancing this sequence switch into position 11. The sender is now in condition for release since through the operation of the skip office relay, the usual office selections have been omitted and since no numerical designation has been registered upon the numerical register relays of the sender.

At the test device upon the opening of the fundamental circuit after completion of district group selection, relay 1103 deenergizes opening the circuit of relay 1104, relay 1102 remaining locked over the left contact of cam 1105 (3 to 4). If the sender has functioned properly, only the No. 0 counting relay 1125 and the No. 0′ counting relay 1124 have energized and locked up and a circuit is now effective for relay 1206 which may be traced from battery through the winding of relay 1206, conductors 1240 and 1241, the upper right contact of cam 1219 (4), conductor 1017, the lower contact of cam 1018 (1), conductor 1019, the lower right contact of cam 313 (1) of the district group register, conductor 308, conductor 1012, the armature and back contact of No. 1 counting relay 1126, the armature and front contact of No. 0 counting relay 1125, the right contact of cam 1109 (3), the upper right contact of cam 1204 (4 to 4½), to ground. Relay 1206, upon energizing, advances check switch 1210 into position 5. When the check switch leaves position 4 counting relays 1124 and 1125 unlock, and progress lamp DG goes out. As soon as the check switch reaches position 5 and relay 1205 deenergizes, the previously traced circuit is established over cam 1236 for advancing sequence switch 1110 out of position 3 into position 5. When switch 1110 leaves position 3 the locking circuit of relay 1102 is maintained at the left contact of cam 1105 until the sequence switch leaves position 4, whereupon the locking circuit is maintained over the right contact of cam 1105 (4 to 6), conductor 1129, to ground at the lower left contact of office brush cam 504 (6). When switch 1210 reaches position 5 a circuit is established for relay 1206 from battery through the winding of the relay, conductors 1240 and 1241, the lower right contact of cam 1221 (5 to 6), conductor 1242, and thence to ground at the upper contact of office brush register cam 504 (6) and relay 1206 thereupon advances sequence switch 1210 into position 7. In position 7 a circuit is effective for advancing switch 1110 out of position 5 into position 6, which may be traced from battery through the winding of magnet 1110, the upper right contact of cam 1106 (5), conductor 1128, the upper contacts of cam 1235 (7 to 14) and thence to ground on conductor 1242 at office brush register cam 504 (6).

With sequence switch 1210 in position 7 a circuit is now established through the magnet winding of sequence switch 1210, over the lower left contact of cam 1203 (7), conductor 1244, the lower contact of class register cam 314 (3 to 6), conductor 315, the upper left contact of cam 1329 (16) and the upper right contact of cam 1314 (16) to ground, advancing switch 1210 out of position 7 and into position 8. As soon as switch 1210 comes to rest in position 8 and relay 1205 deenergizes, the previously traced circuit extending over the contact of cam 1204 is established for advancing the sequence switch 1110 out of position 6 into position 8. During the advance of switch 1110 from position 6 through position 7, the locking circuit of relay 1102 is maintained at the left contact of cam 1105 (6 to 7) and since relay 1102 has thus been maintained locked during the passage of sequence switch 1110 from position 3 through position 7, a false operation of relay 1103 over the fundamental circuit is not possible.

Upon the arrival of check switch 1210 in position 8 a circuit is established for relay 1207 extending from battery through the upper right contact of cam 1227 (8 to 12), conductor 1245, winding of relay 1207, conductor 1246 to ground at the lower left contact of class register cam 316 (5 to 6). Relay 1207, upon energizing, disconnects the interrupter 1208 from the fundamental circuit and from the counting relays of Fig. 11, prepares a circuit for relay 1214, and at its outer right armature and front contact establishes a circuit for the sender disconnect lamp SRD.

With the switch 1210 in position 8 and the sender sequence switch 1910 in position 14 the fundamental circuit is again established, and may be traced from battery through the contact of class register cam 317 (5 to 6), conductor 318, the upper contact of cam 1119 (8), the winding of relay 1103, thence as previously traced to conductor 1547, the upper right contact of cam 2204 (11), the lower contact of cam 1920 (14 to 14¾), winding of relay 1901, the upper right contact of cam 1955 (14 to 17), resistances 1954 and 1935, conductor 1968, conductor 2047, lower contact of cam 1942 (14 to 14¾), the left contact of cam 2202 (11), conductor 1548, thence as previously traced to the right-hand armature and back contact of relay 1212, the right contact of cam 1222 (8 to 12) to ground, through the one thousand ohm resistance 1250. Due to the inclusion of resistance 1250, relay 1103 does not energize in the fundamental circuit, but relay 1901 energizes, establishing an obvious circuit for relay 1903. Relay 1903, upon energizing, closes a circuit from ground at its outer right armature contact, conductor 2066, left contact of class switch cam 2006 (13 to 17), conductor 2033, upper contact of cam 1933 (14), through the magnet winding of sequence switch 1910 to advance the sequence switch out of position 14 into position 15. Sequence switch 1910, upon reaching position 15 is immediately advanced into position 16 over a circuit extending from battery through its magnet winding, the lower right contact of cam 1933 (15), conductor 2034, the right contact of class switch cam 2001 (7 to 3), conductor 2035 to ground at the right contact of cam 2120 (1). With switch 1910 in position 16 a circuit is now closed from ground at the upper right contact of cam 2209 (11), the lower contacts of cam 1928, the lower contacts of cam 2004 (14), conductor 1550, brush 1515, conductor 1319, the inner right armature and front contact of relay 1207, both windings of relay 1214, conductor 1247 to battery at the right contact of class register cam 319 (3 to 6). Relay 1214 energizes in this circuit and closes a circuit for relay 1209 which in turn establishes a circuit over its inner armature and front contact and the upper contact of cam 1230 (5 to 12) for advancing the check switch 1210 into position 13.

As switch 1210 leaves position 12 the circuit of relay 1207 is opened and this relay deenergizes opening the circuits of relay 1214 and 1209. With switch 1210 in position 13 and switch 1310 in position 16 a circuit is established for advancing the number switch 810 out of position 2 into position 3, this circuit extending from battery through the magnet winding of switch 810, the lower left contact of cam 816 (2), conductor 817, the inner left armature and back contact of relay 912, conductor 921, the left contacts of cam 1229 (13), conductor 1337 to ground at the lower right contact of cam 1300 (16 to 17). A circuit is now established to advance check switch 1210 into the disconnect position 14 which may be traced from battery through the magnet winding of switch 1210, the upper left contact of cam 1202 (13), conductor 1254, conductor 321, the left contact of cam 320, conductor 818 and thence to ground at the upper left contact of cam 804 (3). As soon as the switch 1210 reaches position 14 a circuit is established from ground over the upper left contact of cam 1204 (14 to 1), conductor 1130, the lower right contact of cam 1107 (2 to 18) and through the winding of sequence switch magnet 1110 to drive the sequence switch into normal position. A circuit is also established from ground at the lower right contact of cam 1218 (14) and through the sender disconnect lamp SRD to battery. With switch 1210 in position 14 a circuit is again established for relay 1214 extending from ground on conductor 1319, through the left armature and back contact of relay 1215, the lower contact of cam 1233 (14 to 18), both windings of relay 1214, conductor 1247 and to battery at the right contact of cam 319 (3 to 6). Relay 1214, upon energizing, establishes an energizing circuit for relay 1209. Relay 1209 now establishes a circuit extending from ground at the upper right contact of cam 1314 (16), through the upper left contact of cam 1329 (16), conductor 315, the lower contact of cam 314 (3 to 6), conductor 1244, the outer armature and contact of relay 1209, the left armature and back contact of relay 1231, the upper left contact of cam 1203 (14), through the magnet winding of sequence switch 1210 for advancing the sequence switch out of position 14 into position 16.

As soon as switch 1210 leaves position 15 the holding ground which has been connected to conductor 1549 over brush 1512, conductor 1418, the lower contact of cam 1416 (5 to 12), conductor 1435 to ground at the right contact of cam 1228 (16 to 14) is removed and relay 2200 of the sender control circuit thereupon deenergizes, closing a circuit over its right armature and back contact and the lower right contact of cam 2207 (2 to 17) for advancing sequence switch 2210 into position 18. Immediately that sequence switch 2210 reaches position 13 it closes a circuit from battery through the winding of the sender sequence switch magnet 1910, the lower left contact of cam 1933 (2 to 18), the upper left contact of cam 2209 (13 to 18) to ground. The sender sequence switch 1910 leaves position 16 and advances into its normal position 1. With the sender sequence switch 1910 in position 1 a circuit is closed from battery through the winding of sequence switch magnet 2210, the upper contacts of cam 2206 (18), the left contacts of cam 1936 (1), conductor 1976, the lower right and upper left contacts of cam 2121 (1), the lower contact of cam 2027 (1) to ground. Sequence switch 2210 thereupon moves out of position 18 into position 1.

At the time sequence switch 2210 leaves position 12 it opens the several contacts of cams 2209, 2221 and 2219 in order to permit the deenergization of the several register relays which have been operated to record the designation of the test call.

With switch 1210 in position 16 a circuit is established for reenergizing relay 1421 which may be traced from ground through the left winding of relay 1421, the lower right contact of cam 1422 (8 to 11), conductor 1436, the right contacts of cam 1229 (16 to 17), conductor 1423, brush 1513, conductor 1548, the upper left and lower right contacts of cam 2203 (1) to battery through the left winding of relay 2200. Relays 1421 and 2200 energize in this circuit, relay 2200 locking in a circuit extending from its left winding, its left armature and front contact, conductor 1549, brush 1512, conductor 1418 and thence as previously traced to ground at the lower right contact of cam 1228 (16 to 14). Relay 1421, upon energizing, locks in a circuit extending from battery on cam 1226 (16 to 17), conductor 1248, the right winding and right armature contact of relay 1421 to ground at the lower right contacts of cam 1228 (16 to 14) as previously traced. At its left armature contact relay 1421 establishes a circuit over conductor 1426, conductor 1338, the lower left contact of cam 1230 (16) through the magnet winding of sequence switch 1210 for advancing the sequence switch into normal position. While switch 1210 rested in position 16 a circuit was established for the sender return lamp SR, over the lower left contact of cam 1228 (16). Upon reaching its normal position a circuit is established for driving sequence switch 1310 into position 18 which may be traced from battery through the magnet winding of switch 1310, the lower left contact of cam 1335 (16 to 17), conductor 1339, the lower contact of cam 1224 (1), to ground at the outer right armature and back contact of relay 1207. A circuit is now established from battery through the magnet winding of sequence switch 1310, the upper left contact of cam 1335 (18), conductor 1249, the lower contacts of cam 1235 (1), conductor 1437, the normal contacts of key PN, conductor 820 to ground at the upper contact of cam 819 (1 to 17). Switch 1310 now advances into normal position and in leaving position 18 opens the locking circuit of relay 900 of the time measure switch 915. The time measure switch is now driven into its normal position over a circuit extending from battery through the winding and armature contacts of stepping magnet 908, the contacts of bank 929, wiper 930 and to ground through the upper armature and back contact of relay 900. The sender under test has now been restored to normal condition and the circuits of the test device have been placed in condition for the establishment of the next routine test call.

Test call simulating a distant desk connection.

It will be assumed that all test calls which the test device is capable of making are to be made and that, therefore, conductor 823 extending from the lower right contact of cam 802 to the upper left contact of cam 1228 (15 to 1) is omitted, and that, therefore, when number switch 810 was driven out of position 2 into position 3 it was not advanced through positions 3 and 4 into position 5 but remained in position 3. With number switch 810 in position 3 the registers of the test device are set in accordance with the designation 1, 1, 1, 1, 0, 0, 0, 0, 0, for the second routine test call as set forth in the foregoing table. For the class of call now being considered the class register moves into position 6, the district brush register to position 2, the district group register to position 2, the office brush register to position 8, the office group register to position 2 and the numerical and stations registers remain as for the last test call in position 1.

As previously described when all of the registers have been set by the number switch 810, control switch 1310 moves into position 2 and thence through intervening positions into position 12, transferring the setting of the registers by code impulses to the register relays of the sender under test. The sender register relays are set in the manner previously described with the exception that class register relays 2400 and 2402, district brush register relays 2301 and 2312, district group register relays 2303 and 2313, office brush register relays 2404 and 2415 and office group register relays 2405 and 2406 are energized and locked instead of the register relays which are operated for the first test call. During the movement of control switch 1310 through positions 10 to 12¼ a circuit was established extending from ground through the upper right contact of cam 1340 (10+12¼), conductor 1341, the outer left armature and back contact of relay 911, conductor 922, the upper right contact of cam 802 (3) and through the magnet winding of sequence switch 810 to battery for advancing said sequence switch out of position 3 into position 4. With switch 810 in position 4 a circuit is established for relay 911 extending from battery through the winding of the relay to ground at the lower left contact of cam 821 (4). Relay 911 locks over its right armature and contact to ground at the right contact of cam 821 (4 to 5) and is thus maintained energized until after the number switch leaves position 5.

With class register relays 2400 and 2402 energized and relays 2401 and 2403 deenergized, the class switch of the sender is driven into position 16 and the sender sequence switch 1910 is thereupon advanced to position 4 ready for controlling district brush selection. As soon as control switch 1310 reaches position 12, a circuit is established from battery through the magnet winding of switch 1310, the left contact of cam 1332 (12), conductor 815 to ground at the upper right contact of cam 804 (4) for advancing sequence switch 1310 into position 15. Upon reaching position 13, check switch 1210 is advanced into position 3 as previously described and in turn advances control switch 1310 into position 16. Switch 1210 now cooperates with the sender under test and in positions 3 and 4 checks the operation of the sender for district brush and district group selections.

Upon the completion of district group selection the sender sequence switch 1910 moves into position 8 and check switch 1210 advances to position 5 advancing sequence switch 1110 to position 5. A fundamental circuit is now established between the sender under test and the test device for checking the sender on office trunk test, which may be traced from battery through the lower contact of cam 1119 (9 to 7), the winding of relay 1103, normal contacts of key AV, the outer left armature and back contact of relay 1102, the lower contact of cam 1120 (5 to 6), conductor 1121, the lower contact of cam 1234 (2 to 6), the left armature and back contact of relay 1212, conductor 1326, thence to conductor 1547, the upper left contact of cam 2204 (10), the upper contacts of cam 1937 (8), the winding of relay 1901, the upper right contact of cam 1955 (8), resistances 1954 and 1935, conductor 1968, the left contacts of cam 2007 (16), the upper right contact of cam 2202 (10), conductor 1548, thence over conductor 1423, the right armature and back contact of relay 1212, the left contact of cam 1222 (5 to 6) and to ground through resistance 1250. Due to the inclusion of resistances 1954 and 1935 relay 1103 does not energize in the fundamental circuit, but relay 1901 energizes and establishes a circuit for relay 1903, which in turn, establishes a circuit for relay 1908 which may be traced from battery through the winding of relay 1907, the windings of relays 1906 and 1908 in parallel, the upper contacts of cam 1924 (8), conductor 2036, the outer right armature and back contact of relay 2375, conductor 2037, the lower contact of cam 2006 (16), conductor 2066 to ground at the outer right armature and front contact of relay 1903. Relay 1908 upon energizing establishes a circuit from ground at its armature contact over the upper left contact of cam 1934 (8) to battery through the magnet winding of sequence switch 1910 for advancing the sequence switch into position 10. With sequence switch 1910 of the sender in position 10, check switch 1210 in position 5 and switch 1110 in position 5, a fundamental circuit is established from battery through the lower contact of cam 1119, winding of relay 1103 and thence as previously traced to conductor 1547, the lower contact of cam 2204 (10), conductor 1953, winding of stepping relay 1900, contact and armature of relay 1906, the lower left contact of cam 2201 (10 to 12), the upper right contact of cam 2201 (10), the lower left and upper right contacts of cam 1921, conductor 2047, the left contacts of cam 2007 (16), the upper left contact of cam 2202 (10), conductor 1548 and thence as previously traced to ground through resistance 1250. Relays 1103 and 1900 energize in this circuit, relay 1103, in turn, causing the energization of relays 1102 and 1104.

In position 5 of check switch 1210 a circuit is closed for the office brush progress lamp OB, which may be traced from ground through the lower left contact of cam 1216 (5), lamp OB, conductor 1023, the lower contact of cam 1022 (1), conductor 507, the right contact of cam 506 (2) of the office brush register, conductor 1021 to battery, through the No. 1 register lamp 1020. When sufficient shunting impulses have been transmitted over the fundamental circuit by the interrupter 1208 for shunting down relay 1900 to satisfy the counting relays of the sender as determined by the setting of the office brush register relays, in this case two impulses, the counting relays 1125 and 1126 at the test device are energized and locked. At the sender relays 1906, 1907 and 1908 function to open the fundamental circuit, unlock the sender counting relays and to advance the sender sequence switch 1910 out of position 10 into position 12. When the fundamental circuit is opened relays 1900, 1103 and 1104 deenergize, relay 1102 remaining locked over the left contact of cam 1105 until after switch 1110 advances out of position 5. If the sender has functioned correctly a circuit is now effective for relay 1206 extending over conductors 1240 and 1241 through the lower right contact of cam 1219 (5), conductor 1026, the lower contact of cam 1024 (1), conductor 1025, the lower left contact of office brush cam 508 (2), conductor 509, conductor 1014, the armature and back contact of No. 2 counting relay 1127, the armatures and front contacts of No. 1 and No. 0 counting relays 1126 and 1125, the left contact of cam 1109 (5) to ground at the lower left contact of cam 1204 (5 to 5½). Relay 1206 energizes in this circuit and closes a circuit for advancing check switch 1210 out of position 5 and into position 6 whereupon a circuit is established for advancing switch 1110 into position 6. As soon as switch 1110 leaves position 5 relay 1102 deenergizes and the locking circuit of relays 1125 and 1126 is opened at the contact of cam 1204 as soon as check switch 1210 leaves position 5½. The circuit for progress lamp OB is also opened.

With the sender sequence switch in position 12, check switch 1210 in position 6 and sequence switch 1110 in position 6, the fundamental circuit previously traced is again closed and relays 1102, 1103, 1104 and 1900 again energize. The interrupter 1208 now applies a shunt from ground to the fundamental circuit for shunting sender stepping relay 1900 until the sender is satisfied in accordance with the setting of its office group register relays, and relays 1906, 1907 and 1908 become energized. In accordance with the assumption previously made these relays become energized after stepping relay 1900 has been deenergized twice, whereupon in the well known manner the fundamental circuit is opened, the counting relays are released and the sender sequence switch 1910 is advanced out of position 12 into position 14. At the testing device during office group selection, the office group lamp OG is lighted in series with the No. 1 register lamp in a circuit which may be traced from ground through the lower right contact of cam 1216 (6), lamp OG, conductor 1027, the lower contact of cam 1028 (1), conductor 1029, the right contact of office group register cam 510 (2) to conductor 1021 and thence to battery through the No. 1 register lamp 1020. Upon the opening of the fundamental circuit at the sender, relays 1103 and 1104 deenergize and if the sender has functioned accurately, a circuit is closed for relay 1206 extending as previously traced over conductor 1241, the lower left contact of cam 1219 (6), conductor 1251, the lower contact of cam 1030 (1), conductor 1031, the lower left contact of office group register cam 526 (2), conductor 509, conductor 1014, the armature and back contact of No. 2 counting relay 1127, the armatures and front contacts of No. 1 and No. 0 counting relays 1126 and 1125, the right contact of cam 1109 (6) and thence to ground at the upper right contact of cam 1204 (6 to 6½). Relay 1206, upon energizing, establishes a previously traced circuit for driving check switch 1210 out of position 6 into position 7. Upon reaching position 7 with switch 1310 in position 16 a circuit is established from battery through the magnet winding of switch 1210, the lower left contact of cam 1203 (7), conductors 1243 and 1244, the lower contact of cam 314 (3 to 6), conductor 315, the upper left contact of cam 1329 (16) and the upper right contact of cam 1314 (16) to ground, for advancing sequence switch 1210 into position 8. In position 8 a circuit is established over the upper left contact of cam 1236 (8), conductor 1237 and the lower left contact of cam 1106 for advancing sequence switch 1110 into position 8. Upon leaving position 6½ switch 1210 opens the locking circuit of the counting relays 1125 and 1126 at the contact of cam 1204, and opens the circuit of progress lamp OG. Upon leaving position 7 sequence switch 1110 opens the locking circuit of relay 1102.

At the sender under test with sequence switch 1910 in position 14 a circuit is established over the lower left contact of cam 1939 and the upper left contact of cam 2207 (10) for advancing sequence switch 1210 into position 11. A fundamental circuit is now established extending from battery at the lower contact of class register cam 317 (5 to 6), conductor 318, the upper contact of cam 1119 (8), the winding of relay 1103, thence as previously traced to conductor 1547, the upper right contact of cam 2204 (11), the lower contact of cam 1920 (14 to 14¾), the winding of relay 1901, the upper right contact of cam 1955 (14 to 17), resistances 1954 and 1935, conductor 1968, conductor 2047, the lower contact of cam 1942 (14 to 14¾), the upper left contact of cam 2202 (11), conductor 1548, thence as previously traced through resistance 1250 to ground. Relay 1103 does not energize in this circuit due to the inclusion of resistances 1954 and 1935, but relay 1901 energizes and establishes an energizing circuit for relay 1903. Relay 1903, upon energizing, establishes a circuit extending from ground at its outer right armature and contact, over conductor 2066, the left contacts of cam 2006 (13 to 17), conductor 2033, the upper contact of cam 1933 (14) and to battery through the magnet winding of sequence switch 1910. Sequence switch 1910 is thereupon driven into position 15 and from thence into position 16, over a circuit extending from battery through its magnet winding, the lower right contact of cam 1933 (15), conductor 2034, the right contact of cam 2001 (7 to 3), conductor 2035 and thence to ground at the right contact of cam 2120 (1). With sender sequence switch 1910 in position 16 ground is connected to conductor 1319 as previously traced for advancing check switch 1210 into position 13. In position 13 of check switch 1210 a circuit is established for advancing the number switch 810 into position 5. This circuit may be traced from battery through the magnet winding of switch 810, the lower left contact of cam 816 (4), conductor 817, the inner left armature and back contact of relay 912, conductor 921, the left contacts of cam 1229 (13), conductor 1337 and thence to ground at the lower right contact of cam 1300 (16 to 17). From this point the circuits of the test device and sender under test are restored and prepared for the next test call in the manner previously described.

*Test call simulating a local semi-mechanical connection.*

The third test call in accordance with the foregoing table is for a local semi-mechanical connection and the designation set up on the registers of the test device with the number switch 810 in position 5 is in accordance with the designation 2, 2, 2, 2, 0, 0, 5, 5, 0. In accordance therewith the class register is set in position 3, the district brush register in position 3, the district group register in position 3, the office brush register in position 9, the office group register in position 3, the thousands and hundreds registers remaining in position 1 as for the last call, the tens and units register in position 6 and the stations register in position 1. As previously described when all of the registers have been set the control switch 1310 moves into position 2 and thence through intermediate positions to position 12 transferring by code impulses the setting of the registers of the test device to the relay registers of the sender under test. For this call, class register relays 2400 and 2401, district brush register relay 2301, district group register relay 2313, office brush register relay 2404, office group relay 2406, tens register relay 2309 and units relay 2316 are energized and locked instead of the combination of relays operated upon the last test.

The class sequence switch 2010 is now driven under control of relays 2400, 2401, 2402 and 2403 into position 10 and the sender sequence switch 1910 thereupon advances to position 4 in readiness for controlling district brush selection.

As control switch 1310 advances through position 10 to 12¼ the circuit previously traced for advancing number switch 810 is open at the outer left armature and back contact of relay 911 since it will be recalled that relay 911 is locked energized with switch 810 in position 5, and therefore, the number switch does not advance out of position 5 at this time. A circuit is now established from ground at the lower left contact of cam 1340 (2 to 13), conductor 1342, the left winding of relay 912, conductor 923 to battery at the lower left contact of cam 822 (5), and relay 912, upon energizing, in this circuit locks over a circuit extending from battery at the contact of cam 822, through the right winding and inner right armature and front contact of relay 912 over conductor 924 to ground at the lower right contact of cam 1340 (2 to 18). Relay 912 upon energizing also prepares a circuit in shunt of the winding of relay 911 which is effective later for causing the deenergization of relay 911 as hereinafter described.

When control switch 1310 reaches position 12 a circuit is established from battery through the magnet winding of the sequence switch, the left contact of cam 1332 (12), conductor 815, the outer left armature and front contact of relay 911, conductor 1341 and thence to ground at the upper right contact of cam 1340 (10 to 12¼) for advancing sequence switch 1310 out of position 12 into position 15. Sequence switch 1210 is advanced into position 3 by sequence switch 1310 and in turn causes the advance of switch 1310 into position 16 as previously described. In advancing from position 3 to position 6, inclusive, with switch 1110 in positions 1 to 6, inclusive, the sender is tested for accuracy in controlling district brush, district group, office brush and office group selections as hereinbefore described. If the sender functions correctly, upon the opening of the fundamental circuit following office group selection, the sender sequence switch advances into position 14, advancing sequence switch 2210 to position 11 and the check switch 1210 and sequence switch 1110 are each advanced into position 8.

A new fundamental circuit is now closed and may be traced from battery through the upper contacts of class register cam 319 (7 to 4), conductor 318, the upper contact of cam 1119 (8), winding of relay 1103, thence as previously traced to conductor 1547, the upper left contact of cam 2204* (11), the lower contact of cam 1920 (14 to 14¾), the winding of relay 1901, the upper right contact of cam 1955 (14 to 17), resistances 1954 and 1935, conductor 1968, conductor 2047, the lower contact of cam 1942 (14 to 14¾), the upper left contact of cam 2202 (11), conductor 1548, and thence to ground through resistance 1250. Relay 1103 does not energize in this circuit, but relay 1901 energizes and causes the energization of relay 1903. Relay 1903 thereupon closes a circuit from ground at its outer right armature contact, conductor 2066, the upper right contact of cam 2006 (10), the upper right contact of cam 1934 (14 to 17) for advancing sequence switch 1910 out of position 14. When sequence switch 1910 reaches position 14¾ a locking circuit for relay 1901 is completed by way of the upper contact of cam 1920 14¾ to 16), outer left armature and front contact of relay 1903, winding of relay 1901 and thence as previously traced to conductor 2047, inner left armature and front contact of relay 1903 and thence by way of the upper contact of cam 1942 (14¾ to 16) to ground as previously described. Sequence switch 1910 is advanced into position 1 under the control of relay 1903.

In position 1 a circuit is closed from battery through the magnet winding of sequence switch 1910, the lower left contact of cam 1934 (17 to 1), the right-hand contacts of cam 2208 (10 to 11), conductor 2228, the right armature and contact of relay 2376 to ground at the left armature and back contact of relay 2300. Sequence switch 1910 thereupon moves into position 2 and closes a circuit from ground at the lower contact of cam 1939 (2), over the upper right contact of cam 2207 (11) for advancing sequence switch 2210 into position 12. A new fundamental circuit is now established which may be traced as before to conductor 1547, thence over the lower contact of cam 2204 (12), conductor 1953, the winding of relay 1900, the armature and back contact of relay 1906, the lower contacts of cam 2201, the left winding of relay 1904, the right contacts of cam 1936 (2), the upper right contact of cam 2046 (10), conductor 2048, the lower right contact of cam 2202 (12), conductor 1548 and thence to ground as previously traced through resistance 1250.

With check switch 1210 in position 8 a circuit is closed for progress lamp IB which may be traced from ground at the outer right armature and back contact of relay 1207, the upper contact of cam 1224 (8), lamp IB, conductor 511, the left contact of thousands register cam 512 (1 to 2), conductor 1008 and thence to battery through the No. 0 register lamp 1007. Upon completion of incoming brush selection relays 1906 and 1908 become energized at the sender opening the fundamental circuit, unlocking the counting relays and advancing the sender sequence switch 1910 into position 4. Upon the opening of the fundamental circuit relays 1103 and 1104 deenergize and if the sender has functioned correctly, one counting relay 1125 has been energized at the test device and a circuit is thereupon established for relay 1206 extending from battery through the winding of relay 1206, conductors 1240 and 1241, the upper left contact of cam 1220 (8), conductor 1252, the lower right contact of cam 523 (1 to 2), conductor 308, conductor 1012, the armature and back contact of No. 1 counting relay 1126, the armature and front contact of No. 0 counting relay 1125, the left contact of cam 1109 (8) and thence to ground at the lower left contact of cam 1204 (8 to 8½). Relay 1206, upon energizing, closes the previously traced circuit for advancing check switch 1210 into position 9 whereupon sequence switch 1110 is advanced into position 9. As soon as switch 1210 leaves position 8½ the counting relays 1124 and 1125 are released and when switch 1110 leaves position 8 the locking circuit of relay 1102 is opened.

With check switch 1210 in position 9 and the sender sequence switch 1910 in position 4 the fundamental circuit is again established and relays 1900, 1102, 1103 and 1104 again energize. At this time a circuit is established for the progress lamp IG which may be traced from ground through the upper contact of cam 1217 (9), lamp IG, conductor 513, the lower contact of thousands register cam 514 (1), conductor 515, the lower contact of hundreds register cam 516 (1 to 5), conductor 1008, thence to battery through the register lamp 1007. Upon completion of the selection counting relays 1906 and 1908 at the sender under test energize opening the fundamental circuit, unlocking the counting relays of the sender and advancing the sender sequence switch 1910 into position 6. Upon opening the fundamental circuit relays 1103 and 1104 deenergize and if the sender has functioned correctly only one counting relay 1125 is energized at the test device and a circuit is thereupon established for relay 1206 extending as previously traced over conductor 1241, the upper right contact of cam 1221 (9), conductor 1256, the lower right contact of thousands register cam 524 (1), the upper left contact of hundreds register cam 525 (1 to 5), conductor 308, conductor 1012, the armature and back contact of relay 1126, the armature and front contact of relay 1125, the right contact of cam 1109 (9) and thence to ground at the upper right contact of cam 1204 (9 to 9½). Relay 1206, upon energizing, advances check switch 1210 into position 10 in turn advancing sequence switch 1110 into position 10. As check switch 1210 leaves position 9½ counting relay 1125 is unlocked and as sequence switch 1110 leaves position 10, the locking circuit of relay 1102 is opened. Check switch 1210 also opens the circuit of progress lamp IG.

With check switch 1210 in position 10, sequence switch 1110 in position 10 and number switch 810 in position 5 a circuit is closed from battery through the windings of relays 1211 and 1212 in parallel, the upper right contact of cam 1232 (9¾ to 13), conductor 927, the lower left contact of cam 804 (5) to ground. Relay 1211, upon energizing, closes a circuit extending from ground at its left armature and front contact, conductor 1253, the upper right contact of cam 1107 (8 to 16), to battery through the magnet winding of sequence switch 1110 for driving this sequence switch into position 17. In position 17 battery is supplied to the fundamental circuit, current flow being in a reverse direction to that previously traced, through the upper contact of cam 1111 (17), conductor 1132, and the right armature and front contact of relay 1212 and over the lower right contact of cam 1112 (17), conductor 1131 and the left armature and front contact of relay 1212 whereupon polarized overflow relay 1904 of the sender under test is operated. This reverse battery is connected to the fundamental circuit only momentarily as sequence switch 1110 is immediately driven into position 18 over a circuit extending from battery through its magnet winding, the upper left contact of cam 1106 (17), conductor 1133 to ground at the lower left contact 300 (3 to 1). With sequence switch 1110 in position 18 a circuit is now established for advancing check switch 1210 into position 11 extending from battery through the magnet winding of switch 1210, the upper left contact of cam 1202 (10), conductor 1254 to ground at the left contact of cam 1112 (18).

If the overflow relay 1904 of the sender functions correctly in response to the overflow condition which has been established at the test device by the connection of the source of reverse current to the fundamental circuit, relay 1904 at its armature and front contact has connected ground to conductor 1320, thereby causing the energization of relay 1214. Relay 1214, upon energizing, establishes a circuit for relay 1209, which in turn, establishes a circuit from ground at its inner armature and front contact, over the upper contact of cam 1230 (5 to 12) for advancing check switch 1210 into position 13. The check switch is now driven into position 14 over a circuit extending from battery through its magnet winding, the upper left contact of cam 1202 (13), conductor 1294 to ground at the left contact of cam 1112 (18). As soon as the check switch leaves position 13 the circuit of relay 1214 is opened at the right contact of cam 1233 (8 to 12) and relays 1214 and 1209 thereupon deenergize. In position 14 a circuit is also established from ground at the upper left contact of cam 1204 (14 to 1), conductor 1130, the lower right contact of cam 1107 (2 to 18) and through the magnet winding of sequence switch 1110 for advancing this sequence switch into normal position. With the check switch in position 14 a circuit is established for advancing it into position 16 which may be traced over the upper right contact of cam 1203 (14), conductor 927 to ground at the lower left contact of cam 804 (5). The circuits of the test device are from this point restored in the manner previously described, restoring the sender under test to its normal condition and preparing the sender for its operation in response to the next test call. It is to be noted in connection with the test call just described that the selections beyond the incoming group selection are not tested, this test being made primarily to determine if the sender under test functions correctly in response to an overflow condition. During the movement of check switch 1210 through positions 12½ to 13¼ a circuit is established from the right armature and front contact of relay 911 through the outer right armature and front contact of relay 912, conductor 925, contacts of cam 1343 (16 to 17), conductor 1384, the upper contacts of cam 1200, conductor 926 and thence to battery at the left contact of cam 822 (5). Relay 911, being shunted, thereupon becomes deenergized. When control switch 1310 leaves position 18 the previously traced locking circuit for relay 912 is opened at the lower right contact of cam 1340 (2 to 18) and relay 912 deenergizes.

The next test call is made with the number switch 810 still in position 5 so that the registers of the test device maintain the same setting as for the test call previously described. When control switch 1310 reaches position 10 during the transfer of the registration from the registers of the test device to the register relays of the sender under test, the previously traced circuit is established over the upper right contact of cam 1340 (10 to 12¼) for advancing the number switch 810 out of position 5 into position 6. With the number switch in position 6, when the control switch 1310 reaches position 12 the previously traced circuit is established for advancing switch 1310 into position 15, from which position it is advanced into position 16 as soon as the check switch 1210 leaves its normal position. When the switch 1310 reaches position 14 a circuit is closed for relay 913 which may be traced from ground through the upper contact of cam 821 (6), the right winding of relay 913, conductor 928 to battery through the lower contacts of cam 1303 (14 to 17). Relay 913, upon energizing, locks from battery through its left winding and left armature contact directly to ground at the upper contact of cam 821 and is thus maintained locked until the number switch is advanced into position 7 for the next test call. The test of the sender proceeds as described for the preceding test call through all selections including incoming group selection, following which the check switch 1210 is advanced into position 10 and the sequence switch 1110 is advanced thereby into position 10.

The fundamental circuit previously traced is again closed and relays 1900, 1103, 1104 and 1102 again energize. With check switch 1210 in position 10 the final brush progress lamp FB is lighted in series with the No. 0 register lamp 1007 over a circuit which may be traced from ground, the lower left contact of cam 1217 (10), lamp FB, conductor 517, the left contact of hundreds register cam 518 (1), conductor 1008 and thence to battery through the No. 0 register lamp 1007. Upon completion of the final brush selection counting relays 1906 and 1908 of the sender under test become energized, opening the fundamental circuit, unlocking the counting relays of the sender and advancing the sender sequence switch 1910 into position 8. Upon opening the fundamental circuit relays 1103 and 1104 deenergize and if the sender has functioned correctly, but one counting relay 1125 at the test device has become energized and locked, and a circuit is therefore effective for relay 1206 extending over conductor 1240, the armature contacts of relay 1104, conductor 1241, the upper right contact of cam 1220 (10), conductor 1255, the lower right contact of hundreds register cam 519 (1), conductor 308, conductor 1012, the armature and back contact of counting relay 1126, the armature and front contact of counting relay 1125, the left contact of cam 1109 (10), thence to ground through the lower left contact of cam 1204 (10 to 10½). Relay 1206 upon energizing establishes a circuit for advancing check switch 1210 into position 11. The check switch upon leaving position 10 opens the previously traced circuit for the progress lamp FB and the locking circuit for counting relay 1125 and upon reaching position 11 establishes a circuit for advancing sequence switch 1110 out of position 10 into position 11. Sequence switch 1110 upon leaving position 10 opens the locking circuit of relay 1102.

With the sender sequence switch 1910 in position 8 and sequence switch 1110 in position 11 the fundamental circuit is again established and relays 1900, 1103, 1102 and 1104 again energize. A circuit for the final tens progress lamp FT is now established in series with the No. 5 register lamp 1032 over a circuit which may be traced from ground through the right contact of cam 1217 (11), lamp FT, conductor 700, the upper right contact of tens register cam 701 (6), conductor 702, No. 5 register lamp 1032 to battery. At the sender under test when the sender sequence switch 1910 advances into position 8 for final tens selection, a circuit was established for the transfer relay 1905 which may be traced from battery through the winding of this relay, the upper contacts of cam 1927, the left contact of relay 2309, conductor 2241 to ground at the left contacts of cam 2208 (12). With relay 1905 energized, when the sender stepping relay 1900 energized over the fundamental circuit a circuit was established extending from ground at the upper right contact of cam 1919 (8), the contact of stepping relay 1900, the upper contact of cam 1918 (8), conductor 1959, the left contact of cam 2222 (12), the lower left contact of cam 1932 (18 to 12), the upper left contact of cam 1931 (8), conductor 1974, the left armature and back contact of register relay 2308, the outer right armature and back contact of register relay 2307, lead 2325, lead 1917, the inner armature and front contact of relay 1905, the armature and back contact of the No. 9' counting relay 1965, the winding of the No. 9 counting relay 1966 to battery over the lower left contact of cam 1923 (8). Through the operation of interrupter 1208, relay 1900 is periodically shunted down causing the operation of the counting relays in succession until the No. 5' counting relay 1967 becomes energized, whereupon the circuit previously traced for the No. 9 counting relay 1966 is extended in the well-known manner through the armature and front contact of relay 1967, the outer armature and front contact of relay 1905 to the No. 0 counting relay 1907 to battery. Upon the sixth shunting impulse and consequent deenergization of relay 1900, relay 1906 energizes in parallel with relay 1908 opening the fundamental circuit, unlocking the energized counting relays and advancing the sender sequence switch 1910 out of position 8 into position 10.

Upon the opening of the fundamental circuit relays 1103 and 1104 deenergize and if the sender has functioned properly, counting relays 1125, 1126, 1127, 1137, 1136 and 1135 of the test device are at the time energized and locked in the manner previously described and a circuit is thereupon effective for relay 1206 extending as previously traced over conductor 1241, the lower right contact of cam 1220 (11), conductor 704, the lower left contact of tens register cam 705 (6), conductor 706, the armature and back contact of No. 6 counting relay 1134, the armatures and front contacts of the No. 0 to No. 5 counting relays, the right contact of cam 1109 (11) to ground at the upper right contact of cam 1204 (11 to 11½). Relay 1206, upon energizing, advances check switch 1210 out of position 11 into position 12. Switch 1210 upon leaving position 11 opens the locking circuits of the energized counting relays and the circuit for the progress lamp FT, and upon reaching position 12 establishes a circuit over the upper left contact of cam 1236 (12) for advancing sequence switch 1110 into position 12. Sequence switch 1110 upon leaving position 11 opens the locking circuit of relay 1102.

With the sender sequence switch 1910 in position 10, check switch 1210 and sequence switch 1110 in position 12, the fundamental circuit previously traced is again established and relays 1900, 1102, 1103 and 1104 again energize. At the sender under test as soon as sequence switch 1910 reaches position 10 a circuit was established for relay 1905 extending over the upper left contact of cam 1927 (17 to 13), the upper right contact of cam 1928 (9 to 10), the outer left armature of relay 2316 to ground on conductor 2241. With relay 1905 energized and units register relays 2305 and 2306 both deenergized a circuit is established for the No. 9 counting relay 1966 which may be traced from ground through the upper left contact of cam 1919 (10), the contact of relay 1900, the lower contact of cam 1918 (10), conductor 1959, the left contact of cam 2222 (12), the lower left contact of cam 1932 (18 to 12), the upper right contact of cam 1932 (10), the left armature and back contact of relay 2306, the outer right armature and back contact of relay 2305, lead 2326, lead 1917, the inner armature and front contact of relay 1905, the armature and back contact of No. 9' counting relay 1965 to battery through the winding of counting relay 1966. In response to the operation of interrupter 1208, sender stepping relay 1900 periodically deenergizes causing the operation of the counting relays in succession as previously described until relays 1906 and 1908 energize. When the fundamental circuit is opened, the sender counting relays are unlocked, and the sender sequence switch 1910 is advanced into position 12.

When the fundamental circuit is opened relays 1103 and 1104 deenergize and if the sender has functioned properly, counting relays No. 0 to No. 5 inclusive of the test device are energized and locked and a circuit is thereupon effective for relay 1206 extending as previously traced over conductor 1241, the lower left contact of cam 1220 (12), conductor 708, the lower left contacts of units register cam 709 (6), conductor 706 and thence to ground as described in connection with the tens selection through the back contact of the No. 6 counting relay 1134 and the front contacts of counting relays No. 0 to No. 5, inclusive. Relay 1206, upon energizing, establishes a circuit for advancing check switch 1210 out of position 12 into position 13. Check switch 1210 upon leaving position 12 opens the circuit of the progress lamp FU and the locking circuits of the counting relays and upon reaching position 13 closes the previously traced circuit over the lower contact of cam 1236 for advancing the sequence switch 1110 into position 13. Since relay 913 is at the time energized a circuit is established as soon as the check switch 1210 reaches position 13, extending from battery through the windings of relays 1211 and 1212 in parallel, the lower contact of cam 1232 (13), the right contact of cam 320 (3 to 4), conductor 818, the inner right armature and contact of relay 913, the inner right armature and back contact of relay 912, conductor 924 to ground at the lower right contact of cam 1340 (2 to 18). Relay 1211, upon energizing, closes the previously traced circuit extending over conductor 1253 for advancing sequence switch 1110 out of position 13 into position 17. With sequence switch 1110 in position 17 the fundamental circuit is extended through the front contacts of relay 1212 to battery and ground at the contacts of cams 1111 and 1112, whereby the direction of current flowing over the fundamental circuit is reversed. Sequence switch 1110 is immediately driven out of position 17 into position 18 over a circuit extending through its magnet winding, the upper left contact of cam 1106 (17), conductor 1133 and thence to ground at the lower left contact of cam 300 (3 to 1) and upon reaching position 18 advances check switch 1210 out of position 13 into position 14 as previously described.

When check switch 1210 leaves position 13 the circuit for relays 1211 and 1212 is opened and these relays deenergize. A circuit is at this time completed from ground at the lower left contact of cam 1919 (12), the lower right contact of cam 2224 (12), the upper left contact of cam 2225 (5¾ to 12), conductor 1550 and thence to conductor 1319 as previously described, left armature and back contact of relay 1215, the lower contact of cam 1233 (14 to 18) and the winding of relay 1214, conductor 1247 to battery at the right contact of class register cam 319 (3 to 6). Relay 1214, upon energizing in this circuit, causes the energization of relay 1209 which in turn establishes a circuit from battery through the winding of check switch magnet 1210, the upper left contact of cam 1203 (14), the left armature and back contact of relay 1231, the outer armature and front contact of relay 1209, conductor 1244, the lower contact of class register cam 314 (3 to 6), conductor 315, the upper left contact of cam 1329 (16) to ground at the upper right contact of cam 1314 (16). From this point the circuits of the test device restore in the manner previously described and the sender under test is released and prepared for operation in response to the next test call.

*Second local semi-mechanical test call.*

The next test call is made with the number switch 810 in position 6 and relay 913 energized as previously described. The registers of the test device are now set by the number switch 810 in accordance with the designation 2, 2, 2, 2, 0, 6, 5, 5, 0, of the second local semi-mechanical test call given in the aforementioned table, this setting being the same as for the preceding test call with the exception that the hundreds register is set for the digit 6 into position 7. Consequently, when the control switch 1310 is in position 3 for transferring the registration of the hundreds register to the incoming group register relays of the sender under test, register relay 2317 and relays 2409 and 2410 are operated. During this test, the test device functions in the manner described for the preceding test call and following each digital selection the check switch 1210 advances if the sender functions correctly until the check switch 1210 reaches position 13. When the control switch 1310 reaches position 2 at the commencement of the transfer of registration from the registers of the test device to the register relays of the sender, a circuit was closed for relay 912 extending from battery through the outer right armature and contact of relay 913, the left winding of relay 912, conductor 1342 to ground at the lower left contact of cam 1340 (2 to 13) and relay 912 is locked over its right winding and inner right armature to ground at the lower right contact of cam 1340 (2 to 18) as previously described. When the check switch 1210 reaches position 13 following the test of units selection, a circuit is closed for advancing the number switch from position 6 to position 7 which may be traced from battery through the magnet winding of switch 810, the lower right contact of cam 816 (6), conductor 932, the inner left armature and front contact of relay 912, conductor 921, the left contacts of cam 1229 (13), conductor 1337 to ground at the lower left contact of cam 1300 (16 to 17). As soon as the number switch 810 leaves position 6 the locking circuit of relay 913 is opened and relay 913 deenergizes, opening the locking circuit of relay 912. A circuit is also established at this time for relays 1211 and 1212 extending as previously traced over conductor 818, thence to ground at the upper left contact of cam 804 (7). With relays 1211 and 1212 energized the check switch 1210 is advanced and the circuits of the test device and sender under test are restored and prepared for the next test call in the manner previously described.

*First distant semi-mechanical test call.*

With the number switch 810 in position 7 a test call is established in accordance with the designation 3, 3, 3, 3, 7, 0, 1, 1, 0 in the aforegoing table simulating a call to a distant semi-mechanical office and the class register of the test device is for this purpose set into position 4, the district brush register into position 4, the office brush register into position 10, the district group register into position 4, the office group register into position 4, the thousands register into position 8, the hundreds register into position 1, the tens and units registers into position 11 and the station register into position 1. As previously described when all registers have been set the control switch 1310 is advanced into position 2 and from thence into position 12 transferring the registration set up upon the registers of the test device to the relay registers of the sender under test. The sender under test functions in the manner previously described except that a different combination of relay registers is operated and the class switch 2010 of the sender is advanced into position 12. When the control switch 1310 reaches position 10 the circuit previously traced extending over the upper right contact of cam 1340 (10 to 12¼) is established for advancing the number switch 810 into position 8. In position 8 switch 810 closes a circuit extending from battery through the winding of relay 911 and the lower left contact of cam 821 (8) for energizing relay 911 which locks over its right armature contact to ground at the right contact of cam 821 until after the number switch leaves position 9. With the number switch 810 in position 8 the previously traced circuit is established for advancing control switch 1310 out of position 12 into position 15 from which position it advances into position 16, as soon as the check switch 1210 advances out of its normal position. With the number switch 810 in position 8 and the control switch 1310 in position 16 a circuit is established for relay 913 which extends from ground, the upper contact of cam 821 (8), the right winding of relay 913, conductor 928 to battery through the lower contacts of cam 1303. Relay 913 causes the energization of relay 912 over circuits previously described. From this point the test proceeds in the same manner as described for the last test call, the circuits of the test device and the sender under test being restored into condition preparatory for the next test call upon the successful completion of the test call.

*Second distant semi-mechanical call.*

The second distant semi-mechanical test call is made with number switch 810 in position 8 and with relays 911, 912 and 913 energized, in accordance with the designation 3, 9, 3, 3, 7, 6, 1, 1, 0, set forth for the second distant semi-mechanical test call appearing in the aforementioned table. The registers of the test device retain the same setting as for the first distant semi-mechanical test call with exception that the district group register advances to position 10 and the hundreds register advances to position 7. As previously described when all registers have been set the control switch 1310 moves to position 2 and thence through intermediate positions into position 12, transferring the register settings to the register relays of the sender under test. The sender under test functions as before except that a different combination of register relays is operated. When the check switch 1210 passes into position 13 following the test of units selection, a circuit is closed for advancing the number switch 810 out of position 8 into position 9 which may be traced from battery through the magnet winding of switch 810, the lower right contact of cam 816 (8), conductor 932, the inner left armature and front contact of relay 912, conductor 921, the left contacts of cam 1229 (13), conductor 1337 and from thence to ground at the lower right contact of cam 1300 (16 to 17). As soon as the number switch 810 advances out of position 8 the locking circuit of relay 913 is opened at the upper contact of cam 821. Relay 911 is, however, still maintained locked over the right contact of cam 821. Upon completion of this test call the circuits of the test device and the sender under test restore to a position in which they are receptive for the next test call which is in simulation of a call to a local relay call indicator office designed to operate upon 54 volt current.

*Test call in simulation of a call to a local relay call indicator office.*

The first relay call indicator test call is made with number switch 810 in position 9 and relay 911 energized and is in accordance with the designation 4, 4, 4, 4, 4, 6, 0, 0, J set forth therefor in the aforementioned table. For controlling this test call the registers of the test device are set by the number switch 810 as follows: the class register into position 2, district brush register into position 5, district group register into position 14, office brush register into position 11, office group register into position 5, thousands register into position 14, hundreds register into position 7, tens and units registers into position 1 and stations register into position 5. As previously described when all registers have been set, control switch 1310 moves into position 2 and thence through intermediate positions into position 12 transferring the settings of the registers of the test device to the register relays of the sender under test. Since this test call is a local relay call indicator call the class switch 2010 of the sender is set into position 13. As soon as control switch 1310 reaches position 12 a circuit is established over the upper left contact of cam 1332 (12), conductor 815, the outer left armature and front contact of relay 911, conductor 1341 to ground at the upper right contact of cam 1340 (10 to 12¼) for advancing the control switch into position 15 from which position it is advanced into position 16 as previously described. With the class register 210 in position 2 a circuit is now established for relay 1600 which may be traced from battery through the winding of this relay, conductor 1612 to ground at the upper left contact of the class register cam 316 (1 to 2). A circuit was closed in position 2 of sequence switch 1310, from battery over the left contact of cam 822 (9), conductor 923, the left winding of relay 912, conductor 1342 and thence to ground at the lower left contact of cam 1340 (2 to 13) and relay 912 thereupon locked over its right winding and conductor 924 to ground at the lower right contact of cam 1340 (2 to 18).

The test device now functions in the manner previously described for testing the selective operations of the sender through the office group selection and if the sender functions accurately the check switch is then advanced into position 7. A circuit is now effective for relays 1211 and 1212 extending through the upper left contact of cam 1232 (6¾ to 12), the upper contacts of class register cam 317 (2), conductor 927 and thence to ground at the lower left contact of cam 804.

At the sender under test the sender sequence switch 1910 is in position 14 and the fundamental circuit therefore extends from conductor 1547, over the right contact of cam 2204 (11), the lower contact of cam 1920 (14 to 14¾), the winding of relay 1901, the upper right contact of cam 1955 (14 to 17), resistances 1954 and 1935, conductor 1968, conductor 2047, the lower contact of cam 1942 (14 to 14¾), the left contact of cam 2202 (11), conductor 1548 and thence over the fundamental circuit as traced. Relay 1901 energizes in this circuit and closes a circuit for relay 1903 which in turn establishes a circuit through the winding of sequence switch magnet 1910, over the upper contact of cam 1933 (14), conductor 2033, the left contact of cam 2006 (13 to 17), conductor 2066 to ground at the outer right armature of relay 1903, for moving sequence switch 1910 out of position 14 and into position 15. Upon reaching position 15, sequence switch 1910 is moved into position 16 over a circuit closed through its magnet winding, the lower contact of cam 1933 (15), conductor 2034, the right contact of cam 2001 (7 to 3), conductor 2035, thence to ground at the right contact of cam 2120 (1).

With the sender sequence switch 1910 in position 16, a circuit is closed from ground through the upper right contact of cam 2209 (11), the left contacts of cam 1928 (14 to 16), upper contacts of cam 2004 (13), conductor 1551, brush 1514, conductor 1315, the inner right armature and front contact of relay 1211, the upper left contact of cam 1233 (7), windings of relays 1214 and 1213, conductor 1258 to battery through the lower left contact of class register cam 319 (1 to 2). The relays 1213 and 1214 energize in this circuit, relay 1214 closing a circuit for relay 1209 which in turn closes a circuit over its inner right armature and front contact and the upper contact of cam 1230 (5 to 12) to advance check switch 1210 out of position 7. As soon as the check switch leaves position 7 the circuit traced for relays 1213 and 1214 is opened at the contact of cam 1233 (7) and these relays thereupon deenergize. With check switch 1210 now in position 8 a circuit is established from ground at the back contact of relay 1205, over the upper left contact of cam 1236 (8), conductor 1237 and the lower left contact of cam 1106 (6) for driving sequence switch 1110 into position 8. In position 8 of sequence switch 1110 and with relay 1211 energized, a circuit is established from ground at the left armature and contact of relay 1211, conductor 1253, the upper right contact of cam 1107 for driving sequence switch 1110 out of position 8 into position 17. Upon the movement of switch 1110 into position 17 and with relay 1212 energized, reverse battery current is connected to the fundamental circuit over the contacts of cams 1111 and 1112.

With sequence switch 1910 in position 16 the fundamental circuit is changed at the sender so that it extends from conductor 1547, over the right contact of cam 2204 (11), the upper contact of cam 1920 (14¾ to 16), the outer left armature and front contact of relay 1903, resistance 1944, the upper left and lower right contacts of cam 2201 (11), the winding of relay 1904, the contacts of cam 2008 (13), the lower contacts of cam 1937, resistance 1935, conductor 1968, conductor 2047, the inner left armature and front contact of relay 1903, the upper contact of cam 1942 (14¾ to 16), the left contact of cam 2202 (11) and thence to conductor 1548. Polarized relay 1904 is included in this latter fundamental circuit and responds to the reverse current applied to the fundamental circuit over cams 1111 and 1112, and connects ground to conductor 1320 in the manner previously described whereupon relays 1214 and 1213 are again energized over a circuit extending from battery at the lower left contact of class register cam 319 (1 to 2), conductor 1258, the windings of relays 1213 and 1214, the right contact of cam 1233 (8 to 12), the outer right armature and front contact of relay 1211 to ground on conductor 1320. Relay 1214, upon energizing, closes the circuit of relay 1209, which in turn, again closes the circuit over cam 1230 (5 to 12) for advancing check switch 1210 out of position 8 into position 13. Upon reaching position 13 the check switch opens the circuit of relays 1211 and 1212 at the contact of cam 1232 (6¾ to 12) and these relays thereupon release. A circuit is also closed at this time from battery, the left contact of cam 822 (9), conductor 926, the upper contacts of cam 1200, conductor 1384, the contacts of cam 1343 (16 to 17), conductor 925, the outer right armature and front contact of relay 912, the right armature and front contact of relay 911 to the winding of relay 911 shunting the winding of relay 911 and causing its deenergization. A circuit is now closed for advancing control switch 1310 out of position 16 into position 17 extending from battery through the magnet winding of switch 1310, the upper right contact of cam 1332 (16), conductor 922, back contact and inner left armature of relay 911, conductor 1257 to ground at the lower right contact of class register cam 300 (7 to 2). Check switch 1210 is now advanced out of position 13 into position 14 over a circuit extending from ground at the upper left contact of cam 804 (9), conductor 818, the left contact of class register cam 320 (5 to 2), conductors 321 and 1254, the upper left contact of cam 1202 (13) and thence to battery through the winding of the magnet of check switch 1210. With check switch 1210 in position 14 a circuit is closed for immediately advancing it into position 16 which may be traced from its magnet winding over the upper right contact of cam 1203 (14), conductor 927 and thence to ground at the lower left contact of cam 804 (9). The circuits of the test device and of the sender under test are from this point restored into condition receptive for the next test call in the manner previously described, the locking circuit of relay 912 being opened at the lower right contact of cam 1340 as soon as the check switch moves beyond position 18.

It is to be noted that for the test call just completed no check was made of the operation of the sender for the numerical or stations portions of the test call designation since this test is made primarily for testing the sender for response to an office overflow condition. Another test is now made with the number switch 810 still in position 9 and the registers of the test device set in the same positions as for the last test call. The control switch 1310 proceeds in the manner previously described to transfer the registration to the register relays of the sender during its rotation from positions 2 to 12 and in passing through positions 10 to 12¼ closes the previously traced circuit extending over the upper right contact of cam 1340 (10 to 12¼) for driving the number switch 810 out of position 9 into position 10. When the number switch 810 reaches position 10 the previously traced circuit is established over the upper right contact of cam 804 for advancing control switch 1310 into position 15, from which position it is advanced into position 16 as soon as the check switch leaves normal. The test proceeds as previously described through the district and office selections whereupon the check switch 1210 advances to position 7 and sequence switch 1110 advances to position 6. A circuit is now closed to advance the control switch 1310 into position 17 which may be traced from battery through the magnet winding of switch 1310, the upper right contact of cam 1332 (16), conductor 922, the inner left armature and back contact of relay 911, conductor 1257 to ground at the lower right contact of class register cam 300 (7 to 2). A circuit is now closed for the progress lamp DRCI extending from battery over the lower right contact of cam 1226 (7), conductor 1259, lamp DRCI, conductor 1260 to ground at the upper left contact of class register cam 323 (1 to 2).

With check switch 1210 in position 7 and the sender sequence switch 1910 in position 16, a fundamental circuit is established between the sender under test and the call indicator of the test device shown in Figs. 16, 17 and 18, which may be traced from battery at the inner left armature and back contact of relay 1611, contact 1613 of key RCI, windings of relays 1608 and 1609, the inner armature and back contact of relay 1606, conductor 324, the lower contacts of class register cam 322 (1 to 2), the upper left contact of cam 1234 (7), the left armature and back contact of relay 1212, conductor 1326, thence over the fundamental circuit as previously traced through the windings of relays 1901 and 1904, over conductor 1423, the right armature and back contact of relay 1212, the lower contact of cam 1222 (7), conductor 1614, contact 1616 of key RCI, the intermediate left armature and back contact of relay 1611, conductor 1617 to ground at the upper right contact of cam 1218 (6¾ to 14). Relay 1609 being marginal does not operate but relay 1608 energizes and closes a circuit for relay 1610 which may be traced from battery through the left winding of relay 1610, the armature and back contact of relay 1609, conductor 1618, a normally closed contact of key RCI, contact of relay 1608 to ground on conductor 1617. Relay 1610, upon energizing, locks in a circuit extending from battery through its left winding, the armature and back contact of relay 1609, conductor 1618, the inner left armature and front contact of relay 1610 to ground on conductor 1617 and at its outer left armature establishes a shunt around relay 1608 through resistance 1619. Relay 1610 also closes a circuit for advancing sequence switch 1110 out of position 6 into position 8 which may be traced from battery through the magnet winding of switch 1110, the lower left contact of cam 1107 (6), conductor 1138, contact 1620 of key RCI to ground at the right armature and contact of relay 1610. As switch 1110 advances through position 7 1/4 a circuit is established from battery at the right contact of cam 1108 (7½), conductor 1139, the left winding of relay 1611 to ground at the right armature and contact of relay 1610 and relay 1611, upon energizing, locks in a circuit extending from battery through its right winding and right armature contact to ground on conductor 1617. With sequence switch 1110 in position 8 a circuit is established for the call indicator progress lamp 1140 which may be traced from ground through the left contacts of cam 1100 (8), conductor 1141 to battery at the lower right contact of cam 1226 (7). Relay 1611, upon operating, establishes a new locking circuit for relay 1610 extending through the right winding of relay 1610 and the right armature and contact of relay 1611 to ground on conductor 1617 for holding relay 1610 energized after the later energization of relay 1609. Relay 1611 also disconnects the 22 volt lead of the battery at its inner left armature and back contact and connects all of the cells of the battery into the fundamental circuit. At its intermediate left armature and back contact relay 1611 removes the shunt from the thousand ohm resistance 1615 whereupon this resistance is included in the fundamental circuit.

With the entire battery potential of 54 volts applied to the fundamental circuit through the windings of relays 1608 and 1609, the marginal relay 1609 receives sufficient current to operate, relay 1608 being maintained operated. With relay 1609 operated, a circuit is now established for relay 1607 extending from battery through the winding of relay 1607, conductor 1621, the outer left armature and front contact of relay 1611, the armature and front contact of relay 1609, the inner left armature and front contact of relay 1610 to ground on conductor 1617. Relay 1607, upon energizing, locks over its right armature and front contact to ground on conductor 1617 and at its left armature and front contact connects ground to the conductor 1624 for furnishing a locking ground connection for the various control and lamp relays of the call indicator. A circuit is also established from ground on conductor 1617 over the right armature and front contact of relay 1607, conductor 1622, conductor 1253, the upper right contact of cam 1107 (8 to 16) and through the magnet winding of sequence switch 1110 for driving the sequence switch out of position 8 into position 17. With sequence switch 1110 in position 17 a circuit is established for relay 1606 extending from battery at the left contact of cam 1108 (17 to 18), conductor 1623, the winding of relay 1606 and thence to ground on conductor 1624. Relay 1606 upon operating opens the fundamental circuit, simulating the opening of the fundamental circuit which occurs on a regular relay call indicator call when the operator depresses an assignment key to connect her call indicator with the incoming trunk. At its armatures and front contacts relay 1606 now connects the call indicator control relays 1603, 1604 and 1605 in series with the fundamental circuit extending from the sender under test.

At the sender, upon the opening of the fundamental circuit by the relay 1606, relay 1901 deenergizes, opening the circuits of relays 1902 and 1903. Relay 1903, upon deenergizing, closes a circuit extending from battery through the magnet winding of impulser 2110, the lower left contact of cams 2119 (1), conductor 2123, the lower contacts of cam 1924 (16), the inner right armature and back contact of relay 1903, conductor 1979 to ground at the contact of class switch cam 2002 (13). Conductor 1326 of the fundamental circuit is now connected over conductor 1547, the right contact of cam 2204 (11), the upper contact of cam 1920 (14¾ to 16), the outer left armature and back contact of relay 1903, the contacts of cam 2013 (13) to conductor 1982 of the impulser circuit of Fig. 21, and conductor 1423 of the fundamental circuit is connected over conductor 1548, the left contact of cam 2202 (11), the upper contact of cam 1942 (14¾ to 16), the inner left armature and back contact of relay 1903, conductor 1981, the contacts of cam 2015 (13), conductor 2068 to the relay call indicator impulser circuit of Fig. 21. The impulse switch 2110 now proceeds to rotate from position 1 through position 17 transmitting relay call indicator code impulses in accordance with the registration set up upon the numerical and stations register relays of the sender, all in the manner well-known in the art and as described in full in the application of F. A. Stearn heretofore referred to.

At the test device, relay 1604 operates upon impulses from negative battery, relay 1603 operates on impulses from positive battery and the marginal relay 1605 operates on either positive or negative heavy current impulses in the same manner as regular relay call indicator circuits. By negative battery it is meant that the positive terminal of battery is connected to conductor 1326 and thence to conductor 324 and the negative terminal to conductor 1423 and thence to conductor 1614. By positive battery it is meant that the terminals of the battery are connected in a reverse manner to conductors 1326 and 1423.

To set the register relays for any digit a maximum of four impulses are received by the call indicator, the first and third being always either light positive or absence of current and the second and fourth impulses being either light or heavy negative current. For example, to set the stations relays for the party J, the impulses received are first light negative, second, positive, and third, light negative, there being only three impulses in the code. The first light negative impulse operates relay 1604 which closes a circuit extending from ground on conductor 1624 through its armature and contact, the right armature and back contact of relay 1601, the winding of relay 1602 and thence to battery through the right winding of relay 1601. Relay 1601 is marginal and does not operate on current through its right winding. Relay 1602, upon operating, locks in a circuit extending from ground on conductor 1624 through its left armature and front contact, the left winding of relay 1601, the winding of relay 1602 to battery through the right winding of relay 1601. The left winding of relay 1601 is shunted, however, and the relay does not operate at this time. Relay 1602, upon operating, establishes a circuit for relay 1628 extending from battery through the winding of relay 1628, the right armature and back contact of relay 1629, conductor 1625, contact 1626 of relay 1600, conductor 1627, the inner right armature and front contact of relay 1602 to ground on conductor 1624. Relay 1628, upon energizing, closes a locking circuit for itself extending through its own winding, the winding of relay 1629, the inner right armature and front contact of relay 1628 to ground on conductor 1624, relay 1629 being shunted does not energize at this time. When relay 1604 deenergizes upon the termination of the first impulse, relay 1601 energizes. On the next impulse which is positive, relay 1603 energizes closing a circuit from ground through its armature contact, the outer right-hand armature and front contact of relay 1602, conductor 1630, contact 1631 of relay 1600, conductor 1632, the inner left armature and front contact of relay 1628, the inner left armature and back contact of relay 1633, conductor 1634 and thence to battery through the lower winding of stations lamp relay 1800. Relay 1800, upon energizing, locks to ground on conductor 1624 through both of its windings and its intermediate armature and front contact. On the next impulse which is negative, relay 1604 again energizes, shunting down relay 1602, and when relay 1604 again deenergizes upon the termination of the impulse, relay 1601 deenergizes. As both relays 1601 and 1602 are deenergized the shunt is removed from around the winding of relay 1629 and this relay energizes in series with relay 1628, connecting conductor 1625 through the right armature and front contact of relay 1629, the right armature and back contact of relay 1635 to the winding of relay 1633 preparatory to controlling the setting of the thousands lamp relays.

Thousands, hundreds, tens and units impulses are recorded in a similar manner as just described for stations impulses, the two negative impulses of each code serving to operate and release relays 1602 and 1601 and the operation and release of these relays controlling the operation of a set of control relays corresponding to relays 1628 and 1629. Under the assumption that the numerical designation which should be registered on the lamp relays of the call indicator is J 4600 then the thousands register relay 1700, the hundreds register relays 1801 and 1802 are operated and locked and no tens and units relays are operated. With the stations relay 1800 energized a circuit is now closed extending from ground on conductor 1624 over the outer right armature and front contact of relay 1633, conductor 1636, the lower armature and back contact of relay 1803, the upper armature and back contact of relay 1804, the lower armature and front contact of relay 1800, the J lead 1805, the J lead 609 Fig. 6, the lower right contact of cam 611 (5), the winding of relay 602, conductor 1430, the contacts of cam 1431 (8 to 9) to battery through the left contacts of cam 1344 (17 to 1¼). A circuit is also established from ground on conductor 1624, over the outer right armature and front contact of relay 1637, conductor 1640, the upper armature and back contact of relay 1704, the lower armature and front contact of relay 1700, the upper armature and back contact of relay 1703, the lower armature and back contact of relay 1701, the No. 4 lead 1702, the No. 4 lead 414 (Fig. 4), the lower left contacts of cam 413 (14), winding of relay 402 to battery on conductor 1430. A similar circuit is established extending from ground on conductor 1624, through the outer right armature and front contact of relay 1638, conductor 1641, the upper armature and back contact of relay 1806, the lower armature and back contact of relay 1807, the inner lower armature of relay 1802 and its front contact, the outer right armature and front contact of relay 1801, the No. 6 lead 1808, the No. 6 lead 416 Fig. 4, the upper right contact of cam 417 (7) to battery through the winding of relay 403. Another circuit is extended at this time from conductor 1624, through the outer right armature and front contact of relay 1639, conductor 1642, the upper armature and back contact of relay 1809, the lower armature and back contact of relay 1810, the inner lower armature and back contact of relay 1811, the intermediate armature and back contact of relay 1812, the No. 0 lead 1813, the No. 0 lead 613 Fig. 6, the lower left contact of cam 614 to battery through the winding of relay 600. Another circuit is established from ground on conductor 1624, through the outer armature and front contact of relay 1644, conductor 1643, the upper armature and back contact of relay 1815, the lower armature and back contact of relay 1816, the inner lower armature and back contact of relay 1814, the intermediate armature and back contact of relay 1817, the No. 0 lead 1818, the No. 0 lead 615 (Fig. 6), the lower left contact of cam 616 (1) and to battery through the winding of relay 601. With relays 402, 403, 600, 601 and 602 energized a circuit is closed from ground at the upper left contact of class register cam 325 (1 to 2), conductor 415, the left armatures and front contacts of relays 402, 403, 600, 601 and 602, conductor 1261, the upper right contact of cam 1202 (7 to 12) and to battery through the magnet winding of check switch 1210 for advancing the check switch into position 13. In position 13 a circuit is closed from ground over the lower right contact of cam 1300 (16 to 17), conductor 1337, the left contacts of cam 1229 (13), conductor 921, the inner left armature and back contact of relay 912, conductor 817, the lower left contact of cam 816 (10) and through the magnet winding of number switch 810 for advancing the number switch out of position 10 into position 11. Upon reaching position 11 a circuit is closed over the upper left contact of cam 804 (11), conductor 818, the left contact of cam 320 (5 to 2), conductors 321 and 1254, the upper left contact of cam 1202 for advancing check switch 1210 into position 14.

At the sender under test when the impulser switch 2110 reaches position 17 following the transmission of code impulses, a circuit is closed from ground over the upper right and lower left contacts of cam 2121 (17), the lower contacts of cam 2024 (1), conductor 1983, the upper contacts of cam 1940 (16), resistance 1946, the lower left contact of cam 2224 (11), the upper left contact of cam 2225 (5¾ to 12), conductor 1550, thence to conductor 1319, the left armature and back contact of relay 1215, the lower contact of cam 1233 (14 to 18), the windings of relay 1214 and 1213, conductor 1258 and thence to battery through the lower left contact of class register cam 319 (1 to 2). Relay 1214 being marginal does not energize in this circuit and with relay 1213 energized a circuit is thereupon established from ground through the inner armature and back contact of relay 1209, the armature and front contact of relay 1213, the left armature and back contact of relay 1231, the upper left contact of cam 1203 (14) for advancing check switch 1210 out of position 14 and into position 16. From this point the circuits of the test device and of the sender under test are restored and prepared for the next test call. Control switch 1310 upon leaving position 17, opens the circuits of relays 402, 403, 600, 601 and 602, and check switch 1210 upon leaving position 14 removes ground at the upper right contact of cam 1218 (6¾ to 14) from conductor 1617 for restoring the circuits of the call indicator to normal position. Relay 1600 is not restored at this time.

*Second local relay call indicator test call.*

With the number switch 810 in position 11 the sender under test is tested in accordance with the designation of a second local relay call indicator call appearing in the aforementioned table as 3, 5, 0, 5, 7, 4, 2, 2, R. For this test call the class register 210 is maintained in position 2. When all of the registers of the test device have received their settings from the number switch 810, the control switch 1310 advances into position 2 and from thence into position 12 transferring the settings of the registers to the register relays of the sender under test. In passing position 10 the previously traced circuit is closed for advancing the number switch 810 out of position 11 into position 12. For setting the district brush register 240 for this call, with the number switch 810 in position 11, a circuit is established for relay 825 which may be traced from battery, the upper contact of cam 822 (11), conductor 824, the winding of relay 825, conductor 826, the lower contact of cam 827 (11), conductor 828, the outer left armature and back contact of relay 1438, conductor 1440, the normal contact of key TR, conductor 1441, to ground at the lower right contact of class register cam 323 (18 to 2). With relay 825 energized a circuit is established for the stop relay 201 of the district brush register when the district brush register reaches position 4 which may be tracted from ground on conductor 828, the lower contacts of cam 827 (11), conductor 826, the armature and front contact of relay 825, conductor 829, the upper contact of cam 209 (3½ to 4), the winding of relay 201 and thence to battery on conductor 1433. The circuits of the stop relays of the other registers extend to ground at cam contacts of switch 810 in the manner described for the first test call. Following the transfer of registration to the sender under test, the circuits of the test device function in the same manner as for the preceding call. As soon as check switch 1210 reaches position 13 upon the completion of the test a circuit is established over the contacts of cam 1229 (13), as previously described, for advancing the number switch 810 into position 13. From this point the circuits of the test device and the sender under test are restored and prepared for the next test call in the manner previously described.

*First distant relay call indicator test call.*

With the number switch 810 in position 13 the sender under test is tested for a call simulating a call for a distant relay call indicator office and for this purpose the class register of the test device is set into position 1 and the designation 4, 1, 0, 1, 9, 8, 8, 8, W is set up upon the other registers of the test device in accordance with the table hereinbefore mentioned. Since it is necessary to set the district brush register into position 5 for the designation 4, relay 825 is at this time deenergized and a circuit is, therefore, established for the stop relay 201 of the district brush register which may be traced from ground on conductor 828, the lower contact of cam 827 (13), the armature and back contact of relay 825, conductor 831, the upper left contact of cam 209 (4½ to 5), winding of stop relay 201 to battery on conductor 1433 and the register is, therefore, arrested upon reaching position 5. Relay 837 is also operated at this time over the upper contact of cam 805 (13) and furnishes ground for controlling the stop relays of the units and stations registers. When the setting of the registers is completed control switch 1310 moves to position 2 and from thence through intermediate positions to position 12, transferring the designation set up upon the registers of the test device to the register relays of the sender under test. In passing through position 10 the previously traced circuit is established for advancing the number switch 810 out of position 13 into position 14. Since the call is for a distant relay call indicator office, the class switch of the sender is set in position 2 and the sender circuits function in the same manner as described for the preceding relay call indicator test calls, except that during the office selections a thousand ohm resistance 1250 is connected to the fundamental circuit through the upper left contact of cam 1222 (5 to 6). As in the previous test upon the operation of relay 1609 sequence switch 1110 advances into position 17 and immediately advances out of position 17 into position 18 over a circuit extending through the upper left contact of cam 1106 (17), conductor 1133 to ground at the lower left contact of class register cam 300 (3 to 1). When, therefore, check switch 1210 reaches position 13 following the setting of the relay call indicator relays of Figs. 17 and 18, it is advanced to position 14 by reason of a circuit existing through its winding, the upper left contact of cam 1202 (13), conductor 1254 and to ground at the lower left contact of cam 1112 (18). During the movement of check switch 1210 through position 13 the number switch 810 is advanced out of position 14 into position 15 over a circuit previously described. The circuits of the test device and of the sender under test are restored and prepared for the next test call in the manner previously described.

A second distant relay call indicator call is now made with the number switch 810 in position 15 and the sender is tested in accordance with the designation 0, 0, 2, 0, 2, 2, 4, 4, M, the registers of the test device being set in accordance with this designation and the class register remaining as before in position 1. Relay 838 is at this time operated over the right contact of cam 805 (15) and controls the setting of the stations register. When all of the registers have received their settings control switch 1310 advances into position 2 and from thence into position 12 transferring the registration from the registers of the test device to the relay registers of the sender under test and in passing through position 10 advances the number switch 810 out of position 15 into position 16 as previously described. When the number switch 810 reaches position 16 a circuit is established for relay 1438 extending from battery through the left contact of cam 1414 (8 to 12), winding of relay 1438, conductor 933 and thence to ground through the upper left contact of cam 830 (16), and relay 1438 closes an obvious locking circuit for itself through its inner right armature and contact. From this point the test proceeds in the same manner as the preceding test call, the number switch 810 being advanced into position 17 when the check switch 1210 reaches position 13.

With the number switch 810 in position 17 the sender under test is tested for a third distant relay call indicator test call with the designation 0, 0, 2, 0, 2, 2, 4, 4, I, and all of the registers retain their former setting except the stations register which now takes a new setting to register the stations designation I. When all of the registers have received their settings, the control switch 1310 advances to position 2 and thence through intermediate positions to position 12 transferring the registrations from the registers of the test device to the register relays of the sender under test. The control switch in passing through position 10 causes the advance of the number switch 810 into position 18. From this point the test proceeds as for the two preceding test calls. Upon the advance of number switch 810 into position 18 a circuit is closed over the lower left contact of cam 819 (18), conductor 934, the lower left contact of cam 1400 (8) and thence to battery through the magnet winding of sequence switch 1410 for advancing this sequence switch into position 9. With number switch 810 in position 18 a circuit is also closed for relay 912 extending from battery through the lower left contact of cam 822 (18), conductor 923, the left winding of relay 912, conductor 1342 and thence to ground at the lower left contact of cam 1340 (2 to 13) and this relay, upon energizing, locks over its right winding and inner right armature contact over conductor 924 to ground at the lower right contact of cam 1340 (2 to 18).

When the check switch 1210 reaches position 13 following the checking of all of the selections of the test call, the previously traced circuit is established from ground at the lower right contact of cam 1300 (16 to 17), through the inner left armature and front contact of relay 912 and the lower right contact of cam 816 (18) for advancing the number switch 810 out of position 18 into its normal position. With number switch 810 in position 1 a circuit is now established from the lower right contact of cam 830 (1), conductor 935, a normal contact of key IS, the lower right contact of cam 1400 (9), through the magnet winding of sequence switch 1410 to battery for driving this sequence switch out of position 9 into position 10. With the check switch 1210 in position 13 and the control switch 1310 in position 17 the circuits of the test device and the sender under test are restored and prepared for the next test call in the manner previously described.

As soon as switch 1310 reaches position 1 a circuit is closed for advancing the number switch 810 into position 11 which may be traced from battery through the magnet winding of switch 810, the upper right contact of cam 816 (1 to 10), conductor 936, the inner left armature and front contact of relay 1438, the right contact of cam 1442 (10 to 12), conductor 1443 and thence to ground at the lower left contact of cam 1300 (1). A circuit is now established for relay 1439 which may be traced from ground at the inner right armature and front contact of relay 1438, the left winding of relay 1439, conductor 937, conductor 824 and thence to battery at the upper contact of cam 822 (11). Relay 1439 upon energizing locks over its right winding and right armature contact, conductor 938 to ground at the lower right contact of cam 819 (11 to 18¼) and is, therefore, maintained locked until the number switch reaches normal after completing its second revolution. With number switch 810 in position 11 a circuit is closed from battery through the magnet winding of sequence switch 1410, the lower left contact of cam 1419 (10), conductor 1445, the upper right contact of cam 830 (11), for advancing sequence switch 1410 into position 11.

Should the test man desire to make the foregoing relay call indicator test calls, using 22 volt battery current rather than 54 volt battery current, the key RCI, Fig. 16, is depressed. With this key depressed these tests are made as before in positions 9, 11, 13, 15 and 17 of the number switch 810 except for the following changes. During the test of the sender on each of these calls for the outgoing trunk test, when the fundamental circuit is closed through relays 1608 and 1609, the conductors of the fundamental circuit extend over conductors 1326 and 324, through the windings of relays 1608 and 1609, resistance 1619 to battery through the 22 volt source of current at the inner left armature and back contact of relay 1611 and conductors 1423 and 1614 of the fundamental circuit extend through resistance 1615 to ground at the upper armature and back contact of relay 1606. It is to be noted that the fundamental circuit now includes both resistances 1615 and 1619 since the shunt around these resistances is removed at contacts of the key RCI. Relay 1608 responds to current flowing over the fundamental circuit, relay 1609 being marginal does not operate upon the lower voltage due to the inclusion of the high resistance of resistances 1615 and 1619. Relay 1608, upon operating, closes a circuit for relay 1607 which may be traced from battery through the winding of relay 1607, conductor 1621, alternate contact of key RCI, the armature contact of relay 1608 to ground on conductor 1617. Since relay 1609 has not operated, neither relay 1610 nor relay 1611 operate and therefore increased battery potential is not connected to the fundamental circuit at the inner left armature and front contact of relay 1611. Key RCI also closes a circuit for relay 1231 extending from battery through the winding of relay 1231, conductor 1262, alternate contact of key RCI, conductor 1612 to ground at the upper left contact of class register cam 316 (1 to 2), this relay energizing in parallel with relay 1600. The relay 1231 upon energizing, functions to place a shunt around resistance 1323 when control switch 1310 is in position 8 for controlling the transmission of code impulses for transferring the registrations set up on the class register 210 to the class register relays of the sender under test. This shunt circuit may be traced from the upper left contact of cam 1331 (8), conductor 1345, the right armature and front contact of relay 1231, conductors 1263 and thence to the upper terminal of resistance 1323.

When, therefore, relay 1312 energizes during the transmission of the recording impulses for recording class registration, the current flowing over conductor 1320 is increased so that both class register relays 2401 and 2403 operate and lock up. Relay 2401, upon energizing, closes a circuit extending from ground on conductor 2419 through the left armature and front contact of relay 2401 to battery through the winding of relay 2100. In a similar manner relay 2403 establishes a circuit for relay 2101. With relays 2100 and 2101 energized a shunt circuit is established around resistances 1935 and 1954 of the sender extending over conductor 1957, the right armature and contact of relay 2100, the right armature and contact of relay 2101, conductor 2102, conductor 1968, thus materially reducing the resistance of the fundamental circuit when the sender sequence switch 1910 reaches position 16 for transmitting relay call indicator code impulses for setting the call indicator of the test device. Relays 2100 and 2101 also establish a shunt around resistance 1946 extending over conductor 1948, the left armatures and front contacts of relays 2100 and 2101, conductor 2103, this shunt reducing the resistance of the circuit extending over conductor 1550, thence to conductor 1319 so that when the sender under test has completely functioned and is in a position to be restored, the current flowing over conductor 1319 is of such strength as to operate both relays 1213 and 1214. Relay 1214, upon energizing, operates relay 1209 which closes a circuit extending from ground through its inner armature and front contact, the left armature and front contact of relay 1231 and the upper left contact of cam 1203 (14) for advancing the check switch 1210 out of position 14 into position 16. From this point the circuit of the test device is prepared for the next test call in the manner previously described.

*Tandem route test calls.*

It will be recalled that following the last distant relay call indicator test call the number switch 810 moved to position 11, positioning sequence switch 1410 in position 11. By reference to the foregoing table it will be noted that the first tandem route test call is for the first tandem route and that the designation is 8, 5, 5, 7, 4, 2, 2, R. For this test call the class register 210 is stopped in position 8, by a circuit which extends from ground at the lower right contact of class register cam 323 (7 to 8), conductor 1441, normal contact of key TR, conductor 1440, the outer right armature and contact of relay 1438, conductor 948, the inner left armature and contact of relay 909, conductor 833, the upper right contact of cam 832 (11 to 12), conductor 211, the upper contact of cam 212 (7½ to 8), the winding of register stop relay 200, conductor 1433, the left contacts of cam 1432 (11) and thence to battery through the right contact of cam 1344 (1⅞ to 1¼). The district brush register is set into position 9, a circuit being established for the stop relay 201 of this register when it reaches position 9 which may be traced from ground at the lower right contact of class register cam 323 (7 to 8), over the circuit previously traced to the upper right contact of cam 832 (11+12), thence over the left contact of cam 832 (11), conductor 834, the lower contact of cam 215 (8½ to 9), winding of relay 201 and thence to battery on conductor 1433. The district group register is set into position 6 by the operation of its stop relay 202 when it reaches position 6, the circuit of relay 202 extending from battery on conductor 1433 through the winding of relay 202, the lower contact of cam 207 (5½ to 6). conductor 216 thence to ground at the lower right contact of cam 808 (11). The office group register is similarly set into position 6 by the operation of its stop relay 401 over a circuit which extends from battery, the upper contact of cam 418 (5½ to 6), conductor 419, thence to ground at the left contact of cam 835 (11). The registrations set up upon the district brush, district group and office group registers determine the tandem hundreds, tens and units designations, respectively, of the test call. The office brush register 410 determines the tandem route which is to be tested and is set from the class switch for the No. 1 route into either position 1, 7 or 13, the register being driven out of any other positions in which it may be standing over a circuit extending from battery on conductor 1428, through the magnet winding of switch 410, the upper left contact of cam 420, conductor 421, to ground at the lower left contact of class register cam 326 (8 to 17). The thousands, hundreds, tens, units and stations registers are set by the number switch in the same manner as for the test calls already considered.

With the class register 210 set in position 8 and the office brush register set in positions 1, 7 or 13, the tandem route switches 1010 and 1050 are advanced to position 2. The circuit for advancing switch 1010, assuming that at the time the switch is standing in position 3, may be traced from battery through the magnet winding of switch 1010, the upper left contact of cam 1034 (3 to 6), conductor 329, thence to ground at the upper right contact of class register cam 327 (8). When the switch 1010 reaches position 7 a circuit is established for advancing it through position 11 into position 12 which may be traced from battery through the magnet winding 1010, the lower left contact of cam 1035 (7 to 11), conductor 330, thence to ground at the lower right contact of cam 328 (8 to 12). Upon reaching position 12 the switch is advanced through position 1 over the circuit previously traced through the upper left contact of cam 1034 (8 to 1). When switch 1010 reaches position 2, there is no circuit for the switch magnet and the switch is, therefore, arrested in position 2. With switch 1010 in position 2, the switch 1050 is also advanced into position 2, it being assumed that switch 1050 was standing in position 3 at the time switch 1010 started to advance. Switch 1050 is advanced from position 3 through position 6 by a circuit extending from ground through the lower right contact of cam 1036 (2) and the lower left contact of cam 1037 (3 to 6) to battery through the magnet winding 1050, and upon reaching position 7 is advanced into position 12 by a circuit extending through the upper contact of cam 1036 (1 to 6) and the upper left contact of cam 1037 (7 to 11). Upon reaching position 12 switch 1050 is advanced into position 2 over a circuit extending from ground, the lower right contact of cam 1036 (2) and the lower left contact of cam 1037 (8 to 1). During the setting of the switches 1010 and 1050, relay 1002 is operated and at its armature contact removes ground from conductor 1003 until after the switches 1010 and 1050 have been set. This is to prevent the advance of control switch 1310 beyond position 7 until after the route switches have been set for the proper tandem route.

When the registers of the test device have all been set, control switch 1310 is advanced as previously described to position 2 and in passing through positions 2 to 5, inclusive, transfers the setting of the numerical and stations registers to the register relays of the sender under test. If the tandem route switches 1010 and 1050 have been set when the switch 1310 reaches position 7 then ground is connected to conductor 1003 at the armature contact of relay 1002 and the control switch thereupon moves into position 8 as previously described and continues to move through the intervening positions into position 12, transferring the registration set up on the district group, office brush and office group registers of the test device, to the register relays of the sender under test.

For the class of test call under consideration, the class register relay 2402 of the sender is operated and the class switch 2010 is therefore advanced into position 6. Office brush register relay 2414 is also energized and since the relay call indicator relay 2327 is not at this time energized, the tendem route switch 2020 is advanced into position 2 where it is arrested. The circuit for advancing switch 2020 out of position 1 may be traced from ground at the lower left and upper right contacts of cam 2205, conductor 2244, the right armature and back contact of relay 2300, conductor 2018, the upper left contact of class switch cam 2017 (6), the lower left contact of cam 2021 (1) and thence to battery through the magnet winding of route switch 2020. Relay 2376 energizes in parallel with the magnet winding of switch 2020. When switch 2020 reaches position 2 there is no circuit for advancing it out of position 2, since the circuit which would under some circumstances be effective for advancing it is open at the outer left armature contact of relay 2327, which relay is not at this time energized. Upon the deenergization of relay 2376, after switch 2020 comes to rest, a circuit is closed from ground at the left armature and back contact of this relay, conductor 2328, the left contact of route switch cam 2055 (2) and thence to battery through the winding of No. 1 tandem route relay 2050. A circuit is also closed at this time for driving the sender sequence switch 1910 out of position 1, which may be traced from battery through the magnet winding of switch 1910, the lower left contact of cam 1934 (17 to 1), the right contacts of cam 2208 (10 to 11), conductor 2228, the right contact of relay 2376, to ground at the left armature and back contact of relay 2300. Sequence switch 1910 upon reaching position 2 advances into position 4, preparatory to controlling district brush selection, in the manner previously described.

As the control switch 1310 of the test device passes through position 10 the previously traced circuit is established for advancing the number switch 810 out of position 11 into position 12. Switch 810 upon reaching position 12 establishes a circuit extending from ground at the upper right contact of cam 804 (12), over conductor 815 and the upper left contact of cam 1332 (12) for advancing control switch 1310 out of position 12 into position 15. Upon reaching position 13 the previously traced circuit is established for advancing check switch 1210 out of position 1 into position 2 and thence into position 3. As soon as check switch 1210 leaves its normal position the control switch 1310 is advanced out of position 15 into position 16 as previously described and is then advanced into position 17 over a circuit extending from battery through the magnet winding of switch 1310, the upper right contact of cam 1332 (16), conductor 922, the inner left armature and back contact of relay 911, conductor 1257 and thence to ground at the lower right contact of class register cam 300 (7 to 2). Check switch 1210 upon reaching position 3, advances sequence switch 1110 into position 2. The circuits of the test device are now in condition for testing the operation of the sender for district brush selection.

During the operation of the sender for controlling district brush selection the progress lamp DB of the test device is operated over a circuit which may be traced from ground through the upper right contact of cam 1216 (3), conductor 1011, cam 1009 (2), thence by jumper wire 1041 to the distributing rack 1000, to battery through the No. 3 register lamp 1042. It is to be noted in this connection that the cam contacts shown in the upper left corner of Fig. 10 are connected to the distributing racks 1000 and 1001 to correspond with the similar connections of the armature contacts of the tandem route relays Fig. 20, of the sender under test. For example, with the tandem route switches 1010 and 1050 in position 2, the No. 2 contacts of the route switch cams are connected to the distributing racks 1000 and 1001 in accordance with the code 3412 which it will be noted is designated at the armature contacts of the No. 1 group relay 2050.

Relays 1102, 1103 and 1104 of the test device and the sender stepping relay 1900 of the sender under test operate over the fundamental circuit as described for previous test calls. Relay 1900, upon energizing, establishes a circuit for the No. 3 counting relay 1909 which may be traced from battery through the upper right contact of cam 1923 (4), the winding of relay 1909, the armature and back contact of relay 1911, the No. 3 lead 1912, lead 2051, Fig. 20, the outer left armature and front contact of relay 2050, the right contact of cam 2032 (2 to 11), the upper contact of cam 1929 (4), the lower contact of cam 1930 (2 to 16), the right contact of cam 2222 (10), conductor 1959, the upper contact of cam 1918 (4), the armature and contact of relay 1900 and thence to ground at the upper right contact of cam 1919 (4). The sender counting relays operate in succession until relays 1906 and 1908 are operated, when the fundamental circuit is opened and the sender sequence switch 1910 is advanced into position 6.

Upon the opening of the fundamental circuit relays 1103 and 1104 deenergize and if the sender has functioned correctly a circuit is closed for relay 1206 for advancing the check switch 1210 into position 4 which may be traced from battery through the winding of relay 1206, conductor 1240, thence to conductor 1241, the upper left contact of cam 1219 (3), conductor 1242, the contact of cam 1005 (2), jumper wire 1043, conductor 1038, the armature and back contact of the No. 4 counting relay 1136, armatures and front contacts of counting relays 1137, 1127, 1126 and 1125, the left contact of cam 1109 (2) and thence to ground at the lower left contact of cam 1204 (3 to 3½). With check switch 1210 advanced to position 4 through the operation of relay 1206 sequence switch 1110 advances to position 3 and the operation of the sender is then tested for district group selection. The progress lamps DG, OB and OG are operated with the check switch in positions 4, 5 and 6, respectively, over contacts of route switches 1010 and 1050, during the testing of district group, office brush and office group selections, respectively, and if the sender functions correctly for these selections, the check switch is advanced through positions 4, 5 and 6 into position 7 in the manner previously described with the exception that the circuit for relay 1206 at the end of each digital selection, is completed over the contacts of cam 1219 and contacts of tandem route switches 1010 and 1050 in the manner described in connection with district brush selection.

Following the completion of office group selection with check switch 1210 in position 7 a circuit is established for the tandem relay call indicator progress lamp TRCI, which may be traced from battery through the lower right contact of cam 1226 (7), conductor 1259, lamp TRCI, thence to ground over the upper right contact of class register cam 323 (8 to 17). The call indicator trunk test is now made and the test device prepared for the reception of call indicator impulses in the same manner as described for the local relay call indicator test calls except that as the class register is in position 8 there is no circuit established for relay 1600 over conductor 1612 and the contact of class register cam 316 and, therefore, the first code impulses which are transmitted to the test device by the sender under test are rendered effective through the armatures and back contacts of relay 1600 and the contacts of control relays 1645 and 1646 for operating the tandem hundreds lamp relays of Fig. 17. The sender functions for transmitting the tandem, numerical and stations code impulses, in the manner fully described in the application of F. A. Stearn hereinbefore noted. Following the transmission of the code impulses for setting the tandem hundreds lamp relays, impulses are received in accordance with the tandem tens, tandem units, thousands, hundreds, tens units and stations designations of the test number registered upon the register relays of the sender under test.

If the sender functions correctly the check switch is advanced into position 13 in the manner described in connection with the local relay call indicator test calls and upon reaching position 13 establishes a circuit for advancing number switch 810 into position 13 which may be traced from battery through the magnet winding of switch 810, the lower left contact of cam 816, conductor 817, the inner left armature and back contact of relay 912, conductor 921, the left contacts of cam 1229 (13), conductor 1337, thence to ground at the lower right contact of cam 1300 (16 to 17). With number switch 810 in position 13 the class register 210 is advanced into position 13 and the tandem group switches 1010 and 1050 into position 7 for testing tandem route No. 6 in accordance with the designation 9, 1, 1, 9, 8, 8, 8, W. In accordance with this designation the registers are set in the manner previously described except that the units and stations registers 640 and 670 are set under control of relay 837 which is energized with switch 810 in position 13, and control switch 1310 is advanced through positions 2 to 12, inclusive, to transfer the registration to the register relays of the sender under test. Since the tandem route to be tested has a number higher than 5, the relay call indicator relay 2327 is operated in addition to the office brush register relay 2414 so that when the tandem route switch 2020 reaches position 2, it is advanced into position 7. The circuit for advancing route switch 2020 out of position 2 into position 7 may be traced from battery through the magnet winding of switch 2020, the inner left armature and front contact of relay 2327, the contact of cam 2019 (2 to 6), the upper contact of cam 2014 (6), conductor 2016, the right armature and back contact of register relay 2413, the left armature and back contact of register relay 2404, the left armature and front contact of register relay 2414, conductor 2423, the upper right contact of cam 2017 (6), conductor 2018, the right armature and back contact of relay 2300, conductor 2244 and thence to ground at the contacts of cam 2205. With route switch 2020 in position 7 a circuit is established for the No. 6 tandem route relay 2009 which may be traced from battery through the winding of this relay, the upper right contact of cam 2011 (7), conductor 2328 and thence to ground at the left armature and back contact of relay 2376.

The sender and the test device function from this point for this tandem route call in the manner previously described, the check switch 1210 advancing into position 13, upon the termination of the test if the sender has functioned correctly, establishing a circuit for advancing the number switch 810 into position 15, this switch having advanced into position 14 during the movement of control switch 1310 through position 10.

A circuit is now closed for advancing switch 1400 into position 12 which may be traced from battery through the magnet winding of switch 1410, the upper right contact of cam 1400 (11), a normal contact of key IS, conductor 1446, thence to ground at the lower left contact of cam 830 (15). With check switch 1210 in position 13 the restoration of the circuits of the test device and of the sender under test proceed in the manner hereinbefore described. When control switch 1310 reaches normal position a circuit is established from ground over the lower left contact of cam 1300 (1), conductor 1443, the right contact of cam 1442 (10 to 12), the inner left armature and front contact of relay 1438, conductor 936, the upper right contact of cam 816 (15 to 17) and to battery through the magnet winding of switch 810 for advancing the number switch into position 18. In position 18 a circuit is closed in shunt of the winding of relay 1438 which may be traced over conductor 939, the right contacts of cam 800 (18), conductor 940, right armature and contact of relay 1439, conductor 938, and thence to ground at the lower right contact of cam 819 (11 to 18¼). Relay 1438 being shunted, deenergizes, opening the locking circuit of relay 1439 which also deenergizes and closes a circuit for advancing switch 1410 into position 13. This circuit may be traced from battery through the magnet winding of switch 1410, the upper left contact of cam 1419 (12), the left armature and back contact of relay 1439, the inner left armature and back contact of relay 1438, the right contact of cam 1442 (10 to 12) and thence to ground at the lower left contact of cam 1300 (1). Switch 1410 advances from position 13 into normal position under the control of its master cam and upon reaching normal position establishes a circuit for advancing switch 810 to normal position, which may be traced from battery through the magnet winding of switch 810, the upper left contact of cam 802 (2 to 18), conductor 1449 and thence to ground at the upper right contact of cam 1411 (13 to 1). A circuit is also established from ground over the lower left contact of cam 1411 (13 to 1), conductor 1448 and the upper right contact of cam 1335 (2 to 18) for advancing control switch 1310 into normal position if it is not at the time restored, and a circuit is also closed over the upper left contact of cam 1406 (13 to 1), conductor 1447 and the lower left contact of cam 1202 (2 to 18) for advancing check switch 1210 into normal position if it is not at this time restored.

With switch 1410 in normal position and the key ST still depressed the selector switch 1500 again functions to hunt for the next sender to be tested and this sender is thereupon tested for all the calls as previously described. In this manner all senders are seized in rotation and tested. When the test of the last sender on the frame has been completed and selector switch 1500 is again driven upwardly over its bank to the telltale position, a circuit is established over the telltale segment 1525 for relay 1409, which may be traced from battery through the winding of relay 1409, conductor 1527, contact of gang switch 1501, conductor 1526, segment 1525, brush 1510, conductor 1511 and thence to ground at the lower right contact of cam 1411 (2 to 3). Relay 1409, upon energizing, closes a locking circuit for relay 1402 extending through the right winding of relay 1402 and the front contact of the inner right armature of this relay to ground at the inner right armature and front contact of relay 1409. Relay 1409 also opens the circuit of the updrive magnet 1502 at its inner left armature and back contact and closes a circuit for the downdrive magnet 1528, which may be traced from battery through the winding of magnet 1528, conductor 1530 to ground at the inner left armature and front contact of relay 1409. The downdrive magnet 1528, upon energizing, presses the depending portion of switch shaft 1505 against the downdrive drum 1529 thereby driving the switch shaft 1505 downwardly into its normal position. When the switch shaft reaches its normal position a circuit is established from ground over the lower right contact of cam 1411 (2 to 3), conductor 1511, brush 1510, segment 1531, conductor 1532, through resistance and battery to ground in shunt of the winding of relay 1409. Relay 1409 thereupon deenergizes, opening the circuit of the down drive magnet 1528 and again establishing the circuit of the updrive magnet 1502 which thereupon drives the switch shaft 1505 upwardly to seize the first available sender on the frame to be tested. From this point the test of all of the senders proceeds as previously described or until the start key ST is opened.

Should the check switch 1210 fail to advance from position 7 on relay call indicator test calls or tandem route test calls the RCI progress lamps, TRCI or DRCI will remain lighted for a considerable time or until the time measure switch 915 has operated to light the lamp 919 and to cause the operation of alarm 920. The test man noting the illumination of these lamps may then determine the discrepancy between the call registered upon the registers of the test device and the call actually set up by the sender under test by operating the keys shown in the lower left corner of Fig. 12. The test man, of course, does not know upon which selection the sender under test has failed and it is, therefore, necessary for him to operate all of the keys in succession beginning with the key TH and ending with the key St. For example, if on the first relay call indicator call previously considered the check switch failed to advance out of position 7 and the trouble was in transmission of the stations impulses, then when the stations key St is depressed, a circuit is established from battery through the No. 4 or J register lamp 1099, conductor 710, the upper left contact of cam 711, conductor 712, the upper contact of key St, conductor 1257 to ground at the lower right contact of cam 300 (7 to 2). A circuit is also closed over the lower contact of key St from battery, conductor 1265, and under the assumption that the impulses transmitted by the sender have operated relays for bringing up the W stations lamp 1819 rather than the J lamp 1805, thence through lamp 1819, the upper armature and back contact of relay 1819, the lower armature and front contact of relay 1804, the upper armature and back contact of relay 1800, the lower armature and back contact of relay 1803, thence over conductor 1636 and the outer right armature of relay 1633 to ground on conductor 1624. The attendant by comparing the stations lamp and the register lamp which are lighted at this time notes that the register lamp J is lighted and that the W stations lamp 1819 is lighted indicating that the sender has functioned inaccurately.

Should the sender go to overflow position and operate relay 1904 at any other time than when the test device is functioning to make an overflow test with number switch 810 in either positions 5 or 9, then ground connected to conductor 1320 through the operation of polarized overflow relay 1904 of the sender, will operate relay 1215 over a path extending from ground on conductor 1320, through the outer right armature and back contact of relay 1211, the left winding of relay 1215, thence to battery through the lower right contact of cam 1227 (2 to 14) and relay 1215, upon energizing, locks up over its inner right armature and closes a circuit over its outer right armature for the overflow lamp OF. At its left armature and contact, relay 1215 opens the circuit extending through the lower contact of cam 1233 (14 to 18) so that it is impossible for relay 1214 to energize and, therefore, the check switch 1210 cannot advance into position 13. The attendant noting the lighting of lamp OF and after a period of six minutes receiving an alarm from the bell 920 through the operation of the time measure switch 915 is appraised of the fact that the sender has functioned to produce an erroneous overflow condition.

Testing senders for all tandem routes.

In the foregoing description and in the usual routine testing of senders only two of the possible tandem routes over which the senders are designed to extend connections are tested, the number switch 810 testing the first or No. 1 route in position 11, thence advancing to position 13 and testing the sixth tandem route, thence advancing to position 15, skipping the remaining eight routes. In order to test all of the tandem routes key TR is operated so that the number switch 810 is held in position 12, while routes 2, 3, 4 and 5 are tested and in position 14 while routes 7, 8, 9 and 19 are tested. The operation of the test device with the key TR depressed is as follows: Upon the operation of key TR with number switch 810 advanced to position 12 during the testing of the first tandem route and the class register switch set in position 8 a circuit is closed for relay 909 which may be traced from ground through the lower right contact of class register cam 316 (8), conductor 951, the left winding of relay 909, conductor 942, the alternate contact of key TR, conductor 1346 to battery at the right contact of cam 1347 (11 to 12), as soon as the control switch 1310 reaches position 12 upon the completion of the transfer of the registration for the No. 1 tandem route call. Relay 909, upon energizing, locks through it's right armature and right winding over conductor 946 to battery at the left contact of cam 1347 (12 to 1), this circuit being maintained until the control switch 1310 leaves position 1 upon its next revolution for the next test call. A circuit is also closed for relay 910 which may be traced from battery through the lower right contact of cam 822 (12), the winding of relay 910, conductor 943, an alternate contact of key TR, conductor 1453 to ground at the lower left contact of class register cam 323 (8). Relay 912 is also energized over a circuit extending from battery through the lower left contact of cam 331 (8), conductor 333, alternate contact of key TR, conductor 1454, the right armature and front contact of relay 910, conductor 923, the left winding of relay 912, conductor 1342, thence to ground at the lower left contact of cam 1340 (2 to 13). Relay 912, upon energizing, locks over its right winding and inner right armature contact to ground at the lower right contact of cam 1340 (2 to 18).

When the check switch 1210 reaches position 13 upon the termination of the first tandem route test call, with relay 912 energized, there is no circuit established over the left contacts of cam 1229 (13) as previously traced for advancing the number switch 810 out of position 12. Since at this time relay 910 is energized when check switch 1210 reaches position 13, a circuit is established for advancing switch 1210 out of position 13, which may be traced over the right contact of cam 1230, conductor 1349, the lower right and upper left contacts of cam 1348 (17), conductor 1350, the outer left armature and front contact of relay 912 thence to ground at the intermediate left armature and front contact of relay 910. From this point the test device and the sender under test are restored to normal and placed in condition for the next test call in the manner previously described. When the control switch reaches position 17¾ a circuit is established for relays 213 and 214 which may be traced from battery through the windings of these relays in parallel, conductor 217, contacts of cam 1351 (17¾ to 1¼), conductor 944, thence to ground at the outer left armature and front contact of relay 910. These relays being energized while control switch 1310 is passing from position 17¾ to position 1¼, maintain obvious circuits for holding stop relays 201, 202, 401, 402, 403, 600, 601 and 602 energized so that the registration which has been set up upon these registers is maintained for the next test call.

As soon as control switch 1310 reaches position 1 a circuit is effective for advancing the class register 210 and the office brush register 410 to new positions for controlling the No. 2 tandem route call. At this time the locking circuit of relay 912 is opened at the lower right contact of cam 1340. When the class register 210 reaches position 9 a circuit is established from battery through the right contact of cam 1344 (17 to 1¼), the left contacts of cam 1432, conductor 1433, the winding of relay 200, the lower contact of cam 212 (8½ to 9), conductor 218, the lower left contact of cam 836 (12), conductor 837, the outer left armature and contact of relay 909, conductor 945, thence to ground at the upper left contact of cam 1340 (18 to 1), and the class switch is consequently stopped in position 9. Similarly, the office brush register 410 is advanced to a new position as determined by the setting of the class register in the same manner as previously described for the first tandem route call. With the office brush register set, the tandem route switches 1010 and 1050 are advanced into position 3 which position is allotted for the second tandem route call. This tandem route test call is conducted with the same designation as employed for the first tandem route call. If the sender functions accurately, the check switch 1210 moves to position 13 upon completion of the test. There is, however, no circuit established over the left contacts of cam 1229 (13) for advancing the number switch 810 out of position 12 since relay 912 was again energized as soon as the control switch 1310 advanced into position 2 during the transfer of the registration from the registers of the test device to the register relays of the sender under test. With check switch 1210 in position 13 there is, however, a circuit closed for advancing it into position 14 which circuit as before traced extends through armature contacts of relays 912 and 910. From this point the test device restores to normal position preparatory to testing the sender for the third tandem route call in the same manner as previously described. Relays 213 and 214 again energize when control switch 1310 reaches position 17¾ and relay 912 again deenergizes as soon as number switch leaves position 18.

With control switch 1310 in position 1 the class register and office brush register are again set in the manner previously described, the class register moving to position 10 and the office brush register sending the tandem route switches 1010 and 1050 into position 4. During the transfer of the registration from the registers of the test device to the register relays of the sender, when control switch 1310 passes through positions 11 and 12, relay 909 is again energized and locked until the control switch reaches position 2. This test proceeds in the same manner as the preceding test until the check switch reaches position 13 when again no circuit is established for advancing the number switch 810 out of position 12 and the check switch is immediately advanced into position 14, from which position the restoration of the test device proceeds as previously described. When control switch 1310 again reaches normal position, the class register is set into position 11 for testing the No. 4 tandem route and the office brush register is advanced to setting tandem route switches 1010 and 1050 into position 5. This tandem route call proceeds as previously described and upon its completion the class register is advanced into position 12 and the route switches 1010 and 1050 are advanced to position 6 in which position the No. 5 tandem route is tested.

With class register 210 in position 12 no circuit is established for relay 912 over contacts of cams 331 or 332 and, therefore, when the check switch 1210 reaches position 13 upon the completion of the test, the circuit for advancing number switch 810 is effective and this switch is advanced out of position 12 into position 13. Switch 810 upon leaving position 12 opens the lower right contact of cam 822 causing the deenergization of relay 910. With the number switch in position 13 the test of the No. 6 tandem route is made as hereinbefore described and the number switch is advanced to position 14 during this test. During the transfer of the registration from the registers of the test device to the register relays of the sender under test while the control switch 1310 is advancing from position 2 to position 12, the circuit of relay 912 is established as previously described over the lower left contact of cam 1340 (2 to 13) and the upper left contact of cam 331 (13), so that when the number six tandem route test is completed and check switch 1210 reaches position 13 there is no circuit effective for advancing number switch 810 out of position 14. With number switch 810 in position 14 the class switch is advanced through positions 15, 16 and 17 in the manner described for advancing it through positions 10, 11 and 12 and tandem routes 7, 8, 9 and 10 are tested. Since the class register is in position 17 during the test of the No. 10 tandem route, the circuit previously traced for relay 912 is opened at the contacts of cams 331 and 332 and, therefore, when the check switch 1210 reaches position 13 upon the completion of the No. 10 tandem route test the previously traced circuit is effective for advancing number switch 810 out of position 14 into position 15, from which point the operation of the test device is the same as previously described. Tandem route test calls 7, 8, 9 and 10 are conducted with the same designation as employed for the test of tandem route No. 6.

If the sender under test is equipped to select certain tandem routes directly from the banks of district selectors, skipping the office selections, then it becomes necessary to supply controlling circuits at the testing device for setting the class register relays and skip office relay of the sender for obtaining this result. In the aforegoing description in connection with the first test call, it will be recalled that the office brush register 410 was set into position 6 and the class register 210 was set into position 5 for controlling the setting of the class and skip office register relays of the sender and for controlling the characteristics of the fundamental circuit extending between the sender under test and the test device.

On tandem route calls, however, the office brush register and the class register are utilized to determine the particular tandem route to be tested and cannot, therefore, be used for determining the skip office condition as above set forth. Therefore, to replace the functions of the office brush register cam 504 and the class register cams 316 and 334, five groups of cams 1046, 1047, 1048, 1049 and 1051 of the tandem route register 1050 are employed. The contacts of these groups of cams are accordingly cross-connected to conductors 1054, 1053, 1052, 1129 and 1242, respectively, which it will be noted are connected to contacts of cams 504, 316 and 334. For example, if it is desired to establish at the sender a skip office condition during the test call over the No. 10 tandem route then the contacts of the aforementioned groups of tandem route switch cams which are closed in position 11 would be cross-connected as indicated in Fig. 10 of the drawings.

*Particular sender selection.*

When it is desired to select a particular sender to be tested, the tens and units keys in the banks SNT and SNU corresponding to the tens and units designation of the sender, are operated and the key PS, Fig. 15, is also operated. It will be assumed that it is desired to make a special test on sender No. 15 and for this purpose the key 1533 in the row SNT and key 1531 in the row SNU are operated. When, therefore, relay 1402 energizes, with sequence switch 1410 in position 2, the circuit of the updrive magnet 1502 is established. Relay 1402 is locked over its right winding and inner right armature and front contact, conductor 1508, the alternate contact of key PS, the normal contact of key IND, contact 1522 of gang switch 1501, brush 1521, bank terminal 1538, conductor 1520, key 1532, conductor 1518 to ground at the normal contact of key IND. Relay 1402 is thus maintained locked and the updrive magnet 1502 continues to advance the brush sets of selector switch 1500. When the terminal 1539 is encountered by the brush 1521, no locking circuit is effective over a tens key in the bank SNT, if it is assumed that key 1533 has been operated to designate the tens designation 1 of the desired sender. A circuit, however, is effective at this time to lock relay 1402 which may be traced over conductor 1508, the alternate contact of key PS, the normal contact of key IND, brush 1523, bank terminal 1540, key 1541, to ground. Relay 1402 is, therefore, still maintained locked and the circuit of the updrive magnet is still effective to advance the switch shaft. This locking circuit last traced for relay 1402 continues effective until the brush 1523 encounters bank terminal 1542 and brush 1521 encounters bank terminal 1599, when the locking circuit is opened since key 1531 has been operated. Relay 1402, therefore, deenergizes as soon as the brushes are properly centered on the set of terminals corresponding to the test terminal 1542, relay 1402 being maintained locked over a locking circuit extending through conductor 1413, the alternate contact of key PS, conductor 1537, segment 1535 to ground at commutator brush 1534. When the brushes are properly centered relay 1402 deenergizes, opening the circuit of the updrive magnet 1502. From this point the test device functions to test the selected sender for all of the routine test calls in the manner previously described.

*Particular number test.*

When it is desired to test a sender using a particular number or designation, which is not included in the regular routine test, key PN is operated and all of the registers of the test device are set manually in accordance with the designation of the particular number which is to be used for testing the senders. With key PN operated, when switch 1410 reaches position 8 following the setting of selector switch 1500, the circuit previously traced extending over the lower contact of cam 1406 (7 to 8), the outer left armature and back contact of relay 1434, the normal contacts of key PN, conductor 803, the lower left contact of cam 802 (1), for advancing number switch 810 out of position 1 is not effective, and the number switch, therefore, remains in normal position. The control switch which ordinarily awaits the operation of the stop relays of the various registers following the setting of the registers by the number switch, is now advanced through the operation of key PN by a circuit extending over the lower contact of cam 1332 (1), an alternate contact of key PN, thence to ground at the lower left contact of cam 1406 (6 to 8). From position 2 the control switch continues to advance through succeeding positions into position 12, transferring the registration from the registers of the test device to the register relays of the sender under test. Upon reaching position 12 switch 1310 is advanced into position 15 over the same circuit which advanced it out of position 1 into position 2. From position 15 switch 1310 is advanced into position 16 by switch 1210 in the usual manner. From this point the test proceeds as previously described until the control switch 1310 advances into position 18 at the termination of the test, when a circuit is closed from battery, through the magnet winding of switch 1410, the upper right contact of cam 1419 (8 to 11), normal contact of key IS, alternate contact of key PN to ground at the upper left contact of cam 1333 (18) for advancing switch 1410 into position 12. Sequence switch 1410 is then advanced out of position 12 and into its normal position by means of a circuit completed at the upper left contact of cam 1419 (12) and a contact of key PN. Key PN also opens the holding circuit of relay 1421 so that this relay deenergizes as soon as sequence switch 1410 leaves position 6 and, therefore, when the special number test is completed, the sender under test is released and is not again seized by the selector switch 1500. Key PN also holds open the circuit which advances control switch 1310 into position 1, when switch 1210 reaches position 1, until after the control switch has been restored to normal by the movement of sequence switch 1410 to normal position and the closure of the lower left contact of cam 1411 (13 to 1). This insures that the sender under test will be tested only for the particular number selected.

*Individual sender test.*

To test an individual sender for all of the routine test calls, the key IS is depressed in addition to the key PS and keys in the rows SNT and SNU, so that when all of the routine tests are completed no circuit exists as hereinbefore described for advancing sequence switch 1410 out of position 11 since this circuit extending over the upper right contact of cam 1400 (11) is opened at an alternate contact of key IS. With sequence switch 1410 locked in position 11, the selector switch 1500 cannot be moved off of the terminals of the sender being tested, and consequently, only the one sender is tested for all of the routine test calls.

If the key PN is operated in addition to the key IS, then when sequence switch 1410 reaches position 8 following the selection of the individual sender to be tested and prior to the beginning of the test of the sender, the sequence switch is arrested in position 8 since the circuit hereinbefore traced extending over the upper right contact of cam 1419 (8 to 11) is opened at a contact of key IS. With key PN operated the number switch does not leave normal position and, therefore, the registers of the test device must be set manually. Control switch 1310 is advanced out of its normal position into position 2 after transferring the registration out of position 12 and through the operation of key PN as previously described. Switch 1310 is advanced out of position 18 upon completion of the particular number test by a circuit extending from battery through the magnet winding of switch 1310, the upper left contact of cam 1335 (18), conductor 1249, the normal contacts of cam 1235 (1), conductor 1437, alternate contacts of key PN, contacts of cam 1451 (8), alternate contacts of key IS, conductor 935, thence to ground at the lower right contact of cam 830 (1). As soon as switch 1310 reaches position 1, it is again advanced into position 2 by the circuit previously traced through an alternate contact of key PN and the same sender is again tested for the particular number set up on the registers of the test device. This repeated testing of the sender with the particular number continues until the keys of the test device are all restored to normal condition.

If at any time the start key ST is thrown toward the left, an obvious circuit is established for relay 1434 which relay locks over its inner right armature and contact to ground at the left contact of cam 1452 (2 to 12). Relay 1434, upon energizing, opens the previously traced circuit for advancing number switch 810 out of position 1, connects ground to conductor 1418 at its outer right armature and front contact for holding the sender which has been seized by the selector switch 1500, busy, and closes a circuit extending from ground at its outer right armature and front contact and the upper left contact of cam 1407 for advancing sequence switch 1410 into its normal position. Upon reaching its normal position sequence switch 1410 opens the locking circuit of relay 1434 and supplies ground potential over contacts of cams 1406 and 1411 (13 to 1) for restoring switches 1310, 1210 and 810 to normal if they are not at the time in normal position.

*Conducting test calls step-by-step.*

If it is desired on any test call to conduct the test step-by-step to enable the test man more time for observation, that is, to test the sender for each digital selection separately, advancing the circuits of the test device for the next succeeding selection by the manual control of the test man rather than automatically as hereinbefore described, the key SS, Fig. 11, is operated. It will be noted that with this key operated relay 1102, which functions following each closure of the fundamental circuit, locks to ground directly through contacts of key SS and that, therefore, upon the completion of a selection and the advance of the check switch 1210 and sequence switch 1110 in preparation for the test of the next selection, relay 1102 being held locked by key SS, the fundamental circuit is not closed and the sender cannot function for the next selection. When the test man is ready to observe the test of the next digital selection, he depresses key AV which at its left contacts opens the locking circuit of relay 1102 permitting this relay to release and again close the fundamental circuit. The fundamental circuit is, however, held open at the right contacts of key AV until this key is released.

It will be noted that two extra pairs of counting relays 1141 and 1142, and 1143 and 1144 are provided for registering two extra impulses which the interrupter 1208 may be required to send to the sender in order to satisfy it. In the event that either of these pairs of relays are operated denoting that it required either eleven or twelve impulses to satisfy the sender, the exact number of impulses sent may be indicated on the No. 11 lamp 1044 or the No. 12 lamp 1045 through the operation of the impulse key IMP.

While for convenience the invention has been disclosed in connection with an operator's semi-mechanical office sender, it is of course obvious that the essential features of the invention are equally applicable to testing devices for testing central office sending devices, whether full mechanical or semi-mechanical.

What is claimed is:

1. In a telephone exchange system in which connections are established under the control of central office sending devices, a plurality of sending devices, a testing device, and means for associating said sending devices in rotation with said testing device.

2. In a telephone exchange system in which connections are established under the control of central office sending devices, a plurality of sending devices, means for rendering any one of said sending devices unselectable, a testing device, and means for associating all selectable sending devices in rotation with said testing device.

3. In a telephone exchange system in which connections are established under the control of central office sending devices, a plurality of sending devices, a testing device, a selector switch for associating said sending devices in rotation with said testing device regardless of their busy or idle condition, and means for temporarily placing a sender out of service whereby it may not be selected by said selector switch.

4. In a telephone exchange system in which connections are established under the control of central office sending devices, a plurality of sending devices, a testing device, a selector switch for associating said sending devices in rotation with said testing device regardless of their busy or idle condition, and means operative upon the connection of said testing device with a busy sending device to delay the operation of said testing device until said busy sending device becomes idle.

5. In a telephone exchange system in which connections are established under the control of central office sending devices, a plurality of groups of sending devices, a testing device, a selector switch for each group of sending devices for selecting the sending devices of such group in rotation, and a transfer switch for associating said testing device with any one of said selector switches.

6. In a telephone exchange system in which connections are established under the control of central office sending devices, a sending device to be tested, a testing device having means for causing the operation of said sending device in accordance with the designations of calls corresponding to the different classes of calls which said sending device is adapted to control, means for associating said sending device with said testing device, means at said testing device controlled by said sending device in accordance with the designations received by said sending device, and means for checking the accuracy with which said sending device functions.

7. In a telephone exchange system in which connections are established under the control of central office sending devices, a sending device to be tested having a plurality of registers, a testing device comprising means for automatically setting up upon the registers in succession the designations of calls corresponding to the different classes of calls which said sending device is adapted to control, means for associating said sending device with said testing device, means at said testing device controlled by said sending device in accordance with the designations registered by said registers, and means for checking the accuracy with which said sending device functions.

8. In a telephone exchange system in which connections are established under the control of central office sending devices, a sending device having plurality of registers, a testing device having a plurality of registers upon which may be registered the designations of a plurality of test calls, means for transferring the designations set up upon the registers of said testing device to the registers of said sending device, means at said testing device controlled by said sending device in accordance with the designations registered upon the registers of said sending device, and means for checking the accuracy with which said sending device functions.

9. In a telephone exchange system in which connections are established under the control of central office sending devices, a sending device having a plurality of registers, a testing device having a plurality of registers upon which may be registered the designation of a plurality of test calls, means for transferring the designations set up upon the registers of said testing device to the registers of said sending device, indicating means operated by the registers of said testing device to indicate the desired operation of the sending device, means at said testing device controlled by said sending device in accordance with the designations registered upon the registers of said sending device, and other indicating means operative by said last mentioned means to indicate the actual operation of the sending device.

10. In a telephone exchange system in which connections are established under the control of central office sending devices, a sending device to be tested, a testing device, two series of lamps for said testing device, means to light a desired lamp of one of said series to indicate a desired operation of said sending device, means at said testing device operated in accordance with the actual operation of said sending device, and a key for lighting a lamp of the other of said series in accordance with the operation of said means.

11. In a telephone exchange system in which connections are established under the control of central office sending devices, a sending device to be tested having a plurality of registers, a testing device having means for registering upon said registers the designation of a test call and for causing said sending device to operate successively in accordance with the setting of its registers, two series of lamps for said testing device, mean to light a desired lamp of one of said series to indicate successively a desired operation of said sending device in accordance with the setting of each register, and means to light a lamp of the other of said series to indicate the manner in which said sending device actually operates for any registration.

12. In a telephone exchange system in which connections are established under the control of central office sending devices, a sending device to be tested, a testing device having means for causing the operation of said sending device in accordance with the designations of a plurality of test calls, means to operate said testing device to test the correctness of the operation of said sending device for the first portion of the first of said designations, means to advance the operation of said testing device to a stage where the correctness of the operation of said sending device is tested for the second portion of the first designation, means to repeat the advancing operation of said testing device for each portion of each of said designations, and means to prevent further operation of said testing device if said sending device functions inaccurately at any stage.

13. In a telephone exchange system in which connections are established under the control of central office sending devices, a sending device to be tested, a testing device having means for causing the operation of said sending device in accordance with the designations of a plurality of test calls, a register for said testing device for registering the operation of said sending device for each portion of each of said designations, a control switch in said testing device, means to advance said control switch upon the termination of the correct operation of said sending device for each portion of each of said designations to a position wherein said register may register the next operation of said sending device, and means to prevent the progress of said control switch if said sending device functions inaccurately at any stage.

14. In a telephone exchange system in which connections are established under the control of central office sending devices, a sending device to be tested having a plurality of registers, a testing device having a plurality of registers upon which may be registered the designations of a plurality of test calls, means for transferring the designations set up upon the registers of said testing device successively to the registers of said sending device, means at said testing device for registering the operation of said sending device for each stage of its operation in accordance with the setting of its registers, a control switch in said testing device, means to advance said control switch upon the termination of the correct operation of said sending device for each stage of its operation to a position wherein said registering means may register the next operative stage of said sending device, and means to prevent the progress of said control switch if said sending device functions inaccurately at any stage.

15. In a testing system, a set of registers for controlling test designations, a switch, means to set said registers in a certain position of said switch, means to make a test in accordance with said setting, mean to advance said switch, and means to reset said registers under the control of said switch in accordance with its new position.

16. In a telephone exchange system in which connections are established under the control of central office sending devices, a sending device to be tested and a testing device having a plurality of registers, a number switch for successively setting the registers of said testing device in accordance with the designations of different test calls, and means for controlling said sending device in accordance with the designations set up upon the registers of said testing device.

17. In a telephone exchange system in which connections are established under the control of central office sending devices, a sending device to be tested and a testing device having a plurality of registers, a number switch for successively setting the registers of said testing device in accordance with the designations of different test calls, means for controlling said sending device in accordance with the designations set up upon the registers of said testing device, means at said testing device for registering the operation of said sending device in accordance with the control exercised thereover by said testing device, and means for checking the accuracy with which said sending device functions.

18. In a telephone exchange system in which connections are established under the control of central office sending devices, a sending device to be tested having a plurality of registers and a testing device having a plurality of registers, a number switch for successively setting the registers of said testing device in accordance with the designations of different test calls, means for transferring the designations set up upon the registers of said testing device to the registers of said sending device, means at said testing device for registering the operation of said sending device in accordance with each registration set up upon the registers of said sending device, and means for checking the accuracy with which said sending device functions.

19. In a telephone exchange system in which connections are established under the control of central office sending devices, a sending device to be tested having a plurality of registers and a testing device having a plurality of registers, a number switch for successively setting the registers of said testing device in accordance with the designations of different test calls, means for transferring the designations set up upon the registers of said testing devices to the registers of said sending device, means at said testing device for registering the operation of said sending device in accordance with each of the registrations of each test call set up upon the registers of said sending device, and means to advance said number switch upon the termination of the correct operation of said sending device for each test call.

20. In a telephone exchange system in which connections are established under the control of central office sending devices, a plurality of sending devices to be tested each having a plurality of registers and a testing device having a plurality of registers, a selector switch for associating said testing device in succession with said sending devices, a number switch for successively setting the registers of said testing devices in accordance with the designations of different test calls, means for transferring the designations set up upon the registers of said testing devices to the registers of a selected sending device, means at the testing device for registering the operation of said selected sending device in accordance with each registration of each test call set up upon its registers, and means for advancing said selector switch to release the sending device under test and to seize another sending device upon the termination of the correct operation of said first sending device for all of said test calls.

21. In a telephone exchange system in which connections are established under the control of central office sending devices, a plurality of sending devices to be tested, a testing device, a selector switch for associating said testing device in rotation with said sending devices, means at said testing device for causing the operation of a selected sending device successively in accordance with each of a plurality of test calls, means for advancing said selector switch to associate said testing device with another sending device upon the successful completion of all test calls by said sending device under test, and means for arresting the operation of said testing device at any stage in its operation.

22. In a telephone exchange system in which connections are established under the control of central office sending devices, a plurality of sending devices to be tested, a testing device, a selector switch for associating said testing device in rotation with said sending devices, means at said testing device for causing the operation of a selected sending device in accordance with the designation of a test call, means for advancing said selector switch to associate said testing device with another sending device upon the successful completion of said test call by said sending device under test, and means for indicating at will the number of the particular sender under test.

23. In a telephone exchange system in which connections are established under the control of central office sending devices, a plurality of sending devices to be tested, a testing device, a selector switch for associating said testing device in rotation with said sending devices, means at said testing device for causing the operation of a selected sending device successsively in accordance with each of a plurality of test calls, means for advancing said selector switch to associate said testing device with another sending device upon the successful completion of all test calls by said sending device under test, and means for indicating at will the number of the particular sender under test.

24. In a telephone exchange system in which connections are established under the control of central office sending devices, a plurality of sending devices to be tested, a testing device, a selector switch for associating said testing device in rotation with said sending devices, means at said testing device for causing the operation of a selected sending device in accordance with the designation of a test call, means for advancing said selector switch to associate said testing device with another sending device upon the successful completion of said test call, two series of lamps, and means for operating a lamp in each series for indicating at will the designation of the particular sender under test.

25. In a telephone exchange system in which connections are established under the control of central office sending devices, a plurality of sending devices to be tested, a testing device, a selector switch for associating said testing device in rotation with said sending devices, means at said testing device for causing the operation of a selected sending device successively in accordance with each of a plurality of test calls, means for advancing said selector switch to associate said testing device with another sending device upon the successful completion of all test calls by said sending device under test, two series of lamps, and means for operating a lamp in each series for indicating at will the designation of the particular sender under test.

26. In a telephone exchange system in which connections are established under the control of central office sending devices, a sending device to be tested having a plurality of registers, a testing device having a plurality of registers, means for manually setting the registers of said testing device in accordance with the designation of any call for which it is desired to test said sending device, means for transferring the designation set up upon the registers of said testing device to the registers of said sending device, means at said testing device for registering the operation of said sending device in response to the setting of each register of said sending device, means for checking the accuracy with which said sending device functions, and means for arresting the operation of said testing device upon completion of said designated test call.

27. In a telephone exchange system in which connections are established under the control of central office sending devices, a plurality of sending devices to be tested each having a plurality of registers, a testing device having a plurality of registers, a selector switch for associating said testing device in rotation with said sending devices, means for manually setting the registers of said testing device in accordance with the designation of any call for which it is desired to test said sending devices, means for transferring the designation set up upon the registers of said testing device to the registers of the sending device under test, means at said testing device for registering the operation of said sending device in response to the setting of each register of said sending device, means for checking the accuracy with which said sending device functions, and means for advancing said selector switch to associate said testing device with another sending device upon the successful completion of said designated test call whereby said sending devices are each tested with said test call.

28. In a telephone exchange system in which connections are established under the control of central office sending devices, a plurality of sending devices to be tested, a testing device, a selector switch for associating said testing device in rotation with said sending devices, means at said testing device for causing the operation of each selected sending device in accordance with a test call, means for checking the accuracy with which said selected sending device functions, and means for causing said selector switch to select any desired one of said sending devices.

29. In a telephone exchange system in which connections are established under the control of central office sending devices, a plurality of sending devices to be tested, a testing device, a selector switch for associating said testing device in rotation with said sending devices, means at said testing device for causing the operation of each selected sending device successively in accordance with each of a plurality of test calls, means for checking the accuracy with which said selected sending device functions, and means for causing said selector switch to select any desired one of said sending devices.

30. In a telephone exchange system in which connections are established under the control of central office sending devices, a plurality of sending devices to be tested each having a plurality of registers, a testing device having a plurality of registers, a selector switch for associating said testing device in rotation with said sending devices, means for manually setting the registers of said testing device in accordance with the designation of any call for which it is desired to test a sending device, means for transferring the designation set up upon the registers of said testing device to the registers of the sending devices under test, means at said testing device for registering the operation of said sending device responsive to the setting of each register of the sending device, means for checking the accuracy with which said sending device functions, and means for causing said selector switch to select any desired one of said sending devices.

31. In a telephone exchange system in which connections are established under the control of central office sending devices, a sending device to be tested having a plurality of registers, a testing device having a plurality of registers, means for successively setting the registers of said testing device in accordance with the designations of different test calls, means for transferring the designations set up upon the registers of said testing device to the registers of said sending device, means at said testing device for checking the accuracy with which said sending device functions for each of said test calls, and means operative upon the successful termination of each test call to release the sending device under test and to prepare it for controlling the next test call.

32. In a telephone exchange system in which connections are established under the control of central office sending devices, a sending device to be tested, a testing device having means for causing the operation of said sending device in accordance with the designations of certain of a plurality of test calls, means at said testing device for checking the accuracy with which said sending device functions for each portion of each test call, and means operative for causing said sending device to operate in accordance with the designation of other additional test calls.

33. In a telephone exchange system in which connections are established under the control of central office sending devices, a sending device to be tested, a testing device having means for causing the operation of said sending device in accordance with the designations of certain of a plurality of test calls, means at said testing device for checking the accuracy with which said sending device functions for each portion of each test call, and key operated means for interpolating other additional test calls between said certain aforementioned test calls.

34. In a telephone exchange system in which connections are established under the control of central office sending devices, a sending device to be tested having a plurality of registers, a testing device having a plurality of registers and a number switch for successively setting the resisters of said testing device in accordance with the designations of certain of a plurality of test calls, means for transferring the designations set up upon the registers of said testing device to the registers of said sending device, means at said testing device for registering the operation of said sending device in accordance with each of the registrations of each test call set up upon the registers of said sending device, means for advancing said number switch upon the termination of the correct operation of said sending device for each test call, and key operated means for arresting said number switch in intermediate positions whereby said number switch is caused to set the registers of said testing device for controlling additional test calls.

35. In a telephone exchange system in which connections are established under the control of central office sending devices, a sending device to be tested having a plurality of registers, a testing device having a plurality of registers, means for setting up upon the registers of said testing device the designation of a test call to a manual office having a call indicating mechanism, means for transferring the registration from said second registers to said first registers, means at said testing device for registering the operation of said sending device in accordance with the district and office registrations of said test call, a call indicator equipment for registering the impulses transmitted by said sending device in accordance with the numerical registration of said test call, and means cooperating with said registering means and said indicator equipment for checking the accuracy with which said sending device functions.

36. In a telephone exchange system in which connections are established under the control of central office sending devices, a sending device to be tested having a plurality of registers, a testing device having a plurality of registers and a number switch for successively setting the registers of said testing device in accordance with the designations of different test calls to manual offices having call indicating mechanism, means for transferring the registration from said second registers to said first registers, means at said testing device for checking the accuracy with which said sending device functions in accordance with a portion of the registration of each test call, a call indicator equipment for said testing device, and means responsive to an accurate setting of said indicator equipment by said sending device in accordance with the remaining portion of the registration of each test call to advance said number switch for controlling another test call.

37. In a telephone exchange system in which connections are established under the control of central office sending devices, a sending device to be tested having a plurality of registers, a testing device having a plurality of registers and a number switch for successively setting the registers of said testing device in accordance with the designations of different test calls to manual offices having call indicator mechanism, means for transferring the registration from said second registers to said first registers, means at said testing device for checking the accuracy with which said sending device functions in accordance with a portion of the registrations of each test call, a call indicator equipment for said testing device comprising groups of lamps, means responsive to an accurate setting of said indicator equipment by said sending device in accordance with the remaining portions of the registrations of each test call to advance said number switch for controlling another test call, and means for lighting a lamp in each of said groups to display that portion of each registration actually transmitted to the indicator equipment by said sending devices.

38. In a telephone exchange system in which connections are established under the control of central office sending devices, a sending device to be tested, a testing device, means associated with said testing device for setting said device in accordance with the designation of a particular test call, means associated with said testing device comprising a call indicator for registering the registration of said sending device in accordance with the designation of the test call set up thereon, said indicator comprising a group of lamps for each digital portion of said designation, and a key corresponding to each group of lamps for lighting the lamps in any group to indicate the actual operation of the sending device for any portion of said designation.

39. In a telephone exchange system in which connections are established under the control of central office sending devices, a sending device to be tested, a testing device having means for causing the operation of said sending device in accordance with the designation of a test call, means to operate said testing device to test the correctness of the operation of said sending device for each portion of said designation, a signal, and means for operating said signal after a predetermined interval if said sending device fails to function accurately at any stage.

40. In a telephone exchange system in which connections are established under the control of central office sending devices, a sending device to be tested, a testing device having means for causing the operation of said sending device under all of the operating conditions for which said sending device is designed, means at said testing device for checking the accuracy with which said sending device functions in response to each test condition, a signal, and means for operating said signal after a predetermined interval if said sending device fails at any time to function in the manner directed by said testing device.

41. In a telephone exchange system in which connections are established under the control of central office sending devices, a plurality of sending devices, a testing device, and means for repeatedly associating said sending devices in rotation with said testing device.

42. In a telephone exchange system in which connections are established under the control of central office sending devices, a plurality of sending devices, a testing device, a selector switch for associating said sending devices successively with said testing device, means for restoring said selector switch after all of said sending devices have been associated with said testing device, and means for again operating said selector switch to associate said sending devices in succession with said testing device.

43. In a telephone exchange system in which connections are established under the control of central office sending devices, a plurality of sending devices, a testing device, a selector switch for associating said sending devices successively with said testing device, means for advancing said selector switch, means for restoring said switch after all of said sending devices have been associated with said testing device, and means for repeatedly operating and restoring said switch whereby each of said sending devices is associated with said testing device a plurality of times.

44. In a telephone exchange system in which connections are established under the control of central office sending devices, a sending device to be tested, a testing device, means for associating said testing device with said sending device, means in said testing device for directing said sending device to function in its normal manner for controlling the establishment of connections, a signal, and means in said testing device for operating said signal if said sending device fails to function as directed.

In witness whereof, we hereunto subscribe our names this 19th day of September, A. D., 1922.

FRANKLIN A. STEARN.
JOHN C. McAULIFFE.